US012773664B2

(12) United States Patent
Voskian et al.

(10) Patent No.: US 12,773,664 B2
(45) Date of Patent: Oct. 27, 2026

(54) ELECTROCHEMICAL CAPTURE OF LEWIS ACID GASES

(71) Applicant: Massachusetts Institute of Technology, Cambridge, MA (US)

(72) Inventors: Sahag Voskian, Cambridge, MA (US); Trevor Alan Hatton, Sudbury, MA (US); Cameron G. Halliday, Wokingham (GB)

(73) Assignee: Massachusetts Institute of Technology, Cambridge, MA (US)

( * ) Notice: Subject to any disclaimer, the term of this patent is extended or adjusted under 35 U.S.C. 154(b) by 450 days.

(21) Appl. No.: 18/506,128

(22) Filed: Nov. 9, 2023

(65) Prior Publication Data

US 2024/0139675 A1 May 2, 2024

Related U.S. Application Data

(63) Continuation of application No. 17/508,411, filed on Oct. 22, 2021, now Pat. No. 11,857,919, which is a (Continued)

(51) Int. Cl.
*B01D 53/32* (2006.01)
*B01D 53/62* (2006.01)

(Continued)

(52) U.S. Cl.
CPC .......... *B01D 53/326* (2013.01); *B01D 53/62* (2013.01); *B01D 53/96* (2013.01); *C25B 9/05* (2021.01);

(Continued)

(58) Field of Classification Search
None
See application file for complete search history.

(56) References Cited

U.S. PATENT DOCUMENTS 3,206,333 A 9/1965 Roos
3,540,934 A 11/1970 Boeke (Continued)

FOREIGN PATENT DOCUMENTS

CN 1769760 A 5/2006
CN 101124031 2/2008

(Continued)

OTHER PUBLICATIONS

Extended European Search Report mailed Sep. 29, 2023, for Application No. EP20857275.0 and pending claims.

(Continued)

*Primary Examiner* — Alexander W Keeling
(74) *Attorney, Agent, or Firm* — Wolf, Greenfield & Sacks, P.C.

(57) ABSTRACT

Methods, apparatuses, and systems related to electrochemical capture of Lewis acid gases from fluid mixtures are generally described. Certain embodiments are related to electrochemical methods involving selectively removing a first Lewis acid gas from a fluid mixture containing multiple types of Lewis acid gases (e.g., a first Lewis acid gas and a second Lewis acid gas). Certain embodiments are related to electrochemical systems comprising certain types of electroactive species having certain redox states in which the species is capable of binding a first Lewis acid gas but for which binding with a second Lewis acid gas is thermodynamically and/or kinetically unfavorable. The methods, apparatuses, and systems described herein may be useful in carbon capture and pollution mitigation applications.

17 Claims, 34 Drawing Sheets

Related U.S. Application Data continuation of application No. 17/005,250, filed on Aug. 27, 2020, now Pat. No. 11,219,858.

(60) Provisional application No. 62/988,851, filed on Mar. 12, 2020, provisional application No. 62/892,975, filed on Aug. 28, 2019.

(51) Int. Cl.

| | |
|---|---|
| ***B01D 53/96*** | (2006.01) |
| ***C25B 9/05*** | (2021.01) |
| ***C25B 9/15*** | (2021.01) |
| ***C25B 9/70*** | (2021.01) |

(52) U.S. Cl.

CPC .................. *C25B 9/15* (2021.01); *C25B 9/70* (2021.01); *B01D 2257/302* (2013.01); *B01D 2257/504* (2013.01); *B01D 2258/06* (2013.01)

(56) References Cited

U.S. PATENT DOCUMENTS

| | | | |
|---|---|---|---|
| 5,770,033 | A | 6/1998 | Murphy |
| 5,776,351 | A | 7/1998 | McGinness |
| 7,169,509 | B2 | 1/2007 | Nobuta |
| 8,900,435 | B2 | 12/2014 | Littau |
| 9,056,275 | B2 | 6/2015 | Buttry |
| 9,222,179 | B2 | 12/2015 | Teamey et al. |
| 10,464,018 | B2 | 11/2019 | Voskian et al. |
| 10,646,813 | B2 | 5/2020 | Landskron |
| 11,219,858 | B2 | 1/2022 | Voskian et al. |
| 11,298,653 | B2 | 4/2022 | Voskian et al. |
| 11,598,012 | B2 | 3/2023 | Voskian et al. |
| 11,806,663 | B2 | 11/2023 | Voskian et al. |
| 12,264,399 | B2 | 4/2025 | Voskian et al. |
| 2002/0086203 | A1 | 7/2002 | Nobuta et al. |
| 2002/0163135 | A1 | 11/2002 | Kato |
| 2003/0019758 | A1 | 1/2003 | Gopal |
| 2004/0229117 | A1 | 11/2004 | Mitani et al. |
| 2005/0227071 | A1 | 10/2005 | Muraoka et al. |
| 2006/0081482 | A1 | 4/2006 | Tempel et al. |
| 2007/0092769 | A1 | 4/2007 | Davis et al. |
| 2008/0202341 | A1 | 8/2008 | Poole et al. |
| 2009/0159456 | A1 | 6/2009 | Littau et al. |
| 2009/0291844 | A1 | 11/2009 | Hou |
| 2010/0044245 | A1* | 2/2010 | Cervantes ................. C02F 1/42 205/748 |
| 2010/0219068 | A1 | 9/2010 | Yamauchi et al. |
| 2013/0045399 | A1 | 2/2013 | Cole et al. |
| 2013/0084474 | A1 | 4/2013 | Mills |
| 2013/0122382 | A1 | 5/2013 | Mizuhata et al. |
| 2013/0145935 | A1 | 6/2013 | Suzuka et al. |
| 2013/0292262 | A1 | 11/2013 | Teamey et al. |
| 2014/0166499 | A1 | 6/2014 | Landskron et al. |
| 2014/0220459 | A1 | 8/2014 | Iida et al. |
| 2014/0271434 | A1* | 9/2014 | Buttry .................. B01D 53/965 423/220 |
| 2014/0332406 | A1 | 11/2014 | Nottke |
| 2015/0004483 | A1 | 1/2015 | Nakahara et al. |
| 2015/0110694 | A1 | 4/2015 | Eltayeb et al. |
| 2015/0207165 | A1 | 7/2015 | Schubert et al. |
| 2016/0017503 | A1 | 1/2016 | Kaczur et al. |
| 2016/0320383 | A1 | 11/2016 | Nazareth et al. |
| 2017/0088959 | A1 | 3/2017 | Abouatallah et al. |
| 2017/0113182 | A1* | 4/2017 | Voskian ............... B01D 53/326 |
| 2017/0113951 | A1 | 4/2017 | Su |
| 2017/0179499 | A1 | 6/2017 | Ashley et al. |
| 2018/0028962 | A1 | 2/2018 | Hatton et al. |
| 2018/0215635 | A1 | 8/2018 | Roberts |
| 2018/0257027 | A1 | 9/2018 | Desai et al. |
| 2019/0030485 | A1 | 1/2019 | Perry |
| 2019/0256990 | A1 | 8/2019 | Kaczur et al. |
| 2020/0023307 | A1 | 1/2020 | Voskian et al. |
| 2021/0031939 | A1 | 2/2021 | Perry |
| 2021/0060485 | A1 | 3/2021 | Voskian et al. |
| 2021/0062351 | A1 | 3/2021 | Hatton et al. |
| 2021/0079537 | A1 | 3/2021 | Spurgeon et al. |
| 2021/0387139 | A1 | 12/2021 | Voskian et al. |
| 2022/0040632 | A1 | 2/2022 | Voskian et al. |
| 2022/0145002 | A1 | 5/2022 | Rogers et al. |
| 2022/0184552 | A1 | 6/2022 | Voskian et al. |
| 2022/0362708 | A1 | 11/2022 | Voskian et al. |
| 2023/0183872 | A1 | 6/2023 | Voskian et al. |
| 2024/0382901 | A1 | 11/2024 | Voskian et al. |

FOREIGN PATENT DOCUMENTS

| | | | | |
|---|---|---|---|---|
| CN | 111268862 | A | 6/2020 | |
| EP | 2740710 | A1 | 6/2014 | |
| GB | 2513103 | A | 10/2014 | |
| JP | 2005-100926 | A | 4/2005 | |
| JP | 2007-090328 | A | 4/2007 | |
| JP | 2007-090329 | A | 4/2007 | |
| JP | 2009-217992 | A | 9/2009 | |
| JP | 2013-134918 | A | 7/2013 | |
| JP | 2016-203134 | A | 12/2016 | |
| KR | 2002-0037262 | A | 5/2002 | |
| KR | 2013-0048728 | A | 5/2013 | |
| WO | WO 1989/006055 | A1 | 6/1989 | |
| WO | WO 2003/087434 | A1 | 10/2003 | |
| WO | WO 2006/082436 | A1 | 8/2006 | |
| WO | WO 2011/116236 | A2 | 9/2011 | |
| WO | WO 2012/144189 | A1 | 10/2012 | |
| WO | WO 2013/025999 | A2 | 2/2013 | |
| WO | WO 2019/072385 | A1 | 4/2019 | |
| WO | WO 2019/136374 | A1 | 7/2019 | |
| WO | WO-2019145491 | A1 * | 8/2019 | .......... C02F 1/46114 |

OTHER PUBLICATIONS

International Search Report and Written Opinion dated Dec. 12, 2020, for Application No. PCT/US2020/048281.

Achilleos et al., Selective Molecularly Mediated Pseudocapacitive Separation of Ionic Species in Solution. ACS Appl. Mater. Interfaces, 2016, 8, 32743-32753.

Apaydin et al., Direct Electrochemical capture and release of carbon dioxide using an industrial organic pigment: quinacridone. Angew. Chemie Int. Ed., 2014, 53:6819-6822.

Bhatt et al., A Fine-Tuned Fluorinated MOF Addresses the Needs for Trace CO2 Removal and Air Capture Using Physisorption. J. Am. Chem. Soc., 2016;138:9301-9307.

Bohle et al., Kinetics and mechanism of nucleophilic addition to nitric oxide: secondary amine diazeniumdiolation. Inorg Chem. May 19, 2008;47(10):3925-7.

Bryantsev et al., Predicting Solvent Stability in Aprotic Electrolyte LiAir Batteries:Nucleophilic Substitution by the Superoxide Anion Radical (O2). J. Phys. Chem. A, 2011, 115, 12399-409.

Choi et al., Amine-Tethered Solid Adsorbents Coupling High Adsorption Capacity and Regenerability for CO2 Capture From Ambient Air. ChemSusChem, 2011, 4, 628-635.

Dubois et al., Chapter 4—Electrochemical Concentration of Carbon Dioxide. Editor(s): B.P. Sullivan. Electrochemical and Electrocatalytic Reactions of Carbon Dioxide. 1993. 94-117. https://doi.org/10.1016/B978-0-444-88316-2.50008-5.

Gibian et al., Reactivity of Superoxide Ion with Carbonyl Compounds in Aprotic Solvents. J. Am. Chem. Soc., 1979, 101, 640-644.

Gurkan et al., Quinone reduction in ionic liquids for electrochemical CO2 Separation. ACS Sustainable Chem. Eng. 2015;3(7):1394-1405.

Hefti et al., On the potential of phase-change adsorbents for CO2 capture by temperature swing adsorption. Faraday Discuss., 2016, 192, 153-179.

Kim et al., A novel ventilation strategy with CO2capture device and energysaving in buildingsMoon. Energy Build., 2015, 87, 134-141.

Kokoszka et al., Supercapacitive swing adsorption of carbon dioxide. Angew Chem Int Ed Engl. Apr. 1, 2014;53(14):3698-3701. doi: 10.1002/anie.201310308. Epub Feb. 24, 2014. PMID: 24616112.

Li et al., Semiquinone Intermediates in the Two-Electron Reduction of Quinones in Aqueous Media and their Exceptionally High Reactivity towards Oxygen Reduction. Chemphyschem, 2011, 12, 1255-7.

(56) References Cited

OTHER PUBLICATIONS

Li et al., Numerical and experimental study of a novel compact micro fluidizedbeds reactor for CO2capture in HVAC. Energy Build., 2017, 135, 128-136.
Liu et al., Design, construction, and testing of a supercapacitive swing adsorption module for CO2 separation. Chem Commun (Camb). Mar. 28, 2017;53(26):3661-3664. doi: 10.1039/c7cc01055a.
Mao et al., Electrochemically Responsive Heterogeneous Catalysis for Controlling Reaction Kinetics. J. Am. Chem. Soc. 137, 1348-1355 (2015).
Marshall, (2017). In Switzerland, a giant new machine is sucking carbon directly from the air. Science. Jun. 1. doi: 10.1126/science.aan6915.
Mizen et al., Reductive Addition of CO 2 to 9,10-Phenanthrenequinone. J Electro Soc. 1989;136(4):941-946.
Muench et al., Polymer-Based Organic Batteries. Chem. Rev., 2016;116:9438-9484.
Ntiamoah et al., CO2 Capture by Temperature Swing Adsorption: Use of Hot CO2-Rich Gas for Regeneration. Ind. Eng. Chem. Res., 2016, 55, 703-713.
Patel et al., Semiquinone Free Radicals and Oxygen Pulse Radiolysis Study of One Electron Transfer Equilibria. J. Chem. Soc. Faraday Trans. 1 Phys. Chem. Condens. Phases, 1973, 69, 814.
Peover et al., The Formation of the Superoxide Ion by Electrolysis of Oxygen in Aprotic Solvents. Chem. Commun., 1965, 183.
Ren et al., What are functional ionic liquids for the absorption of acidic gases? J Phys Chem B. Feb. 28, 2013;117(8):2482-6. doi: 10.1021/jp311707e. Epub Feb. 12, 2013. Erratum in: J Phys Chem B. May 2, 2013;117(17):5394-5.
Riboldi et al., Evaluating Pressure Swing Adsorption as a CO2 separation technique in coal-fired power plants. Int. J. Greenh. Gas Control, 2015, 39, 1-16.
Roberts et al., Nucleophilic Oxygenation of Carbon Dioxide by Superoxide Ion in Aprotic Media To Form the C2062-Species. J. Am. Chem. Soc., 1984, 106, 4667-4670.
Sanz-Pérez et al., Direct Capture of CO2 from Ambient Air. Chem. Rev., 2016, 116, 11840-11876.
Scovazzo et al., Electrochemical separation and concentration of < 1% carbon dioxide from nitrogen. J. Electrochem. Soc 2003;150(5):D91-D98.
Simpson et al, Reactivity of Carbon Dioxide with Quinones. Electrochimica Acta, vol. 35, Issue 9, 1990, pp. 1399-1403.
Singh et al., Electrochemical Capture and Release of Carbon Dioxide Using a Disulfide-Thiocarbonate Redox Cycle. J Am Chem Soc. Jan. 25, 2017;139(3):1033-1036. doi: 10.1021/jacs.6b10806. Epub Jan. 11, 2017. PMID: 28052189.
Smith et al., Nitric oxide-releasing polymers containing the [N(O)NO]-group. J Med Chem. Mar. 1, 1996;39(5):1148-56.
Song et al., Polyanthraquinone as a Reliable Organic Electrode for Stable and Fast Lithium Storage. Angew Chem Int Ed Engl. Nov. 16, 2015;54(47):13947-51. doi:10.1002/anie.201506673. Epub Sep. 28, 2015.
Song et al., Towards sustainable and versatile energy storage devices: an overview of organic electrode materials. Energy Environ. Sci., 2013, 6, 2280-2301.
Stern et al., Post-combustion carbon dioxide capture using electrochemically mediated amine regeneration. Energy Environ. Sci., Jul. 2013;6(8):2505.
Vicari, Electrochemically-mediated membrane separations for carbon dioxide capture. Massachusetts Institute of Technology Dissertation. Jun. 2016.
Wilcox et al., Assessment of reasonable opportunities for direct air capture. Environ. Res. Lett., 2017, 12:065001.
Winnick et al., Carbon Dioxide Concentration for manned Spacecraft Using a Molten Carbonate Electrochemical Cell. AIChE J., 1982, 28:103-111.
Zheng et al., Investigation of phenolic ionic liquids as efficient nitric oxide absorbents. J Molec Liq. 2021; 338: 116559.
Zhou et al., Polyanthraquinone-based nanostructured electrode material capable of high-performance pseudocapacitive energy Storage in a protic electrolyte. Nano Energy, 2015, 15:654-661.
Zhu et al., Relationships between the Charge-Discharge Methods and the Performance of a Supercapacitive Swing Adsorption Module for CO2 Separation. J Physical Chemistry C 2018 122 (32), 18476-18483. DOI: 10.1021/acs.jpcc.8b03968.
Zhu et al., Relationships between the Elemental Composition of Electrolytes and the Supercapacitive Swing Adsorption of CO2. ACS Applied Energy Materials 2019 2 (10), 7449-7456. DOI: 10.1021/acsaem.9b01435.
Hall et al., Surface-Electrolyte Interphase Formation in Lithium-Ion Cells Containing Pyridine Adduct Additives. J Electrochem Soc. Feb. 17, 2016;163(5):A773. doi: 10.1149/2.1091605jes.
Jiang et al., Analysis of electrochemical CO2 concentrating process. J Zhejiang Univ Eng Sci. Jul. 2005;39(7):1072-6. doi: 10.3785/1008-973X.2005.07.1072.
Qiao et al., Mechanism of Electrochemical Capture of CO2 via Redox Cycle of 2-Amino-3-chloro-1, 4-naphthoquinone in BMIMBF4. Chem J Chinese Universities. Aug. 2019;40(8):1606-13. doi: 10.7503/cjcu20190096.
Yin et al., Electrochemical Reduction of CO2 Mediated by Quinone Derivatives: Implication for Li—CO2 Battery. J Phys Chem C. Feb. 26, 2018;122(12):6546-54. doi: 10.1021/acs.jpcc.8b00109.
Zhang, Progress in Activation of Small Molecules Promoted by Frustrated Lewis Pairs. Chinese J Organic Chem. Mar. 30, 2018:1292-318.
EP20857275.0, Sep. 29, 2023, Extended European Search Report.
PCT/US2020/048281, Dec. 20, 2020, International Search Report and Written Opinion.

* cited by examiner

Neutral
-0.02 V vs $Ag^+$

Anion
-1.52 V vs $Ag^{+}$

Dianion

Neutral
2,3-dicyano-1,4-naphthoquinone

Neutral
1,4-naphthoquinone

Semiquinone
2,3-dicyano-1,4-naphthoquinone

Semiquinone
1,4-naphthoquinone

Dianion
2,3-dicyano-1,4-naphthoquinone

Dianion
1,4-naphthoquinone

ELECTROCHEMICAL CAPTURE OF LEWIS ACID GASES

RELATED APPLICATIONS

This application is a continuation of U.S. application Ser. No. 17/508,411, filed Oct. 22, 2021, entitled "Electrochemical Capture of Lewis Acid Gases," which is a continuation of U.S. application Ser. No. 17/005,250, filed Aug. 27, 2020, entitled "Electrochemical Capture of Lewis Acid Gases," which claims priority under 35 U.S.C. § 119(e) to U.S. Provisional Application No. 62/892,975, filed Aug. 28, 2019, and entitled "Electrochemically Mediated Acid Gas Removal and Concentration," and to U.S. Provisional Application No. 62/988,851, filed Mar. 12, 2020, and entitled "Electrochemical Capture of Lewis Acid Gases," each of which is incorporated herein by reference in its entirety for all purposes.

TECHNICAL FIELD

Methods, apparatuses, and systems related to electrochemical capture of Lewis acid gases from fluid mixtures are generally described.

BACKGROUND

Efforts have been made to remove or separate gases from fluid mixtures. For example, over the last two decades there has been an effort to mitigate global warming by curbing anthropogenic carbon dioxide ($CO_2$) emission. A number of approaches, such as conventional thermal methods, have been pursued to tackle carbon dioxide capture at different stages of its production: either post combustion capturing at power plants, or concentrating it from the atmosphere, after which it is either pressurized and stored in geological formations, or it is converted to commercially useful chemical compounds. One alternative approach is electrochemical capture of gases using electroactive species. However, challenges may occur in removing or separating certain gases (e.g., carbon dioxide) in fluid mixtures containing multiple different types of gases (e.g., multiple types of Lewis acid gases).

Improved apparatuses, methods, and/or systems are desirable.

SUMMARY

Methods, apparatuses, and systems related to electrochemical capture of Lewis acid gases from fluid mixtures are generally described. Certain embodiments are related to electrochemical methods involving selectively removing a first Lewis acid gas from a fluid mixture containing multiple types of Lewis acid gases (e.g., a first Lewis acid gas and a second Lewis acid gas). Some embodiments are related to methods involving selective Lewis acid gas removal by bonding a first Lewis acid gas and a second Lewis acid gas to one or more reduced electroactive species and, subsequently, selectively releasing the second Lewis acid gas from the resulting complexes while releasing relatively little or none of the first Lewis acid gas from the complexes. Certain embodiments are related to electrochemical systems comprising certain types of electroactive species having certain redox states in which the species is capable of binding a first Lewis acid gas but for which binding with a second Lewis acid gas is thermodynamically and/or kinetically unfavorable. The methods, apparatuses, and systems described herein may be useful in carbon capture and pollution mitigation applications. The subject matter of the present invention involves, in some cases, interrelated products, alternative solutions to a particular problem, and/or a plurality of different uses of one or more systems and/or articles.

In one aspect, methods are described. In some embodiments, the method comprises applying a potential difference across an electrochemical cell, exposing a fluid mixture comprising a first Lewis acid gas and a second Lewis acid gas to the electrochemical cell, and removing an amount of the first Lewis acid gas from the fluid mixture during and/or after the applying the potential difference, wherein the method involves removing from the fluid mixture essentially none or less than or equal to 10% of the second Lewis acid gas present in the fluid mixture by mole percent.

In some embodiments, a method, comprises exposing a fluid mixture comprising a first Lewis acid gas and a second Lewis acid gas to one or more electroactive species in a reduced state; bonding an amount of the first Lewis acid gas to a first portion of the one or more electroactive species in the reduced state to form first Lewis acid gas-electroactive species complexes; bonding an amount of the second Lewis acid gas to a second portion of the one or more electroactive species in the reduced state to form second Lewis acid gas-electroactive species complexes; and oxidizing at least some of the second Lewis acid gas-electroactive species complexes such that an amount of the second Lewis acid gas is released from the second Lewis acid gas-electroactive species complexes while releasing essentially none of the first Lewis acid gas from the first Lewis acid gas-electroactive species complexes or releasing an amount of the first Lewis acid gas from the first Lewis acid gas-electroactive species complexes that is less than or equal to 10% of the first Lewis acid gas-electroactive species complexes by mole percent.

In another aspect, electrochemical apparatuses are described. In some embodiments, the electrochemical apparatus comprises a chamber comprising a negative electrode in electronic communication with an electroactive species, the chamber constructed to receive a fluid mixture, wherein, in at least one conductive medium, the electroactive species has an oxidized state and at least one reduced state in which the electroactive species is capable of bonding with a first Lewis acid gas, but for which a reaction with a second Lewis acid gas comprising one or more species chosen from carbon dioxide, nitrogen oxides, $R_3B$, or $R_2S$ is thermodynamically and/or kinetically unfavorable at at least one temperature, wherein each R is independently H, branched or unbranched C1-C8 alkyl, aryl, cyclyl, heteroaryl, or heterocyclyl. In some embodiments, the electroactive species has at least one reduced state in which the electroactive species is capable of bonding with a first Lewis acid gas, but for which a reaction with a second Lewis acid gas comprising one or more species chosen from carbon dioxide, nitrogen oxides, a borane, or hydrogen sulfide ($H_2S$) is thermodynamically and/or kinetically unfavorable at at least one temperature greater than or equal to 223 K and less than or equal to 573 K.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

The figures are described in-line with the text below.

DETAILED DESCRIPTION

Figure 1A:
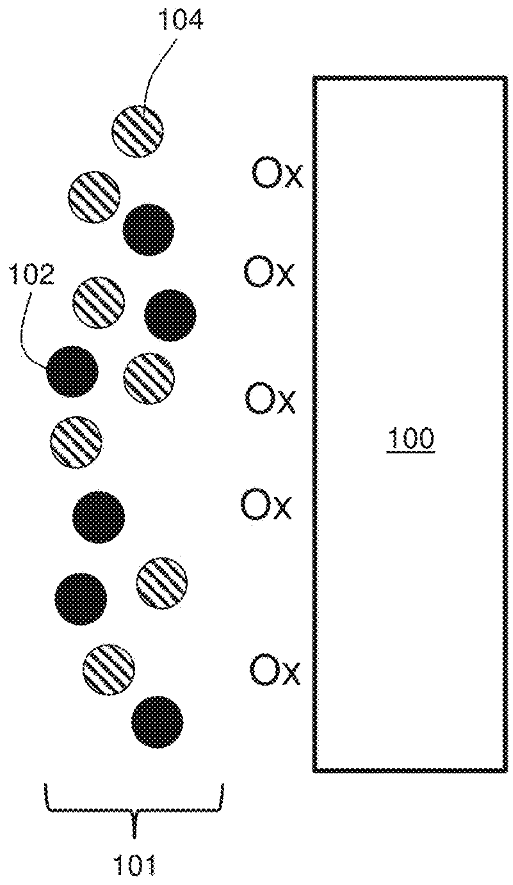
FIGS. 1A-1B are schematic illustrations of an exemplary process for removing first Lewis acid gas from a fluid mixture comprising the first Lewis acid gas and a second Lewis acid gas, according to one or more embodiments.

Methods, apparatuses, and systems related to electrochemical capture of Lewis acid gases from fluid mixtures are generally described. Certain embodiments are related to electrochemical methods involving selectively removing a first Lewis acid gas (e.g., sulfur dioxide) from a fluid mixture containing multiple types of Lewis acid gases (e.g., a first Lewis acid gas and a second Lewis acid gas (e.g., carbon dioxide)). Some embodiments are related to methods involving selective Lewis acid gas removal by bonding a first Lewis acid gas (e.g., sulfur dioxide) and a second Lewis acid gas (e.g., carbon dioxide) to one or more reduced electroactive species and, subsequently, selectively releasing the second Lewis acid gas (e.g., via oxidation of a second Lewis acid gas-electroactive species complex) from the resulting complexes while releasing relatively little or none of the first Lewis acid gas from the complexes. Certain embodiments are related to electrochemical systems comprising certain types of electroactive species having certain redox states in which the species is capable of binding a first Lewis acid gas but for which binding with a second Lewis acid gas is thermodynamically and/or kinetically unfavorable. The methods, apparatuses, and systems described herein may be useful in carbon capture and pollution mitigation applications.

Removal and/or separation of Lewis acid gases in fluid mixtures is an important process in a number of applications, including industry and power generation. As an example, sulfur dioxide ($SO_2$) emissions are conventionally curtailed in industrial applications via flue-gas desulfurization (FGD), which relies on large absorber contact towers (scrubbers) which have large footprints and a large balance of plant. Moreover, many other applications exist where it can be desirable to remove combustion exhaust or other industrial gas streams where Lewis acid gases such as $SO_2$, either for avoiding complications with downstream processes or for other reasons, such as pollution mitigation. For example, the international Maritime Organization (IMO) has imposed a sulfur cap that went in effect in January 2020. Many ships are currently being retrofitted with convention scrubbers, but small vessels cannot accommodate such chemical plants on-board. Therefore, there is a need for compact and efficient Lewis acid gas capture systems. Electrochemically-mediated capture of gases may be one route toward capturing Lewis acid gases (e.g., by electrochemically generating active states of electroactive species that can bind the targeted gases). However, as a complicating factor, many fluid mixtures (e.g., gas effluents) comprise multiple Lewis acid gas species, and it can be desirable to selectively remove a first Lewis acid gas while removing essentially none or relatively little of the other Lewis acid gases. As one example, combustion products often comprise carbon dioxide and sulfur-containing gases such as $SO_2$. It has been realized in the context of the present disclosure that certain existing electroactive species in electrochemical systems may react with both the first Lewis acid gases and the other Lewis acid gases, which can be problematic. For carbon capture systems designed to remove carbon dioxide from the gas mixture, the presence of sulfur dioxide can pose problems for efficiency and capacity because the sulfur dioxide may compete with the carbon dioxide for binding to the electroactive species. It has been discovered in the context of the present disclosure that certain methods and systems can be used to selectively bind certain Lewis acid gases over others (e.g., via judicious choice of electroactive species and/or operating conditions).

Figure 1B:
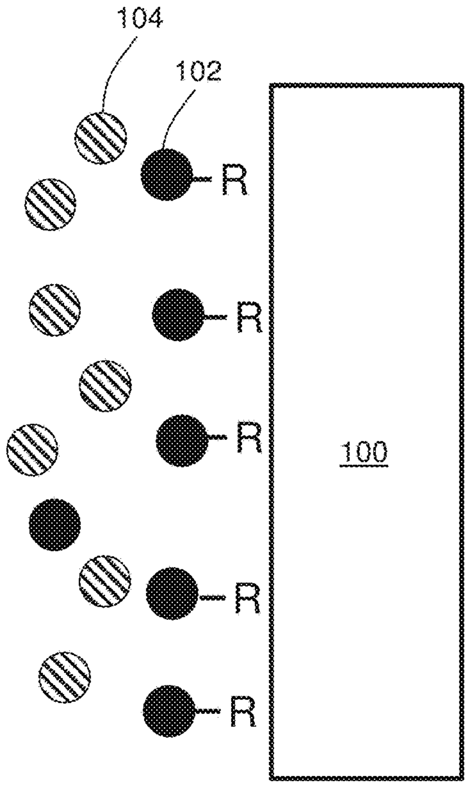

In one aspect, methods are described. Some embodiments involve methods for electrochemical partial or complete removal and/or separation of Lewis acid gases in fluid. Some embodiments comprise applying a potential difference across an electrochemical cell and exposing a fluid mixture comprising a first Lewis acid gas and a second Lewis acid gas to the electrochemical cell. FIGS. 1A-1B depict one such embodiment, where fluid mixture 101 comprising first Lewis acid gas 102 and second Lewis acid gas 104 is exposed to electrochemical cell 100. The term "electrochemical cell" is intended to include apparatuses that meet these criteria even where the behavior of the cell could arguably be characterized as more pseudocapacitive than Faradaic and thus might otherwise be referred to as a type of capacitor.

Applying a potential difference across the electrochemical cell may cause an amount of the first Lewis acid gas to be removed from the fluid mixture during and/or after application of the potential difference. For example, referring again to FIGS. 1A-1B, in the absence of the potential difference, electrochemical cell 100 may be in electronic communication with electroactive species in an oxidized state Ox that does not bind with the first Lewis acid gas (FIG. 1A). Applying a potential difference across electrochemical cell 100 may convert the electroactive species into a reduced state R that reacts (e.g., via binding) with first Lewis acid gas 102 (FIG. 1B), according to some embodiments. It should be understood that while FIGS. 1A-1B show fluid mixture 101 exposed to electrochemical cell 100 with the electroactive species in oxidized state Ox, some embodiments comprise applying the potential difference across electrochemical cell 100 prior to exposing it to fluid mixture 101, such that at least one reduced state (e.g., R) of the electroactive species is generated prior to exposure to fluid mixture 101.

In some embodiments, the method involves removing from the fluid mixture essentially none or relatively little of the second Lewis acid gas present in the fluid mixture by mole percent. For example, referring again to FIG. 1B, essentially none of second Lewis acid gas 104 is removed from fluid mixture 101 upon application of the potential difference across electrochemical cell 100 (e.g., removed by reacting with reduced state R of the electroactive species generated by the application of the potential difference, in contrast to first Lewis acid gas 102). In some instances, removing essentially none or relatively little of a second Lewis acid gas from a fluid mixture comprising a first Lewis acid gas and the second Lewis acid gas may be beneficial if it is desired to produce a fluid mixture relatively free of the first Lewis acid gas. As one non-limiting example, a fluid mixture may comprise carbon dioxide ($CO_2$) and sulfur dioxide ($SO_2$), but it is desired for the fluid mixture to contain only $CO_2$ (e.g., for a downstream carbon capture process). Therefore, in some embodiments, applying a potential difference to an electrochemical cell and exposing the fluid mixture to the electrochemical cell may result in removal of an amount (or all) of the $SO_2$ while removing essentially none or relatively little of the $CO_2$. The reduced concentration of $SO_2$ in the fluid mixture after the performance of such a method may increase the efficiency and/or capacity of a downstream process involving the fluid mixture.

Removing an amount of the first Lewis acid while removing essentially none or relatively little of the second Lewis acid may be accomplished according any of the variety of techniques described in the present disclosure (alone or in combination). For example, removing an amount of the first Lewis acid gas while removing essentially none or relatively little of the second Lewis acid may comprise exposing a fluid mixture comprising the first Lewis acid gas and second Lewis acid gas to conditions configured such that the first Lewis acid gas bonds with an electroactive species but the second Lewis acid gas does not bond with the electroactive species (e.g., due to thermodynamic unfavorability or kinetic reasons). In some embodiments, the conditions are configured such that both the first Lewis acid gas and second Lewis acid gas can bond with an electroactive species, but the first Lewis acid gas has a greater affinity (as measured by an equilibrium binding constant under the operative conditions) for the electroactive species than does the second Lewis acid gas. Some such configurations may result in the second Lewis acid gas (e.g., carbon dioxide) bonding to an electroactive species reversibly and the first Lewis acid gas bonding to the electroactive species irreversibly such that the first Lewis acid gas outcompetes and/or displaces the second Lewis acid gas. A net result of such reactivity is an amount of the first Lewis acid gas being removed from the fluid mixture while relatively little or none of the first Lewis acid gas is removed, despite formation of first Lewis acid gas-electroactive species complexes during at least some of the overall process. As yet another format, removal of the first Lewis acid gas may occur by bonding the first Lewis acid gas and the second Lewis acid gas (e.g., carbon dioxide) to one or more reduced electroactive species and, subsequently, selectively releasing the second Lewis acid gas (e.g., via oxidation of a second Lewis acid gas-electroactive species complex or a change in temperature) from the complexes while releasing relatively little or none of the first Lewis acid gas from the complexes.

In some embodiments, the method involves removing an amount of the first Lewis acid from the fluid mixture and removing from the fluid mixture less than or equal to 10%, less than or equal to 5%, less than or equal to 1%, less than or equal to 0.5%, less than or equal to 0.1%, less than or equal to 0.05%, less than or equal to 0.01%, less than or equal to 0.001%, and/or as little as 0.0001%, as little as 0.00001% or less of the second Lewis acid gas present in the fluid mixture by mole percent. In some embodiments, the method involves removing from the fluid mixture less than or equal to 10%, less than or equal to 5%, less than or equal to 1%, less than or equal to 0.5%, less than or equal to 0.1%, and/or as low as 0.05%, as low as 0.01%, as low as 0.001%, and/or as little as 0.0001%, as little as 0.00001% or less of the second Lewis acid gas present in the fluid mixture by volume percent. In some embodiments, essentially none (e.g., none or a negligible amount with respect to the purpose of the fluid mixture such as carbon capture or purified gas production) of the second Lewis acid gas is removed during the performance of the method.

The potential difference applied across the electrochemical cell may be performed in a charge mode. In the charge mode, a redox half reaction takes place at the negative electrode in which the electroactive species of the negative electrode is reduced. The potential difference applied across the electrochemical cell, during a charge mode, may have a particular voltage. The potential difference applied across the electrochemical cell may depend, for example, on the standard reduction potential for the generation of at least one reduced state of the electroactive species, as well as the standard reduction potential for the interconversion between a reduced state and an oxidized state of a second electroactive species, when present. In some embodiments, the potential difference is at least 0 V, at least 0.1 V, at least 0.2 V, at least 0.5 V, at least 0.8 V at least 1.0 V, at least 1.5 V, or higher. In some embodiments, the potential difference is less than or equal to 2.0 V, than or equal to 1.5 V, than or equal to 1.0 V, less than or equal to 0.5 V, or less. Combinations of these voltages are also possible. For example, in some embodiments, the potential difference applied across the electrochemical cell is at least 0.5 V and less than or equal to 2.0 V. Other values are also possible.

The potential difference applied across the electrochemical cell may be performed in a discharge mode. In the discharge mode, a redox half takes place at the negative electrode in which the electroactive species of the negative electrode is oxidized. The potential difference across the electrochemical cell, during a discharge mode, may have a particular voltage. For example, in some embodiments, the potential difference may be less than 0 V, less than or equal to −0.5 V, less than or equal to −1.0 V, or less than or equal to −1.5 V. In some embodiments, the potential difference may be at least −2.0 V, at least −1.5 V, at least −1.0 V or at least −0.5 V. Combinations of these voltages are also possible, for example, at least −2.0 V and less than or equal to −0.5 V. Other values are also possible.

The fluid mixture that is exposed to the electrochemical cell may come in any of a variety of forms and compositions. In some embodiments, the fluid mixture is a gas mixture. For example, fluid mixture 101 in FIGS. 1A-1B is a gas mixture comprising first Lewis acid gas 102 and second Lewis acid gas 104 upon exposure to electrochemical cell 100, in accordance with some embodiments. In some embodiments, the fluid mixture is a liquid mixture. For example, fluid mixture 101 in FIGS. 1A-1B is a liquid mixture comprising a liquid (e.g., solvent) in which first Lewis acid gas 102 and second Lewis acid gas are present (e.g., dissolved), according to some embodiments. The liquid may be any of a variety of liquids, such as water or an organic liquid (e.g., N,N-dimethylformamide, liquid quinones), an ionic liquid, a eutectic mixture of organic material that are liquids at certain combinations, and combinations thereof. One example of liquid quinones that may be suitable for the methods and systems herein is a liquid mixture of benzoquinone and a second quinone such as a naphthoquinone as is described in Shimizu A, Takenaka K, Handa N, Nokami T, Itoh T, Yoshida J I. Liquid Quinones for Solvent-Free Redox Flow Batteries. *Advanced Materials.* 2017 November; 29(41): 1606592, which is incorporated by reference herein for all purposes. In some embodiments, the liquid of the fluid mixture comprises a carbonate ester. For example, in some embodiments, the liquid comprises dimethyl carbonate, diethyl carbonate, ethyl-methyl carbonate, ethylene carbonate, propylene carbonate, or combinations thereof.

As mentioned above, the fluid mixture may comprise a first Lewis acid gas. A Lewis acid gas generally refers to a gaseous species able to accept an electron pair from an electron pair donor (e.g., by having an empty orbital energetically accessible to the electron pair of the donor). In some instances, the $pK_a$ of a Lewis acid gas is lower than that of an electroactive species of the electrode, when present, in one or more of its reduced states. For example, in some instances the electroactive species comprises an optionally-substituted quinone having a semiquinone reduced state with a $pK_a$, and gases having a lower $pK_a$ than that semiquinone would be considered a Lewis acid gas in those instances. In some embodiments, the first Lewis acid gas is a gas chosen from sulfur dioxide ($SO_2$), sulfur oxides ($SO_X$), nitrogen oxides ($NO_x$), $R_2S$, carbonyl sulfide (COS), $R_3B$, boron trifluoride ($BF_3$), or a combination thereof, wherein each R is independently H, branched or unbranched C1-C8 alkyl, aryl, cyclyl, heteroaryl, or heterocyclyl. In some embodiments, $R_2S$ is hydrogen sulfide ($H_2S$). In some embodiments, $R_3B$ is a borane. One example of a borane is $BH_3$. For example, in some instances the electroactive species comprises an optionally-substituted quinone having a semiquinone reduced state with a $pK_a$, and gases having a lower $pK_a$ than that semiquinone would be considered a Lewis acid gas in those instances. In some embodiments, the first Lewis acid gas is a gas chosen from sulfur dioxide ($SO_2$), sulfur oxides ($SO_X$), nitrogen oxides ($NO_x$), $R_2S$, carbonyl sulfide (COS), $R_3B$, boron trifluoride ($BF_3$), or a combination thereof, wherein each R is independently H, branched or unbranched C1-C8 alkyl, aryl, cyclyl, heteroaryl, or heterocyclyl. In some embodiments, the first Lewis acid gas is a gas chosen from sulfur dioxide ($SO_2$), sulfur oxides ($SO_x$), nitrogen oxides ($NO_x$), hydrogen sulfide ($H_2S$), carbonyl sulfide (COS), borane ($BH_3$), boron trifluoride ($BF_3$), or a combination thereof. It should be understood that in this context, the first Lewis acid gas being a combination of two or more species refers to a mixture containing each of the two or more species, not a chemical product formed (e.g., addition product) by a reaction between the two or more species. One of ordinary skill in the art, with the benefit of this disclosure would understand applicable $SO_x$ and $NO_x$ Lewis acid gases, and that the "x" in these formulae refer to a variable stoichiometric coefficient. In some embodiments, the first Lewis acid is a species for which removal is desirable. For example, in certain carbon capture applications, sulfur-containing gases such as $SO_2$ may be present in fluid streams (e.g., gas effluent). The sulfur-containing gases may interfere with carbon capture methods (e.g., by competing with adsorbent materials). Therefore, removing the sulfur-containing species from the fluid mixture may improve the carbon capture process.

In some embodiments, the concentration of the first Lewis acid gas in the fluid mixture (e.g., prior to the application of the potential difference) is relatively high. In some embodiments, the concentration of the first Lewis acid gas in the fluid mixture (e.g., prior to the application of the potential difference) is greater than or equal to 0.00001 mole percent (mol %), greater than or equal to 0.0001 mol %, greater than or equal to 0.001 mol %, greater than or equal to 0.01 mole percent (mol %), greater than or equal to 0.1 mol %, greater than or equal to 0.5 mol %, greater than or equal to 1 mol %, greater than or equal to 5 mol %, greater than or equal to 10 mol %, greater than or equal to 25 mol %, greater than or equal to 50 mol %, greater than or equal to 75 mol %, greater than or equal to 90 mol %, or greater. In some embodiments, the concentration of the first Lewis acid gas in the fluid mixture (e.g., prior to the application of the potential difference) is less than or equal to 99 mol %, less than or equal to 95 mol %, less than or equal to 90 mol %, less than or equal to 75 mol %, less than or equal to 50 mol %, less than or equal to 25 mol %, less than or equal to 10 mol %, less than or equal to 5 mol %, less than or equal to 2 mol %, less than or equal to 1 mol %, or less. Combinations (e.g., greater than or equal to 0.01 mol % and less than or equal to 99 mol %) are possible. Another possible combination is greater than or equal to 0.00001 mol % and less than or equal to 99 mol %.

In some embodiments, the concentration of the first Lewis acid gas in the fluid mixture (e.g., prior to the application of the potential difference) is greater than or equal to 0.01 volume percent (vol %), greater than or equal to 0.1 vol %, greater than or equal to 0.5 vol %, greater than or equal to 1 vol %, greater than or equal to 5 vol %, greater than or equal to 10 vol %, greater than or equal to 25 vol %, greater than or equal to 50 vol %, greater than or equal to 75 vol %, greater than or equal to 90 vol %, or greater. In some embodiments, the concentration of the first Lewis acid gas in the fluid mixture (e.g., prior to the application of the potential difference) is less than or equal to 99 vol %, less than or equal to 95 vol %, less than or equal to 90 vol %, less than or equal to 75 vol %, less than or equal to 50 vol %, less than or equal to 25 vol %, less than or equal to 10 vol %, less than or equal to 10 vol %, less than or equal to 5 vol %, less than or equal to 2 vol %, less than or equal to 1 vol %, or less. Combinations (e.g., greater than or equal to 0.01 vol % and less than or equal to 99 vol %) are possible.

In some embodiments, the fluid mixture comprises a second Lewis acid gas. In some embodiments, the second Lewis acid gas comprises one or more species chosen from carbon dioxide, nitrogen oxides, $R_3B$, or $R_2S$, wherein each R is independently H, branched or unbranched C1-C8 alkyl, aryl, cyclyl, heteroaryl, or heterocyclyl. In some embodiments, the second Lewis acid gas comprises one or more species chosen from carbon dioxide, nitrogen oxides, a borane, or $H_2S$. As mentioned above, in some embodiments the second Lewis acid gas is carbon dioxide and the fluid mixture is desired to undergo a carbon capture process or a purification process (to produce substantially pure carbon dioxide, e.g., for carbon sequestration). In some embodiments, $R_2S$ is hydrogen sulfide ($H_2S$). The methods described herein involving removing an amount of the first Lewis acid gas while removing essentially none or relatively little of any of the second Lewis acid gas (e.g., carbon dioxide) present in the fluid mixture may be beneficial for some such applications. It should be understood that in some embodiments, the fluid mixture comprises the first Lewis acid gas (e.g., $SO_2$) and two or more other gaseous Lewis acid species (e.g., $CO_2$ and $NO_3$), and it is desired to remove an amount of the $SO_2$ while removing essentially none or relatively little of the two or more other gaseous Lewis acid species (e.g., $CO_2$ and $NO_3$). Another example of a Lewis acid gas that may be included in the second Lewis acid gas is $NO_2$. In such embodiments, the second Lewis acid gas is considered to be the combination (as a mixture) of the two or more other Lewis acid gases (e.g., $CO_2$ and the $NO_3$). A further downstream step in which an amount of the one of the two or more other Lewis acid gases (e.g., $NO_3$) is removed (e.g., electrochemically) from the product fluid stream while removing essentially none or relatively little of the other of the two or more other Lewis acid gases (e.g., $CO_2$) may then be performed. In some instances, the methods described herein involve removal of a sulfur-containing Lewis acid gas while removing essentially none or relatively little of a second, different sulfur-containing Lewis acid gas. For instance, in some embodiments the first Lewis acid gas is $SO_2$ and the second Lewis acid gas is $H_2S$, and the method comprises removing an amount of the $SO_2$ while removing essentially none or relatively little $H_2S$ from the fluid mixture. As yet another example, in some instances the methods described herein involve removal of a first borane while removing essentially none or relatively little of a second, different borane. For instance, in some embodiments the first Lewis acid gas is $BH_3$ and the second Lewis acid gas is $BF_3$, and the method comprises removing an amount of the $BH_3$ while removing essentially none or relatively little $BF_3$ from the fluid mixture.

In some embodiments, the concentration of the second Lewis acid gas in the fluid mixture (e.g., prior to the application of the potential difference) is relatively high. In some embodiments, the concentration of the second Lewis acid gas in the fluid mixture (e.g., prior to the application of the potential difference) is greater than or equal to 0.01 mole percent (mol %), greater than or equal to 0.1 mol %, greater than or equal to 0.5 mol %, greater than or equal to 1 mol %, greater than or equal to 5 mol %, greater than or equal to 10 mol %, greater than or equal to 25 mol %, greater than or equal to 50 mol %, greater than or equal to 75 mol %, greater than or equal to 90 mol %, or greater. In some embodiments, the concentration of the second Lewis acid gas in the fluid mixture (e.g., prior to the application of the potential difference) is less than or equal to 99 mol %, less than or equal to 95 mol %, less than or equal to 90 mol %, less than or equal to 75 mol %, less than or equal to 50 mol %, less than or equal to 25 mol %, less than or equal to 10 mol %, less than or equal to 5 mol %, less than or equal to 2 mol %, less than or equal to 1 mol %, or less. Combinations (e.g., greater than or equal to 0.01 mol % and less than or equal to 99 mol %) are possible.

In some embodiments, the concentration of the second Lewis acid gas in the fluid mixture (e.g., prior to the application of the potential difference) is greater than or equal to 0.01 volume percent (vol %), greater than or equal to 0.1 vol %, greater than or equal to 0.5 vol %, greater than or equal to 1 vol %, greater than or equal to 5 vol %, greater than or equal to 10 vol %, greater than or equal to 25 vol %, greater than or equal to 50 vol %, greater than or equal to 75 vol %, greater than or equal to 90 vol %, or greater. In some embodiments, the concentration of the second Lewis acid gas in the fluid mixture (e.g., prior to the application of the potential difference) is less than or equal to 99 vol %, less than or equal to 95 vol %, less than or equal to 90 vol %, less than or equal to 75 vol %, less than or equal to 50 vol %, less than or equal to 25 vol %, less than or equal to 10 vol %, less than or equal to 10 vol %, less than or equal to 5 vol %, less than or equal to 2 vol %, less than or equal to 1 vol %, or less. Combinations (e.g., greater than or equal to 0.01 vol % and less than or equal to 99 vol %) are possible.

In some embodiments, a relatively large amount of the first Lewis acid gas is removed from the fluid mixture during the processes described herein. Removing a relatively large amount of the first Lewis acid gas may, in some cases, be beneficial for any of a variety of applications, such as capturing gases that may be deleterious if released into the atmosphere for environmental reasons, or deleterious to a downstream process for the fluid mixture (e.g., carbon capture). In some embodiments the amount of first Lewis acid gas in a treated fluid mixture (e.g., a fluid mixture from which an amount of the first Lewis acid gas is removed upon being exposed to the electrochemical cell) is less than or equal to 50%, less than or equal to 25%, less than or equal to 10%, less than or equal to 5%, less than or equal to 2%, less than or equal to 1%, less than or equal to 0.5%, less than or equal to 0.1% or less of the amount (in volume percent) of the first Lewis acid gas in the original fluid mixture prior to treatment (e.g., the amount of the target in the fluid mixture prior to being exposed to electrochemical cell). In some embodiments, the amount of first Lewis acid gas in a treated fluid mixture is greater than or equal to 0.001%, greater than 0.005%, greater than or equal to 0.01%, greater than or equal to 0.05%, greater than or equal to 0.1%, greater than or equal to 0.5%, greater than or equal to 1%, greater than or equal to 2%, greater than or equal to 5%, or greater of the amount (in volume percent) of the first Lewis acid gas in the original fluid mixture prior to treatment.

In some embodiments the amount of first Lewis acid gas in a treated fluid mixture (e.g., a fluid mixture from which an amount of the first Lewis acid gas is removed upon being exposed to the electrochemical cell) is less than or equal to 50%, less than or equal to 25%, less than or equal to 10%, less than or equal to 5%, less than or equal to 2%, less than or equal to 1%, less than or equal to 0.5%, less than or equal to 0.1% or less of the amount (in mole percent) of the first Lewis acid gas in the original fluid mixture prior to separation (e.g., the amount of the target in the fluid mixture prior to being exposed to electrochemical cell). In some embodiments, the amount of first Lewis acid gas in a treated fluid mixture is greater than or equal to 0.001%, greater than 0.005%, greater than or equal to 0.01%, greater than or equal to 0.05%, greater than or equal to 0.1%, greater than or equal to 0.5%, greater than or equal to 1%, greater than or equal to 2%, greater than or equal to 5%, or greater of the amount (in mole percent) of the first Lewis acid gas in the original fluid mixture prior to treatment.

As mentioned above, certain electroactive species may be used during the methods described herein for removing an amount of the first Lewis acid gas while removing essentially none or relatively little of the second Lewis acid gas. As used herein, an electroactive species generally refers to an agent (e.g., chemical entity) which undergoes oxidation or reduction upon exposure to an electrical potential in an electrochemical cell. It should be understood, however, that while electroactive species may undergo electrical potential-induced oxidation and reduction reactions, it may also be possible to induce changes in oxidation state chemically (e.g., via exposure to a chemical reductant or chemical oxidant in solution or at a surface). In some, but not necessarily all embodiments, an electrode comprises the electroactive species. It should be understood that when an electrode comprises an electroactive species, the electroactive species may be located at a surface of the electrode, in at least a portion of the interior of the electrode (e.g., in pores of the electrode), or both. For example, referring to FIG. 2, in some embodiments, electrochemical cell 100 comprises negative electrode 110, and negative electrode 110 comprises an electroactive species. The electroactive species may be on or near surface negative electrode 110, the electroactive species may be in the interior of at least a portion of negative electrode 110, or a combination of the both. In some embodiments, some or all of the electroactive species is not a part of an electrode. Instead, in some embodiments, the electroactive species is present in a conductive medium, such as an electrolyte (e.g., a liquid electrolyte solution). In some such embodiments, the electroactive species can freely diffuse in a conductive medium (e.g., dissolved in conductive liquid such as a liquid electrolyte solution).

As used herein, a negative electrode of an electrochemical cell refers to an electrode into which electrons are injected during a charging process. For example, referring to FIG. 2, when electrochemical cell 100 is charged (e.g., via the application of a potential by an external power source), electrons pass through an external circuit (not shown) and into negative electrode 110. As such, in some cases, species in electronic communication with the negative electrode can be reduced to a reduced state (a state having an increased number of electrons) during a charging process of the electrochemical cell.

The electroactive species may, in at least one conductive medium, have an oxidized state (having fewer electrons than the reduced state) and at least one reduced state (having more electrons than the oxidized state). As a non-limiting example, if the electroactive species is an optionally-substituted quinone, the neutral quinone would be considered the oxidized state, the semiquinone (product of the addition of one electron to the neutral quinone) would be considered one reduced state, and the quinone dianion (the product of the addition of one electron to neutral quinone) would be considered another reduced state.

In some embodiments, the electroactive species has, in at least one conductive medium, at least one reduced state in which the species is capable of bonding with the first Lewis acid gas (e.g. $SO_2$). A species being capable of bonding with a first Lewis acid gas generally refers to an ability for the species to undergo a bonding reaction with the first Lewis acid gas to a significant enough extent and at a rate significant enough for a useful gas capture and/or separation process to occur. For example, a species capable of bonding with a first Lewis acid gas may having a binding constant with the first Lewis acid gas of greater than or equal to $10^1$ $M^{-1}$, greater than or equal to $10^2$ $M^{-1}$, and/or up to $10^3$ $M^{-1}$, or higher at room temperature (23° C.). A species capable of bonding with a first Lewis acid gas may be able to bond with the first Lewis acid gas on a timescale of on the order of minutes, on the order of seconds, on the order of milliseconds, or as low as on the order of microseconds or less. A species may be capable of bonding with a Lewis acid gas at at least one temperature (e.g., at least one temperature greater than or equal to 223 K and less than or equal to 573K, such as at 298 K). In some embodiments, the species is capable of bonding with a Lewis acid gas at a first temperature but bonding with the Lewis acid gas at a second temperature is thermodynamically and/or kinetically unfavorable. Such a temperature dependence may be based on a temperature dependence of a change in Gibbs free energy between the species (e.g., reduced quinone) and the Lewis acid gas (e.g., carbon dioxide). With the insight and guidance of this disclosure, one of ordinary skill in the art would be able to select an appropriate temperature for promoting bonding between the species in its at least one reduced state and the Lewis acid gas (e.g., the first Lewis acid gas).

In some embodiments, the electroactive species has, in at least one conductive medium, an oxidized state in which it is capable of releasing bonded first Lewis acid gas. The electroactive species may be chosen such that in at least one reduced state it has a strong affinity for the Lewis acid gas for the particular application for which it is intended. For example, in some embodiments, where $SO_2$ is the first Lewis acid gas, the chosen electroactive species may have a binding constant with $SO_2$ of $10^1$ to $10^3$ $M^{-1}$. In some embodiments, the chosen electroactive species may have a binding constant with a different first Lewis acid gas of $10^1$ to $10^3$ $M^{-1}$. It has been observed that some, but not all quinones can be used as suitable electroactive species. In some embodiments, in the presence of $SO_2$, an optionally-substituted quinone may be reduced to its semiquinone or dianion (e.g., in a single step or multiple steps), which then binds to $SO_2$ forming a complex. Other electroactive species that can form a covalent bond with the first Lewis acid gas ($SO_2$), upon reduction may also be used.

In some embodiments, the electroactive species has, in at least one conductive medium, at least one reduced state in which the species is capable of bonding with the first Lewis acid gas, but for which there is at least one temperature (e.g., 298 K) at which it is thermodynamically unfavorable for the species to react with a second Lewis acid gas. In some embodiments, the electroactive species has at least one reduced state in which the species is capable of bonding with the first Lewis acid gas, but for which it is thermodynamically unfavorable for the species to react with the second Lewis acid gas at at least one temperature in a range of greater than or equal to 223 K, greater than or equal to 248 K, greater than or equal to 273 K, greater than or equal to 298 K, and/or up to 323 K, up to 348 K, up to 373 K, up to 398 K, up to 423 K, up to 448 K, up to 473 K, up to 498 K, up to 523 K, up to 548 K, up to 573 K or higher. In some embodiments, the electroactive species has at least one reduced state in which the species is capable of bonding with the first Lewis acid gas, but for it is thermodynamically unfavorable for the species to react with the second Lewis acid gas at a temperature of 298 K. It should be understood that a reaction being thermodynamically unfavorable at a given temperature, as used herein, refers to the reaction having a positive change in Gibbs free energy ($\Delta G_{rxn}$) at that temperature. For example, the reaction between the species in the at least one reduced state and the second Lewis acid gas (e.g., $CO_2$) may have a change in Gibbs free energy ($\Delta G_{rxn}$) of greater than 0 kcal/mol, greater than or equal to +0.1 kcal/mol, greater than or equal to +0.5 kcal/mol, greater than or equal to +1 kcal/mol, greater than or equal to +2 kcal/mol, greater than or equal to +3 kcal/mol, greater than or equal to +5 kcal/mol, and/or up to +8 kcal/mol, up to +10 kcal/mol, up to +20 kcal/mol, or more at at least one temperature in a range of greater than or equal to 223 K, greater than or equal to 248 K, greater than or equal to 273 K, greater than or equal to 298 K, and/or up to 323 K, up to 348 K, up to 373 K, up to 473 K, up to 573 K, or higher. In some embodiments, the reaction between the species in the at least one reduced state and the second Lewis acid gas (e.g., $CO_2$) has a change in Gibbs free energy ($\Delta G_{rxn}$) of greater than 0 kcal/mol, greater than or equal to +0.1 kcal/mol, greater than or equal to +0.5 kcal/mol, greater than or equal to +1 kcal/mol, greater than or equal to +2 kcal/mol, greater than or equal to +3 kcal/mol, greater than or equal to +5 kcal/mol, and/or up to +8 kcal/mol, up to +10 kcal/mol, up to +20 kcal/mol, or more at a temperature of 298 K.

In certain cases, the electroactive species has, in at least one conductive medium, at least one reduced state in which the species is capable of bonding with the first Lewis acid gas, but for which there is at least one temperature (e.g., 298 K) at which it is kinetically unfavorable for the species to bond with the second Lewis acid gas because a rate for the reaction is too low for a reaction to occur on a timescale commensurate with the characteristic timescale for the process/process step (e.g., gas capture), such as microseconds, milliseconds, seconds, or minutes. It has been realized that such a kinetic selectivity can be achieved in a variety of ways, including functionalizing electroactive species with certain substituents. For example, the electroactive species may be functionalized with bulky substituents (e.g., tert-butyl moieties) such that steric hindrance impedes reaction of the second Lewis acid gas with the species to a greater extent than it impedes reaction of the first Lewis acid gas with the species.

In some embodiments in which the electroactive species has at least one reduced state in which the species is capable of bonding with the first Lewis acid gas, but for which there is at least one temperature (e.g., 298 K) at which it is kinetically unfavorable for the species to bond with the second Lewis acid gas, a ratio of the rate constant for the reaction of the first Lewis acid gas with the species to the rate constant for the reaction of the second Lewis acid gas is greater than or equal to 2, greater than or equal to 5, greater than or equal to 10, greater than or equal to 50, greater than or equal to 100, and/or up to 500, up to 1000, or greater. In some embodiments in which the electroactive species has at least one reduced state in which the species is capable of bonding with the first Lewis acid gas, but for which there is at least one temperature (e.g., 298 K) at which it is kinetically unfavorable for the species to bond with the second Lewis acid gas, a ratio of the timescale of the reaction of the first Lewis acid gas with the species to the timescale of the second Lewis acid gas is greater than or equal to 2, greater than or equal to 5, greater than or equal to 10, greater than or equal to 50, greater than or equal to 100, and/or up to 500, up to 1000, or greater. A ratio of the timescales of reactions of the first Lewis acid gas with the species and the second Lewis acid gas with the species can be determined by measuring the time to 50% completion for each reaction, each reaction taking place under otherwise essentially identical conditions (same initial concentrations of gas, same temperature same concentration, same reaction medium (e.g., solvent and supporting electrolyte if present), same mixing rate, same concentration and/or accessible surface area of electroactive species, etc.). One of ordinary skill in the art, with the benefit of this disclosure, would be able to determine whether a reaction between a species and a Lewis acid gas is thermodynamically and/or kinetically favorable or unfavorable using, for example, cyclic voltammetry in the conductive medium (with the conductive medium saturated with the Lewis acid gas).

It is believed that the $pK_a$ of the electroactive species in its reduced states may contribute at least in part to control of the selectivity of the species with respect to the first Lewis acid gas and the second Lewis acid gas. In some embodiments, in the at least one reduced state the electroactive species comprises a moiety having a $pK_a$ that is greater than or equal to the $pK_a$ of the first Lewis acid gas and less than the $pK_a$ of the second Lewis acid gas. As a non-limiting example, in some embodiments, in the at least one reduced state the electroactive species comprises a moiety (e.g., carbonyl group) having a $pK_a$ that is greater than or equal to $SO_2$ and less than the pKa of $CO_2$ in at least one conductive medium, or in the conductive medium of the process being performed. By judiciously choosing the pKa of the electroactive species in its reduced states (e.g., by derivatization with functional groups), selective reactivity with the first Lewis acid gas relative to the second Lewis acid gas can be achieved. One of ordinary skill in the art would be able to determine the $pK_a$ of an electroactive species (e.g., in a reduced state) by chemically or electrochemically preparing the reduced state and performing an acid base titration (e.g., colorimetrically, via cyclic voltammetry, etc.), or any other suitable technique known in the art. The relative $pK_a$ values of species under given conditions (temperature, solvent, supporting electrolyte) can be determined using electrochemical techniques such as cyclic voltammetry or open-circuit potential techniques to determine the reduction potentials of the species, the species with the more positive reduction potential having the lower $pK_a$. The $pK_a$ may depend on the temperature at which it is measured. In some embodiments, the $pK_a$ is measured at any of the temperatures mentioned above, such as at 298 K.

In some instances, the electroactive species in its at least one reduced state may be capable of reacting with both the first Lewis acid gas and the second Lewis acid gas at a first temperature, but at a second, different temperature, the electroactive species in its at least one reduced state is capable of bonding with a first Lewis acid gas, but a reaction with the second Lewis acid is thermodynamically and/or kinetically unfavorable. In some such instances, removing an amount of the first Lewis acid gas from a fluid mixture comprising the first Lewis acid gas and the second Lewis acid gas may comprise bonding both the first Lewis acid gas to one or more electroactive species in a reduced state and bonding the second Lewis acid gas to the one or more electroactive species in the reduced state at a first temperature to form first Lewis acid gas-electroactive species complexes and second Lewis acid gas-electroactive species complexes, respectively. Subsequently, the first Lewis acid gas-electroactive species complexes and second Lewis acid gas-electroactive species complexes may be exposed condition at a second, different temperature that results in release of an amount (e.g., at least 10%, at least 25%, at least 50%, at least 75%, at least 90%, at least 95%, at least 98%, at least 99%, or all by mole percent or volume percent) of the second Lewis acid gas from the complexes via reversal of the bonding reaction between the second Lewis acid gas and the electroactive species, while releasing essentially none or relatively little of the first Lewis acid gas (e.g., less than or equal to 10%, less than or equal to 5%, less than or equal to 2%, less than or equal to 1%, less than or equal to 0.5%, less than or equal to 0.1%, and/or as little as 0.05%, as little as 0.01%, or less by mole percent or volume percent). Changing from the first temperature to the second temperature may cause at least partial release by shifting equilibrium constants for the respective bonding reactions toward release of the gas. For example, the complex-forming bonding reactions may each have a negative Gibbs free energy change at the first temperature, but at the second temperature the reaction involving bonding of the first Lewis acid gas may remain negative while the reaction involving bonding of the second Lewis acid may become positive (and therefore thermodynamically unfavorable). Judicious choice of electroactive species may be employed to achieve such an effect based on a variety of considerations. For example, an electroactive species may be chosen based on knowledge or measurements of changes in enthalpy and changes in entropy for the respective complex-forming reactions with the electroactive species.

One non-limiting way in which the first Lewis acid gas may be removed while removing little to essentially none of the second Lewis acid gas (e.g., carbon dioxide) from the fluid mixture is by applying a certain potential across the electrochemical cell during at least a portion of the operation. For example, it is has been discovered in the context of the present disclosure that it is possible to apply a potential across the electrochemical cell (e.g., first potential) that is sufficient to reduce the electroactive species to at least one reduced state in which it is capable of bonding to the first Lewis acid gas, but the potential is insufficient to reach a state in which the species (or the electrode itself) is capable of reacting (e.g., binding) with the second Lewis acid gas. Judicious choice of electroactive species may allow for such a potential to be applied, whereas certain conventional electroactive species may not allow for such a potential to be applied. The potential applied across the electrochemical cell may be such that the electrode potential at the negative electrode is positive (e.g., by greater than or equal to 10 mV, greater than or equal to 50 mV, greater than or equal to 100 mV, greater than or equal to 200 mV, greater than or equal to 5 mV, and/or up to 1 V or more) relative to the standard reduction potential for the formation of a reduced state of the species capable of to the second Lewis acid gas.

While certain embodiments described above relate to selective removal of a first Lewis acid gas from a mixture comprising a first Lewis acid gas and a second Lewis acid gas via selectively reacting the first Lewis acid gas with an electroactive species to a greater extent than that of the second Lewis acid gas, other methods of selective removal of the first Lewis acid gas are contemplated as well. As one example, some embodiments are related to methods involving selective Lewis acid gas removal by bonding a first Lewis acid gas (e.g., sulfur dioxide) and a second Lewis acid gas (e.g., carbon dioxide) to one or more reduced electroactive species and, subsequently, selectively releasing the second Lewis acid gas (e.g., via oxidation of a second Lewis acid gas-electroactive species complex) from the complexes while releasing relatively little or none of the first Lewis acid gas from the complexes.

Figure 3:
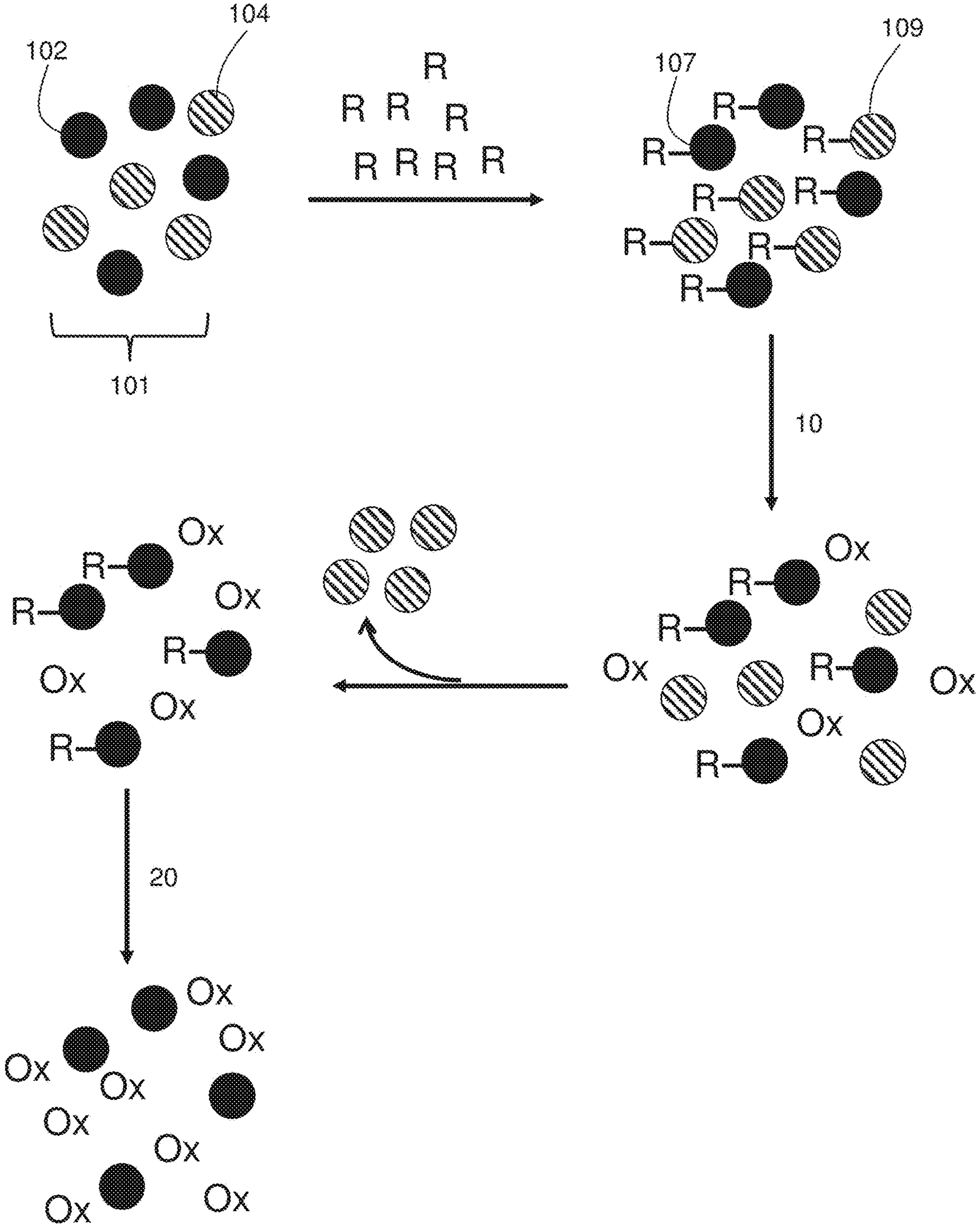
FIG. 3 is a schematic illustration of an exemplary process for removing first Lewis acid gas from a fluid mixture comprising the first Lewis acid gas and a second Lewis acid gas, according to one or more embodiments.

In some embodiments, a fluid mixture comprising a first Lewis acid gas and a second Lewis acid gas is exposed to one or more electroactive species. The electroactive species (e.g., optionally-substituted quinones) may be in a reduced state (e.g., an optionally-substituted semiquinone, an optionally substituted quinone dianion, or combinations thereof). For example, referring to FIG. 3, fluid mixture 101 comprising first Lewis acid gas 102 and second Lewis acid gas 104 may be exposed to reduced electroactive species R. The electroactive species may initially be in an oxidized state (e.g., an optionally-substituted quinone) and then converted to a reduced state (e.g., an optionally-substituted semiquinone or quinone dianion). Such a reduction process to prepare the electroactive species in the reduced state may occur prior to the step of exposing the fluid mixture comprising a first Lewis acid gas and a second Lewis acid gas to the electroactive species, and/or during the exposure. The reduction may occur, for example, via electron transfer upon applying an electrical potential difference across an electrochemical cell comprising a negative electrode in electronic communication with the electroactive species. The electroactive species in the reduced state may be part of an electrode (e.g., immobilized on a negative electrode), freely diffusing in a liquid solution (e.g., the fluid mixture), or a combination thereof.

Exposure to the one or more electroactive species in their reduced state may, for example, comprise flowing the fluid mixture to or past the electroactive species (e.g., in proximity to the electroactive species) and/or mixing the Lewis acid gases with the electroactive species in solution (e.g., via mixing separate solutions or bubbling a solution comprising the electroactive species with a gas mixture comprising the Lewis acid gases).

In some embodiments, an amount of the first Lewis acid gas is bonded to a first portion the electroactive species in the reduced state to form first Lewis acid gas-electroactive species complexes. Further, in some embodiments, an amount of the second Lewis acid gas is bonded to a second portion of the electroactive species in the reduced state to form second Lewis acid gas-electroactive species complexes. The bonding of the first Lewis acid gas to the first portion of the electroactive species and the bonding of the second Lewis acid gas to the second portion of the electroactive species may occur simultaneously or sequentially. For example, in some embodiments, the second Lewis acid gas may be bonded to the reduced electroactive species (e.g., a subset or all of the electroactive species) and then, after a period of time, the first Lewis acid gas may be bonded to the reduced electroactive species (e.g., a subset or all of the electroactive species). In other embodiments, the first Lewis acid gas and the second Lewis acid gas are each bonded to the reduced electroactive species during a same period of time. It should be understood that Lewis acid gas-electroactive species complexes can be formed by any of a variety of forces, such a covalent bonds, ionic bonds, hydrogen bonds, or specific noncovalent affinity interactions. Referring again to FIG. 3, first Lewis acid gas molecules 102 (e.g., sulfur dioxide) may bond to reduced electroactive species R to form first Lewis acid gas-electroactive species complexes 107, and second Lewis acid gas molecules 104 (e.g., carbon dioxide) may bond to reduced electroactive species R to form second Lewis acid gas-electroactive species complexes 109, according to certain embodiments. The first and second Lewis acid gases, when complexed, may be at least temporarily immobilized with respect to a structure of a device (e.g., an electrode) or with respect to a solution in which the electroactive species is present (e.g., dissolved). The first portion of the one or more electroactive species (to which the first Lewis acid gas is bonded) may, for example, be a first plurality of electroactive species molecules or polymer moieties, and the second portion of the electroactive species (to which the second Lewis acid gas is bonded) may be a second plurality of electroactive species molecules or polymer moieties. The first portion of the one or more electroactive species and the second portion of the one or more electroactive species may be the same type of species (e.g., same type of optionally-substituted quinone molecules or polymer residues)), or the first portion and second portion may include different types of species (e.g., quinones having differing substituents).

In some embodiments, at least some of the second Lewis acid gas-electroactive species complexes are oxidized such that an amount (e.g., at least 10%, at least 25%, at least 50%, at least 75%, at least 90%, at least 95%, at least 98%, at least 99%, or all by mole percent or by volume percent) of the second Lewis acid gas is released from the complexes. For example, referring again to FIG. 3, second Lewis acid gas-electroactive species complexes 109 may be oxidized during step 10 to form the electroactive species in their oxidized state Ox, thereby releasing second Lewis acid gas molecules 104 from the second Lewis acid gas-electroactive species complexes 109. The released second Lewis acid gas molecules (e.g., carbon dioxide) may then, in some instances, be separated from the fluid mixture comprising the first Lewis acid gas-electroactive species complexes (e.g., sulfur dioxide-electroactive species complexes). Such a separation can be accomplished in some cases in which the complexes are immobilized by flowing the fluid mixture past the immobilized complexes (e.g., by flowing a gas stream or fluid stream using positive and/or negative pressure sources). In some cases in which the complexes are at least partially dissolved in solution, the second Lewis acid gas may be separated by out-gassing the second Lewis acid gas or via evaporation (e.g., via exposure to reduced pressure conditions such as exposure to vacuum). The oxidation of the second Lewis acid gas-electroactive species complexes may be performed using any of a variety of techniques such as electrochemically or chemically. For example, the oxidation step may comprise exposing the second Lewis acid gas-electroactive species complexes to an electrochemical cell while applying an electrical potential difference across the electrochemical cell. The second Lewis acid gas-electroactive species complexes may be exposed, for example to a negative electrode of the electrochemical cell either as free complexes in solution (under diffusion or forced fluid flow), or the electroactive species may be immobilized with respect to the negative electrode (e.g., via adsorption, functionalization, or inclusion in a redox-active polymer). The oxidation may, alternatively or additionally, involve the exposure to a suitable chemical oxidizing agent dissolved in solution or immobilized/deposited on a surface.

In some embodiments, while at least some of the second Lewis acid gas-electroactive species complexes are oxidized (and an amount of the second Lewis acid gas is released), essentially none (e.g., a negligible amount with respect to the application being employed) of the first Lewis acid gas is released from the first Lewis acid gas-electroactive species complexes. In some embodiments, while at least some of the second Lewis acid gas-electroactive species complexes are oxidized (and an amount of the second Lewis acid gas is released), an amount of the first Lewis acid gas is released that is less than or equal to 70%, less than or equal to 50%, less than or equal to 25%, less than or equal to 10%, less than or equal to 5%, less than or equal to 2%, less than or equal to 1%, less than or equal to 0.5%, less than or equal to 0.1%, less than or equal to 0.05%, and/or as low as 0.01%, as low as 0.001%, or less of the first Lewis acid gas-electroactive species complexes by mole percent. Essentially none or relatively little first Lewis acid gas may be released during oxidation of the second Lewis acid gas-electroactive species complexes for any of a variety reasons. For example, the conditions under which oxidation of the second Lewis acid gas-electroactive species complex occurs may not lead to oxidation of the first Lewis acid gas-electroactive species complex because the oxidizing power of an oxidizing agent (e.g., a chemical oxidant or an electrode at a given electrical potential) may be sufficient to oxidize the second Lewis acid gas-electroactive species complex (e.g., thermodynamically or kinetically), but insufficient to oxidize the first Lewis acid gas-electroactive species complex. Such an occurrence may happen when the different complexes have different oxidation potentials under the given conditions, which may be attributable to differing acidities of the first Lewis acid gas and the second Lewis acid gas. Another example is where the conditions under which oxidation of the second Lewis acid gas-electroactive species complexes occurs also results in oxidation of at least some of the first Lewis acid gas-electroactive species complexes, but where an affinity between the first Lewis acid gas and the electroactive species in its oxidized state is strong enough that a complex is maintained and the first Lewis acid gas is not released. Judicious choice of oxidizing agent/electrical potential and/or electroactive species (e.g., based on measured reduction potentials and/or $pK_a$ values of the electroactive species and Lewis acid gases) may be used to employ any of the techniques described above.

In some embodiments, the step of oxidizing the second Lewis acid gas-electroactive species complexes is performed multiple times. For example, the gas released during the oxidizing step (e.g., released second Lewis acid gas and a relatively small amount of first Lewis acid gas) may be separated from the fluid mixture and exposed to a second set of reduced electroactive species (e.g., at a second electrochemical cell) to form new second Lewis acid gas-electroactive species complexes and first Lewis acid gas-electroactive species, wherein a ratio of the first Lewis acid gas to second Lewis acid gas is higher than during the initial exposure step of the process. Then, the new second Lewis acid gas-electroactive species may be oxidized to release second Lewis acid gas from the complexes, while releasing essentially none or a relatively small amount of the first Lewis acid gas from the complexes. This process may be repeated, two, three, four, or more times, with each process progressively enriching a fluid mixture with the second Lewis acid gas while depleting it of the first Lewis acid gas. Such a sequential process could be performed using, for example, a distillation-type apparatus having multiple trays.

In some embodiments, the first Lewis acid gas-electroactive species complexes are oxidized such that an amount (e.g., at least 10%, at least 25%, at least 50%, at least 75%, at least 90%, at least 95%, at least 98%, at least 99%, or all by mole percent or by volume percent) of the first Lewis acid gas is released. Such a release of the first Lewis acid gas (e.g., sulfur dioxide) may occur after separation from the second Lewis acid gas (e.g., carbon dioxide). In some embodiments, oxidation of the first Lewis acid gas-electroactive species complexes occurs after oxidation of the second Lewis acid gas-electroactive species complexes. As an example, in some embodiments, the oxidation of the second Lewis acid gas-electroactive species complexes is a first oxidizing step performed during a first period of time, and a second oxidizing step comprising oxidizing at least some of the first Lewis acid gas-electroactive species complexes is performed during a second (e.g., later) period of time such that an amount of the first Lewis acid gas is released. Referring again to FIG. 3, first Lewis acid gas-electroactive species complex 107 may be oxidized during step 20 to form the electroactive species in their oxidized state Ox, thereby releasing first Lewis acid gas molecules 102.

The second oxidizing step may, as in the case of the first oxidizing step, be performed electrochemically or chemically. For example, the second oxidizing step may comprise exposing the second Lewis acid gas-electroactive species complexes to an electrochemical cell while applying an electrical potential difference across the electrochemical cell. In some embodiments, the electrochemical cell used for the second oxidation step is the same electrochemical cell as the first oxidation step. For example, the second Lewis acid gas-electroactive species complexes may be oxidized at a negative electrode of an electrochemical cell during a first period of time, and then the first Lewis acid gas-electroactive species complexes may be oxidized at the same negative electrode during a second period of time. The different oxidations may occur at different times by employing different electrical potentials at the different times. For example, a first electrical potential difference may be applied during the first oxidizing step, at a magnitude sufficient to oxidize the second Lewis acid gas-electroactive species complexes but insufficient (e.g., thermodynamically) to oxidize the first Lewis acid gas-electroactive species complexes. Then, during the second oxidizing step, a second electrical potential difference may be applied at a magnitude sufficient to oxidize the first Lewis acid gas-electroactive species complexes.

Figure 4:
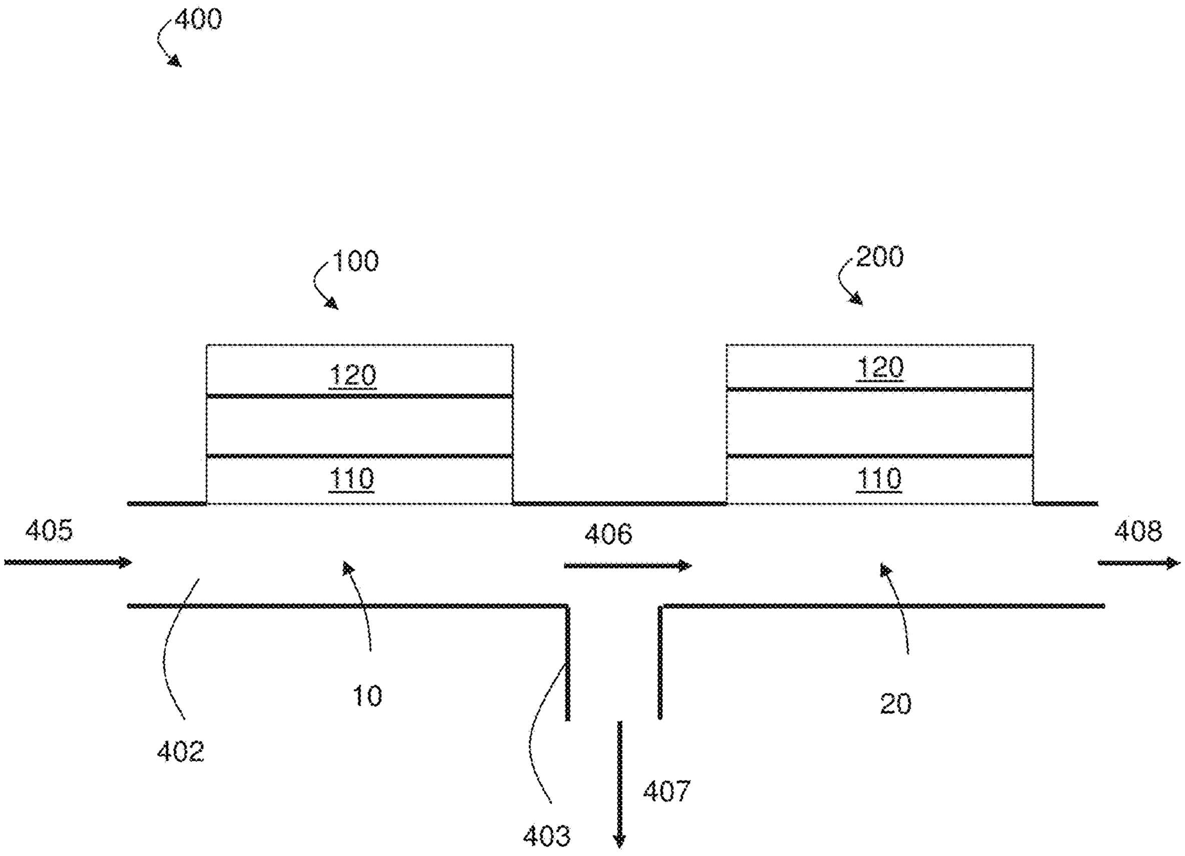
FIG. 4 is a cross-sectional schematic diagram of a flow apparatus comprising a first electrochemical cell and a second electrochemical cell, according to one or more embodiments.

Alternatively, the first and second oxidations may be performed at different electrochemical cells (e.g., of a gas separation system). For example, the first oxidizing step may comprise exposing the second Lewis acid gas-electroactive species complexes to a first electrochemical cell while applying an electrical potential difference across the first electrochemical cell, and the second oxidizing step may comprise exposing the first Lewis acid gas-electroactive species complexes to a second (different) electrochemical cell while applying an electrical potential difference across the second electrochemical cell. The second electrical potential difference may be different than the first electrical potential difference (e.g., resulting in a more positive electrical potential at a negative electrode). Such a process may be performed using, for example, a redox flow apparatus. FIG. 4 shows a schematic illustration of exemplary flow apparatus 400 comprising first electrochemical cell 100 and second electrochemical cell 200. First electrochemical cell 100 and second electrochemical cell 200 may each comprise an anode 110. Anodes 110 may each be in fluidic communication with conduit 402 configured to flow fluid mixtures (e.g., gaseous fluid mixtures or liquid solutions). That is, fluid in the conduit may be capable of contacting at least one surface of anodes of the first electrochemical cell and the second electrochemical cell. In the embodiment shown in FIG. 4, fluid apparatus 400 may be configured to receive fluid mixture 405 (e.g., from a fluid mixture source) via an inlet, and anode 110 of first electrochemical cell 100 may be arranged with the conduit such that flow of fluid mixture 405 may expose fluid mixture 405 to anode 110 of first electrochemical cell 100. At first electrochemical cell oxidizing step 10 shown in FIG. 3 may be performed to oxidize second Lewis acid gas-electroactive species complexes such that an amount of second Lewis acid gas is released. An intermediate outlet 403 may be positioned and configured to receive second Lewis acid gas 407 separated from fluid mixture 405 (e.g., via connection to a vacuum source). Flow apparatus 406 may be configured to transport the resulting fluid mixture 406 comprising first Lewis acid gas-electroactive species but at least partially (or completely) depleted of second Lewis acid gas molecules to second electrochemical cell 200. Anode 110 of second electrochemical cell 200 may be arranged with conduit 402 such that flow of fluid mixture 406 may expose fluid mixture 406 to anode 110 of second electrochemical cell 200. At second electrochemical cell 200, oxidizing step 20 shown in FIG. 3 may be performed to oxidize first Lewis acid gas-electroactive species complexes such that an amount of first Lewis acid gas is released. Flow apparatus 400 may further be configured to expel released first Lewis acid as (e.g., as gas 408 from an outlet).

As one non-limiting example of a process described above, sulfur dioxide and carbon dioxide may each be exposed to dissolved para-naphthoquinone dianion (p-$NQ^{2-}$) in an organic liquid (e.g., via bubbling of the gases into the liquid). The para-naphthoquinone dianion may be prepared via electrochemical or chemical reduction.

The exposure may result in formation of p-$NQ(S_2)_2$ and p-$NQ(CO_2)_2$ complexes in solution. The solution may then be exposed to a negative electrode of an electrochemical cell during application of an oxidizing potential sufficient to oxidize the p-$NQ(CO_2)_2$ to form neutral species p-NQ and $CO_2$, but insufficient to oxidize the p-$NQ(SO_2)_2$ complexes in solution. The released $CO_2$ may be removed from the solution (e.g., as part of a fluid mixture such as a gas mixture for further downstream processing such as carbon capture). The remaining solution comprising p-$NQ(S_2)_2$ may then be exposed to a negative electrode (either the same electrode or an electrode of a second electrochemical cell) during application of a more positive oxidizing potential sufficient to oxidize p-$NQ(S_2)_2$ to form p-NQ and $SO_2$, now separated from the $CO_2$.

The electroactive species described herein may be of any suitable form, provided that it satisfies at least one of the criteria required herein. In some embodiments, the electroactive species is or comprises a molecular species. For example, the electroactive species may be or comprise an organic molecule. The electroactive species may comprise one or more functional groups capable of binding to a first Lewis acid gas in a fluid mixture (e.g., when the electroactive species is in a reduced state). The functional groups may include, for example, a carbonyl group. In some embodiments, the electroactive species is part of a polymer, such as a redox-active polymer. The electroactive species may be part of a polymeric material immobilized on the negative electrode. For example, referring to FIG. 2, the electroactive species may be part of a polymeric material immobilized on negative electrode 110 of electrochemical cell 100. As mentioned above, however, the electroactive species may be present in a conductive medium (e.g., a conductive liquid).

In some embodiments, the electroactive species is or comprises an organic species. The species may be optionally-substituted (i.e., the species may comprise functional groups and/or other moieties or linkages bonded to the main structure of the species) In some embodiments, the organic species comprises one or more species chosen from optionally-substituted quinone, optionally-substituted thiolate, an optionally-substituted bipyridine, an optionally-substituted phenazine, and an optionally-substituted phenothiazine.

In certain cases, the electroactive species is or comprises a redox-active polymer comprising an optionally-substituted organic species. The choice of substituent (e.g., functional groups) on the optionally-substituted species may depend on any of a variety of factors, including but not limited to its effect on the $pK_a$ and/or the standard reduction potential of the optionally-substituted species. One of ordinary skill, with the benefit of this disclosure, would understand how to determine which substituents or combinations of substituents on the optionally-substituted species (e.g., quinone) are suitable for the electroactive species based on, for example synthetic feasibility, and resulting $pK_a$ and/or standard reduction potential.

As a non-limiting example, it has been discovered that substitution of certain quinones with electron-withdrawing groups can modulate the electron density of certain redox states of the quinone which may affect the species' selectivity for Lewis acid gases (e.g., by modulating the $pK_a$ of the reduced state). As one non-limiting example, it has been observed unexpectedly that functionalizing 1,4-naphthoquinone with electron withdrawing groups (e.g., nitriles to form 2,3-dicyano-1,4-napthoquinone) can impart selectivity for binding of $SO_2$ over binding $CO_2$ upon reduction. With the benefit of this insight, one or ordinary skill could screen potential electroactive species for a desired selectivity for Lewis acid gases by performing cyclic voltammetry and/or thermogravimetric analysis of the electroactive species in a desired conductive liquid at a desired temperature in the presence of the each Lewis acid gas, and determining relative reactivities.

In some embodiments, the optionally-substituted quinone is or comprises an optionally-substituted naphthoquinone. In certain cases, the optionally-substituted quinone is or comprises an optionally-substituted anthraquinone. In some embodiments, the optionally substituted quinone is or comprises an optionally-substituted quinoline. In some embodiments, the optionally-substituted quinone is or comprises an optionally-substituted thiochromene-dione. In some embodiments, the optionally-substituted quinone is one of benzo[g]quinoline-5,10-dione, benzo[g]isoquinoline-5,10-dione, benzo[g]quinoxaline-5,10-dione, quinoline-5,8-dione, or 1-lamba 4-thiochromene-5,8-dione. In some embodiments, the optionally-substituted quinone is or comprises an optionally-substituted phenanthrenequinone (also referred to as an optionally-substituted phenanthrenedione). The substituents (e.g., functional groups) may be any of those listed above or below.

As mentioned above, the electroactive species may be part of a redox-active polymer. In some cases, any of the optionally-substituted species (e.g., organic species) described herein may be part of the redox-active polymer. In some such cases, at least a portion of the redox-active polymer comprises a backbone chain and one or more of the optionally-substituted species covalently bonded to the backbone chain. A backbone chain generally refers to the longest series of covalently bonded atoms that together create a continuous chain of the polymer molecule. In certain other cases, the optionally-substituted species described herein may be part of the backbone chain of the redox-active polymer.

The electroactive species may comprise cross-linked polymeric materials. For example, in some embodiments, the electroactive species comprises or is incorporated into hydrogels, ionogels, organogels, or combinations thereof. Such cross-linked polymeric materials are generally known in the art, and may in some instances comprise electroactive species described herein as part of the three-dimensional structure (e.g., via covalent bonds). However, in some embodiments, electroactive species are incorporated into the cross-linked polymeric materials via adsorption (e.g., physisorption and/or chemisorption). In some embodiments, the electroactive species comprises an extended network. For example, the electroactive species may comprise a metal organic framework (MOF) or a covalent organic framework (COF). In some embodiments, the electroactive species comprises functionalized carbonaceous materials. For example, the electroactive species may comprise functionalized graphene, functionalized carbon nanotubes, functionalized carbon nanoribbons, edge-functionalized graphite, or combinations thereof.

Exemplary functional groups with which the optionally-substituted quinone may be functionalized include, but are not limited to, halo (e.g., chloro, bromo, iodo), hydroxyl, carboxylate/carboxylic acid, sulfonate/sulfonic acid, alkylsulfonate/alkylsulfonic acid, phosphonate/phosphonic acid, alkylphosphonate/alkylphosphonic acid, acyl (e.g., acetyl, ethyl ester, etc.), amino, amido, quaternary ammonium (e.g., tetraalkylamino), branched or unbranched alkyl (e.g., C1-C18 alkyl), heteroalkyl, alkoxy, glycoxy, polyalkyleneglycoxy (e.g., polyethyleneglycoxy), imino, polyimino, branched or unbranched alkenyl, branched or unbranched alkynyl, aryl, heteroaryl, heterocyclyl, nitro, nitrile, thiyl, and/or carbonyl groups, any of which is optionally-substituted. The above-mentioned functional groups may also be employed in any of the other types of electroactive species described herein (e.g., optionally-substituted thiolate, an optionally-substituted bipyridine, an optionally-substituted phenazine, and an optionally-substituted phenothiazine, functionalized hydrogels, functionalized carbonaceous materials such as functionalized graphene, functionalized carbon nanotubes, edge-functionalized graphite, etc.). As would be understood by a person of ordinary skill in the art, a heteroaryl substitution of an aromatic species such as a quinone may be a ring fused with the aromatic species. For example, a quinone functionalized with a heteroaryl group can be a quinoline-dione (e.g., a benzoquinoline-dione). Heteroatoms in rings that are part of electroactive species, may, in some instances, affect the $pK_a$ of a reduced form of the electroactive species and/or its standard reduction potential. For example, a quinoline-dione may have a more positive standard reduction potential than a naphthoquinone, and a quinoxaline-dione may have a more positive standard reduction potential than the quinoline-dione.

Figure 2:
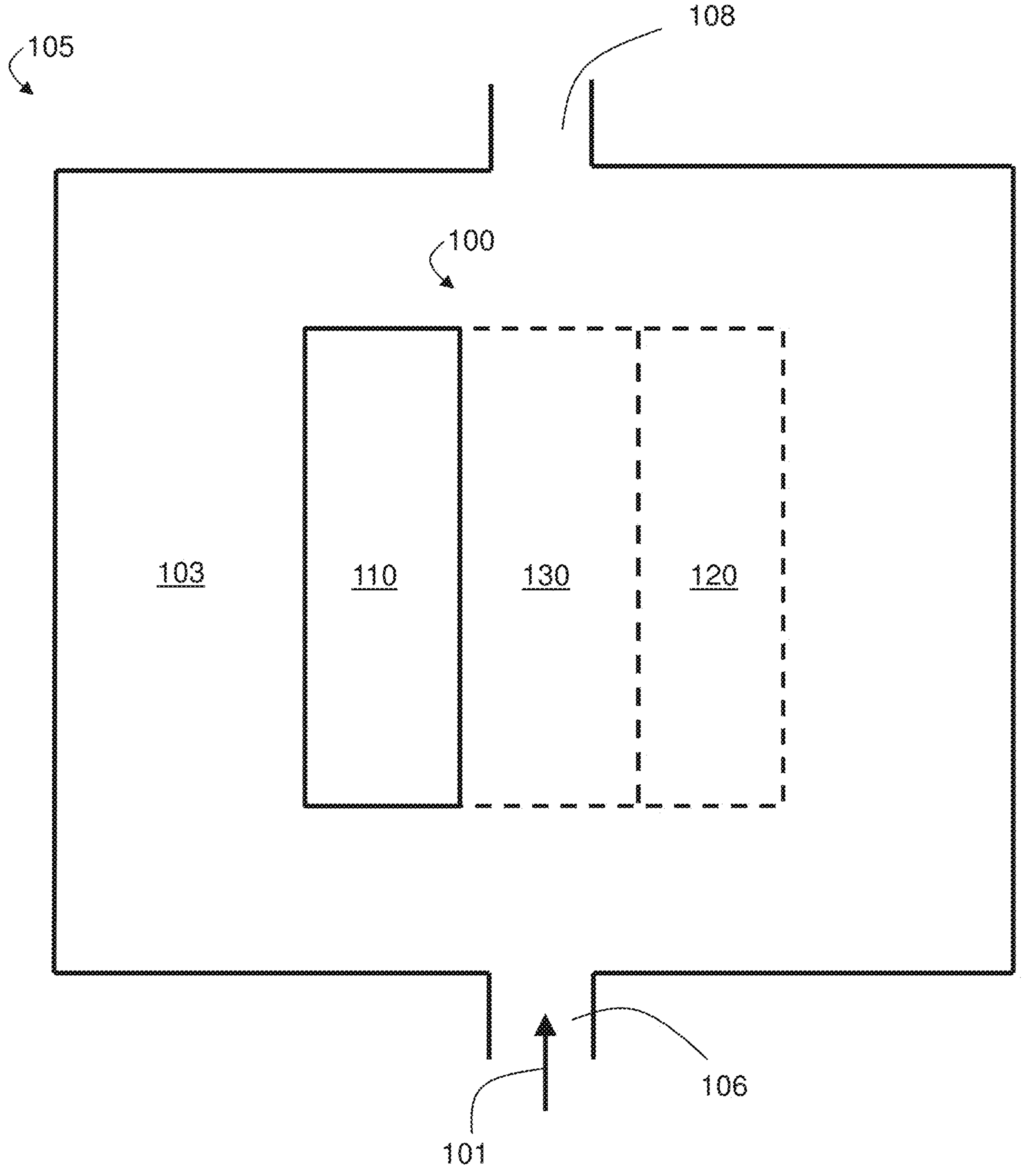
FIG. 2 is a cross-sectional schematic diagram of an electrochemical apparatus comprising a chamber constructed to receive a fluid mixture, and a negative electrode, according to one or more embodiments.

In certain aspects, electrochemical apparatuses are generally described. FIG. 2 depicts electrochemical apparatus 105 as one such example, according to certain embodiments. The electrochemical apparatus may, in some instances, be configured to perform the methods described herein.

In some embodiments, the electrochemical apparatus comprises a chamber comprising a negative electrode. For example, in some embodiments, electrochemical apparatus 105 comprises chamber 103 and electrochemical cell 100, which comprises negative electrode 110. The chamber may be constructed for receiving a fluid mixture. In some instances, the chamber of the electrochemical apparatus is configured such that a fluid mixture can enter the chamber and in some instances leave the chamber. For example, in some embodiments, the chamber comprises a fluid inlet and a fluid outlet. Referring again to FIG. 2, in some embodiments, electrochemical apparatus 105 comprises chamber 103 comprising fluid inlet 106 and fluid outlet 108. As such, one or more of the methods described herein may be performed by flowing fluid mixture 101 (e.g., comprising a first Lewis acid gas and a second Lewis acid gas) into chamber 103 via fluid inlet 106, thereby exposing at least a portion of the fluid mixture to the electrochemical cell (e.g., including negative electrode 110). The electrochemical cell ay be equipped with external circuitry and a power source (e.g., coupled to a potentiostat) to allow for application of the potential difference. The electrochemical apparatus may be configured such that at least a portion of the fluid mixture can be transported out of the chamber via a fluid outlet (e.g., fluid outlet 108 in FIG. 2). In some embodiments, the fluid inlet is fluidically connected to a fluid mixture source (e.g., a source of a mixture comprising a first Lewis acid gas and a second Lewis acid gas). In some embodiments the fluid outlet is fluidically connected to a downstream apparatus for further processing (e.g., another electrochemical apparatus for removing another Lewis acid gas). In some embodiments, the electrochemical apparatus comprises a plurality of the chambers (e.g., each comprising a negative electrode) fluidically connected in series.

In some embodiments, the electrochemical apparatus comprises the electroactive species in electronic communication with the negative electrode. For example, referring again to FIG. 2, in some embodiments, the electroactive species (not pictured) is in electronic communication with negative electrode 110. Electronic communication in this context generally refers to an ability to undergo electron transfer reactions, either via outer sphere (electron/hole transfer) or inner sphere (bond breaking and/or bond making) mechanisms. In some embodiments in which the electroactive species is in electronic communication with the negative electrode, the electroactive species is immobilized on the negative electrode. For example, the electroactive species may be part of a redox-active polymer immobilized on to the electrode via, in some instances, a composite layer (e.g., comprising a carbonaceous material such as carbon nanotubes). In some embodiments in which the electroactive species is in electronic communication with the negative electrode, the electroactive species is present in a conductive medium in at least a portion of the electrochemical cell, and can undergo electron transfer reactions with the electrode (directly or indirectly). For example, the electroactive species may be present (e.g., dissolved or suspended) in a conductive liquid of the electrochemical cell and be able to diffuse close enough to the negative electrode such that an electron transfer reaction can occur (e.g., to reduce the electroactive species into at least one reduced state) upon application of the potential difference across the electrochemical cell.

As mentioned above, in some embodiments, the first electroactive species is immobilized on the negative electrode. Such embodiments may be distinguished from hose of other embodiments, in which the electroactive species are free to be transported from one electrode to another via, for example, advection. A species immobilized on an electrode (e.g., the negative electrode) may be one that, under a given set of conditions, is not capable of freely diffusing away from or dissociating from the electrode. The electroactive species can be immobilized on an electrode in a variety of ways. For example, in some cases, an electroactive species can be immobilized on an electrode by being bound (e.g., via covalent bonds, ionic bonds, and/or intramolecular interaction such as electrostatic forces, van der Waals forces, hydrogen bonding, etc.) to a surface of the electrode or a species or material attached to the electrode. In some embodiments, the electroactive species can be immobilized on an electrode by being adsorbed onto the electrode. In some cases, the electroactive species can be immobilized on an electrode by being polymerized onto the electrode. In certain cases, the electroactive species can be immobilized on an electrode by being included in a composition (e.g., a coating, a composite layer, etc.) that is applied or deposited onto the electrode. In certain cases, the electroactive species (e.g., polymeric or molecular electroactive material) infiltrates a microfiber or, nanofiber, or carbon nanotube mat, such that the electroactive material is immobilized with respect to the mat. The mat may provide an enhanced as surface area enhancement for electrolyte and gas access, as well as expanded network for electrical conductivity. In some embodiments, the electroactive species is part of a gel composition associated with the electrode (e.g., as a layer deposited on the electrode, as a composition infiltrating pores of the electrode, or as a composition at least partially encapsulating components of the electrode such as fibers or nanotubes of the electrode). Such a gel comprising the electroactive species (e.g., a hydrogel, ionogel, organogel, etc.) may be prepared prior to association with the electrode (e.g., applied as a coating to form a layer), or the gel may be prepared in the presence of the electrode by contacting the electrode (e.g., via coating or submersion) with a gel precursor (e.g., a pre-polymer solution comprising the electroactive species) and gel formation may then be initiated (e.g., via cross-linking via introduction of a crosslinking agent, a radical initiator, heating, and/or irradiation with electromagnetic radiation (e.g., ultraviolet radiation)).

In some embodiments, the electrochemical of the electrochemical apparatus further comprises a positive electrode. In some, but not necessarily all embodiments, the electrochemical cell comprises a separator between the negative electrode and the positive electrode. For example, referring to FIG. 2, in some embodiments, electrochemical cell 100 comprises optional separator 130 between negative electrode 110 and optional positive electrode 120. As used herein, a positive electrode of an electrochemical cell refers to an electrode from which electrons are removed during a charging process. For example, referring again to FIG. 2, when electrochemical cell 100 is charged (e.g., via the application of a potential by an external power source), electrons pass from positive electrode 120 and into an external circuit (not shown). As such, in some cases, species associated with the positive electrode, if present, can be oxidized to an oxidized state (a state having a decreased number of electrons) during a charging process of the electrochemical cell.

In some embodiments, the electroactive species in electronic communication with the negative electrode describe above is a first electroactive species and the positive electrode comprises a second electroactive species. The second electroactive species may be a different composition than the first electroactive species of the negative electrode, though it some embodiments the second electroactive species is the same as the first electroactive species. In some embodiments the positive electrode comprises an electroactive layer (sometimes referred to as a complementary electroactive layer) comprising the second electroactive species. The complementary electroactive layer may be in the form of a composite, and as such, may be a complementary electroactive composite layer. In operation, this second electroactive species may serve as a source of electrons for the reduction of the first electroactive species present in the negative electrode. Likewise, the second electroactive species may serve as a sink for electrons during the oxidation of the first electroactive species. It is in this manner that the electroactive layer of the positive electrode may be described as "complementary." The second electroactive species may comprise, for example, a redox-active polymer. In some embodiments, the redox-active polymer is or comprises a polymer comprising ferrocene (e.g., as moieties bonded to the polymer backbone). In some embodiments, second electroactive species comprises a metallocene (e.g., ferrocene). In some such cases, the second electroactive species comprises a redox-active polymer comprising a metallocene. As one non-limiting embodiment, the redox-active polymer comprises polyvinyl ferrocene. As another example, the second electroactive species may comprise a polymer comprising a thiophene. In some such cases, the second electroactive species comprises poly(3-(4-fluorophenyl)thiophene). In some embodiments, the second electroactive species comprises phenothiazine. As another example, in some embodiments, the second electroactive species comprises (2,2,6,6-tetramethylpiperidin-1-yl)oxyl (referred to as "TEMPO"), or derivatives thereof (e.g., comprising optional substituents). In certain cases, the second electroactive species comprises a Faradaic redox species having a standard reduction potential at least 0.5 volts (V), at least 0.6 V, at least 0.8 V, and/or up to 1.0 V, up to 1.5 V, or more positive than the first reduction potential of the first electroactive species.

In some embodiments, the second electroactive species comprises an intercalation compound. For example, the second electroactive may comprise a metal ion intercalation compound. One exemplary class of intercalation compounds includes metal oxides. The intercalation compound may include intercalation compounds of alkali metal ions such as lithium ions and/or sodium ions. In some embodiments, the intercalation compound comprises an alkali metal ion transition metal oxide (e.g., a lithium cobalt oxide, a lithium manganese oxide, a lithium nickel oxide, and/or lithium oxides comprising cobalt, manganese, and/or nickel). In some embodiments, the intercalation compound comprises an alkali metal transition metal polyoxyanion, such as a lithium transition metal phosphate. One example of a suitable lithium transition metal phosphate for the positive electrode is lithium iron phosphate ($LiFePO_4$). In some embodiments, during the charge mode, the oxidation of a second electroactive species in the form of an alkali metal ion intercalation compound (e.g., $LiFePO_4$) provides a source of electrons for driving the reduction of the first electroactive species, while simultaneous releasing an alkali metal ion (e.g., a lithium ion) that can shuttle to through an electrolyte (e.g., on or within a separator when present) toward the negative electrode to maintain charge balance and complete an electrochemical circuit. Conversely, during a discharge mode, the reduction of a second electroactive species in the form of an alkali metal ion intercalation compound provides a sink for electrons from the oxidation of the first electroactive species, while at the same time an alkali metal ion (e.g., a lithium ion) can shuttle from the a region in proximity to the negative electrode, through an electrolyte (e.g., on or within a separator when present), and toward the positive electrode where it can be intercalated into the intercalation compound and maintain charge balance.

The complementary electroactive composite layer of the positive electrode may comprise an immobilized polymeric composite of an electroactive species and of another material (e.g., a carbonaceous material). Examples of the carbonaceous material include carbon nanotube (e.g., single-walled carbon nanotube, multi-walled-carbon nanotube), carbon black, KetjenBlack, carbon black Super P, or graphene. Other materials are also possible. In certain cases, the second electroactive species can be immobilized on a positive electrode by being included in a composition (e.g., a coating, a composite layer, etc.) that is applied or deposited onto the positive electrode. In certain cases, the second electroactive species (e.g., polymeric or molecular electroactive material) infiltrates a microfiber, nanofiber, or carbon nanotube mat associated with the positive electrode, such that the second electroactive species is immobilized with respect to the mat of the positive electrode. The second electroactive species may also be part of a gel associated with the positive electrode in the same or similar manner as described above with respect to the first electroactive species.

According to one or more embodiments, the electroactive composite layer of the positive electrode may have a particular ratio of weight of electroactive material to carbonaceous material. The ratio by weight may be chosen to facilitate a high electrical current per mass of electroactive material. In some embodiments, a ratio by weight of the mass of electroactive material to the mass of carbonaceous material for the complementary electroactive composite layer may be between 1 to 2 and 2 to 1. In some embodiments, it may be 1 to 1. Other ratios are also possible.

The separator may serve as a protective layer that can prevent the respective electrochemical reactions at each electrode from interfering with each other. The separator may also help electronically isolate the negative and positive electrodes from one another and/or other components within the electrochemical cell to prevent short-circuiting. In some embodiments, the electrochemical cell comprises the conductive medium and the separator contains at least a portion of the conductive medium (e.g., conductive liquid). A person of ordinary skill, with the benefit of this disclosure, will be able to select a suitable separator. The separator may comprise a porous structure. In some instances, the separator is or comprises a porous solid material. In some embodiments, the separator is or comprises a membrane. The membrane of the separator may be made of suitable material. For example, the membrane of the separator may be or comprise a plastic film. Non-limiting examples of plastic films included include polyamide, polyolefin resins, polyester resins, polyurethane resin, or acrylic resin and containing lithium carbonate, or potassium hydroxide, or sodium-potassium peroxide dispersed therein. The material for the separator may comprise a cellulose membrane, a polymeric material, or a polymeric-ceramic composite material. Further examples of separators include polyvinylidene difluoride (PVDF)separators, PVDF-Alumina separators, or Celgard.

In the context of this disclosure, a conductive medium is understood to be a solid or fluid medium having sufficient ionic conductivity to support the operation of an electrochemical cell (e.g., by shuttling ions between the electrodes of the electrochemical cell to maintain charge balance). As mentioned above, the conductive medium may be a liquid or a solid electrolyte. In some embodiments, the conductive medium is or comprises a non-volatile liquid. In some such instances, the conductive medium is or comprises a room temperature ionic liquid such as 1-butyl-3-methylimidazolium bis(trifluoromethylsulfonyl)imide ([Bmim][$TF_2N$]). It should be understood that while the conductive medium can transport ions, the conductive medium is generally not electronically conductive (e.g., a metallic conductive) capable of short-circuiting an electrochemical cell when in contact with a negative electrode and a positive electrode.

In some cases, a separator contains a conductive liquid, which serves as the conductive medium. In some embodiments, the separator is at least partially (or completely) impregnated with the conductive liquid. For example, the separator may absorb an amount of the conductive liquid upon being submerged, coated, dipped, or otherwise associated with the conductive liquid. In some such cases where the separator is porous, some or all of the pores of the separator (in the interior and/or near the surface of the separator) may become at least partially filled with the conductive liquid. In some embodiments, the separator is saturated with the conductive liquid. A separator being saturated with a conductive liquid generally refers to the separator containing the maximum amount of conductive liquid capable of being contained within the volume of that separator at room temperature (23° C.) and ambient pressure. In some embodiments, the electrochemical cell may be provided without the conductive liquid present in the separator, but with the separator capable of containing the conductive liquid when it is put into operation to perform a gas separation process. One way in which the separator may be capable of containing the conductive liquid is by having a relatively high porosity and/or containing materials capable of absorbing and/or being wetted by the conductive liquid.

As mentioned above, in some embodiments the conductive liquid comprises an ionic liquid, for example, a room temperature ionic liquid ("RTIL"). The RTIL electrolyte may have a low volatility (i.e., a room temperature vapor pressure of less than $10^{-5}$ Pa, for example, from $10^{-10}$ to $10^{-5}$ Pa), thereby reducing the risk of electrodes drying, and allowing for flow of gas past the electrodes without significant loss to evaporation or entrainment. In some embodiments, the ionic liquid makes up substantially all (e.g., at least 80 vol %, at least 90 vol %, at least 95 vol %, at least 98 vol %, at least 99 vol %, at least 99.9 vol %) of the conductive liquid.

The ionic liquid may comprise an anion component and a cation component. The anion of the ionic liquid may comprise, without limitation: halide, sulfate, sulfonate, carbonate, bicarbonate, phosphate, nitrate, nitrate, acetate, $PF_6^-$, $BF_4^-$, triflate, nonaflate, bis(triflyl)amide, trifluoroacetate, heptaflurorobutanoate, haloaluminate, triazolide, and amino acid derivatives (e.g. proline with the proton on the nitrogen removed). The cation of the ionic liquid may comprise, without limitation: imidazolium, pyridinium, pyrrolidinium, phosphonium, ammonium, sulfonium, thiazolium, pyrazolium, piperidinium, triazolium, pyrazolium, oxazolium, guanadinium, and dialkylmorpholinium. In some embodiments, the room temperature ionic liquid comprises an imidazolium as a cation component. As one example, in some embodiments, the room temperature ionic liquid comprises 1-butyl-3-methylimidazolium ("Bmim") as a cation component. In some embodiments, the room temperature ionic liquid comprises bis(trifluoromethylsulfonyl)imide ("$TF_2N$") as an anion component. In some embodiments, the room temperature ionic liquid comprises 1-butyl-3-methylimidazolium bis(trifluoromethylsulfonyl)imide ([Bmim][$TF_2N$]).

In some embodiments, the room temperature ionic liquid comprises 1-butyl-3-methylimidazolium tetrafluoroborate ($BF_4$) ([Bmim][$BF_4$]).

In some embodiments, the conductive liquid comprises a low-volatility electrolyte solution. For example, the conductive liquid may comprise a liquid solvent having a relatively high boiling point and dissolved ionic species therein (e.g., dissolved supporting electrolyte ions). The liquid solvent having a relatively high boiling point may be non-aqueous. For example, the liquid solvent may comprise N,N-dimethylformamide (DMF) or the like.

Figure 5:
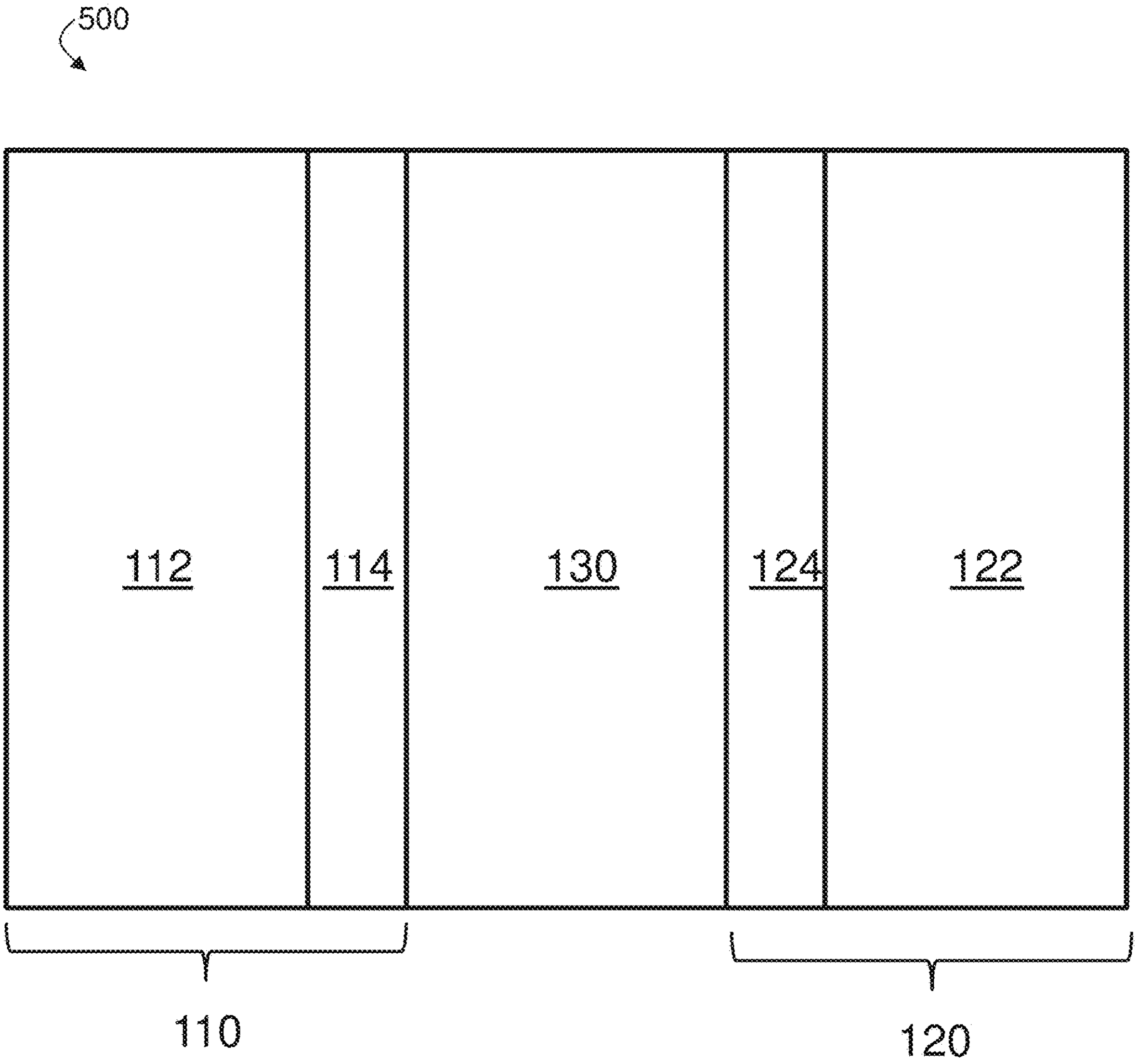
FIG. 5 shows a side-view schematic diagram of an exemplary electrochemical cell comprising a negative electrode, a positive electrode, and a separator, according to one or more embodiments.

In some cases, one or more electrodes of the electrochemical cell comprises an electroactive composite layer. For example, in some embodiments, the negative electrode comprises an electroactive composite layer (e.g., a primary electroactive composite layer). Referring to FIG. 5, negative electrode 110 comprises composite electroactive composite layer 114 facing positive electrode 120 of electrochemical cell 500, according to certain embodiments. In certain cases, the positive electrode comprises an electroactive composite layer (e.g., a complementary electroactive composite layer). For example, in FIG. 5, positive electrode 120 comprises electroactive composite layer 124 facing negative electrode 110. The electroactive composite layer of the positive electrode may also be referred to as complementary electroactive composite layer, as the electroactive species within it serves as an electron sink or electron source for the electroactive material of the negative electrode. In some cases, the electroactive composite layer of an electrode (e.g., negative electrode, positive electrode) extends through the entire thickness dimension of an electrode. For example, the electroactive composite layer may intercalate through an entire thickness of an electrode. However, in some embodiments, the electroactive composite layer of an electrode does not extend through the entire thickness dimension of an electrode. In some such cases, the electroactive composite layer intercalates through some of but not the entire thickness of the electrode. In certain cases, the electroactive composite layer is a coating on the surface of another component of the electrode (e.g., a current collector, a gas permeable layer, etc.).

In some embodiments, the electroactive species of an electrode (e.g., the first electroactive species of the negative electrode, the second electroactive species of the positive electrode), are part of an electroactive composite layer. For example, in FIG. 5, electroactive composite layer 114 comprises the first electroactive species described herein, according to some embodiments. Similarly, in some embodiments, electroactive composite layer 124 comprises the second electroactive species (e.g., polyvinylferrocene).

In addition to the electroactive species, the electroactive composite layer of the negative electrode may also comprise a carbonaceous material. Examples of suitable materials include, but are not limited to, carbon nanotube (e.g., single-walled carbon nanotube, multi-walled-carbon nanotube), carbon black, KetjenBlack, carbon black Super P, graphene, or combinations thereof. Other examples also include immobilizing and/or coating of the electroactive species (e.g., in polymeric forms, molecular forms or otherwise) into/onto a microfiber, nanofiber or carbon nanotube mat via intercalation, grafting, chemical vapor deposition (CVD), or otherwise.

According to one or more embodiments, the electroactive composite layer of the negative electrode may have a particular ratio of weight of electroactive species to carbonaceous material. The ratio by weight may be chosen to facilitate a high electronic current per mass of electroactive material. In some embodiments, a ratio by weight of the mass of electroactive material to the mass of carbonaceous material may be between 1 to 1 and 1 to 10. In some embodiments, it may be 1 to 3. Other ratios are also possible.

The negative electrode may further comprise a gas permeable layer. The gas permeable layer (which may also be referred to as a substrate layer) may be proximate to the electroactive composite layer, and facing outward from the electrochemical cell. In some embodiments, the gas permeable layer is in contact with the first electroactive species. In some such cases, the gas permeable layer is in direct contact with the first electroactive species, while in other such cases, the gas permeable layer is in indirect contact with the first electroactive species. It should be understood that when a portion (e.g., layer,) is “on” or “in contact with” another portion, it can be directly on the portion, or an intervening portion (e.g., layer) also may be present (in which case the portion is understood to be “indirectly on” or “in indirect contact with” the other portion). A portion that is “directly on”, “in direct contact with”, another portion means that no intervening portion is present. It should also be understood that when a portion is referred to as being “on” or “in contact with” another portion, it may cover the entire portion or a part of the portion. In some embodiments, the gas permeable layer is in contact (e.g., in direct contact with or in indirect contact with) with the electroactive composite layer of the negative electrode.

A fluid mixture in the form of a gas stream (e.g., comprising the first Lewis acid gas and the second Lewis acid gas) may diffuse through the gas permeable layer to come into contact with the electroactive composite layer. The gas permeable layer may comprise a conductive solid material and act as a current collector within the cell.

The gas permeable layer may comprise a porous material. In some embodiments, the gas permeable layer has a porosity, for example, of greater than or equal to 60%, greater than or equal to 70%, greater than or equal to the 75%, greater than or equal to 80%, or greater. In some embodiments, the gas permeable layer has a porosity of less than or equal to 85%, less than or equal to 90%, or more. Combinations of these ranges are possible. For example, in some embodiments, the gas permeable layer of the negative electrode has a porosity of greater than or equal to 60% and less than or equal to 90%. Other porosities are also possible. Examples of suitable materials for the gas permeable layer include, without limitation, carbon paper (treated, TEFLON-treated, or untreated), carbon cloth, and nonwoven carbon mat. Other materials may also be used.

While in some embodiments the electrochemical cell comprises a single negative electrode, in other embodiments the electrochemical cell comprises more than one negative electrode. For example, in some embodiments, the negative electrode described herein is a first negative electrode, and the electrochemical cell comprises a second negative electrode. The positive electrode may be between the first negative electrode and the second negative electrode. The second negative electrode may also comprise the first electroactive species. The second negative electrode may be identical in configuration and composition to the first negative electrode. In some embodiments, the electrochemical cell comprises greater than or equal to 1 negative electrode, greater than or equal to 2 negative electrodes, greater than or equal to 3 negative electrodes, greater than or equal to 5 negative electrodes, greater than or equal to 10 negative electrodes, and/or up to 15 negative electrodes, up to 20 negative electrodes, up to 50 negative electrodes, or more.

While in some embodiments the electrochemical cell comprises a single separator (e.g., between the negative electrode and the positive electrode), in other embodiments the electrochemical cell comprises more than one separator. For example, in some embodiments, the separator described herein is a first separator, and the electrochemical cell comprises a second separator. In some embodiments in which a second negative electrode is present, the second separator may be between the positive electrode and the second negative electrode. The second separator may be identical in configuration and composition to the first separator. In certain cases, the second separator is capable of comprising (e.g., being saturated with) the conductive liquid. In some embodiments, the electrochemical cell comprises greater than or equal to 1 separator, greater than or equal to 2 separators, greater than or equal to 3 separators, greater than or equal to 5 separators, greater than or equal to 10 separators, and/or up to 15 separators, up to 20 separators, up to 50 separators, or more. In some cases, each of the separators is between a respective negative electrode and positive electrode.

In some embodiments of the electrochemical cell in which the positive electrode has a negative electrode on either side (e.g., a first negative electrode and a second negative electrode), the positive electrode comprises second electroactive species facing each of the negative electrodes. In some such embodiments, the positive electrode comprises two complementary electroactive composite layers, each facing one of the negative electrodes.

The positive electrode may further comprise a substrate layer positioned proximate to or between the electroactive composite layer or layers. The substrate layer may be in direct contact or in indirect contact with the electroactive composite layer or layers. The substrate layer of the positive electrode may comprise the same or different material as that of the substrate layer of the negative electrode (when present). For example, the substrate layer may comprise a material such as carbon paper (treated, TEFLON-treated, or untreated), carbon cloth, or nonwoven carbon mat. The substrate may comprise, in some embodiments, a mat comprising, for example carbon nanotubes, microfibers, nanofibers, or combinations thereof. Other materials are also possible. The substrate layer of the positive electrode may comprise a conductive material and act as a current collector within the cell. In some embodiments, the substate comprises a metal and/or metal alloy. For example, the substrate may comprise a metal and/or metal alloy foil (e.g., having a relatively small thickness of less than or equal to 200 microns, less than or equal to 100 microns, less than or equal to 10 microns, and/or as low as 1 micron, or less). Examples of suitable foils could include, but are not limited to, aluminum foils, titanium foils. As a particular example, in some embodiments, the positive electrode comprises a substrate between a first complementary electroactive composite layer facing the first negative electrode and a second complementary electroactive composite layer facing the second negative electrode. In this context, an electroactive composite layer of the positive electrode can be facing a particular electrode (e.g., a negative electrode) if a line extending away from the bulk of the electroactive composite layer can intersect that electrode without passing through the substrate. An object (e.g., electroactive composite layer) can be facing another object when it is in contact with the other object, or when one or more intermediate materials are positioned between the surface and the other object. For example, two objects that are facing each other can be in contact or can include one or more intermediate materials (e.g., a separator) between them.

Figure 6:
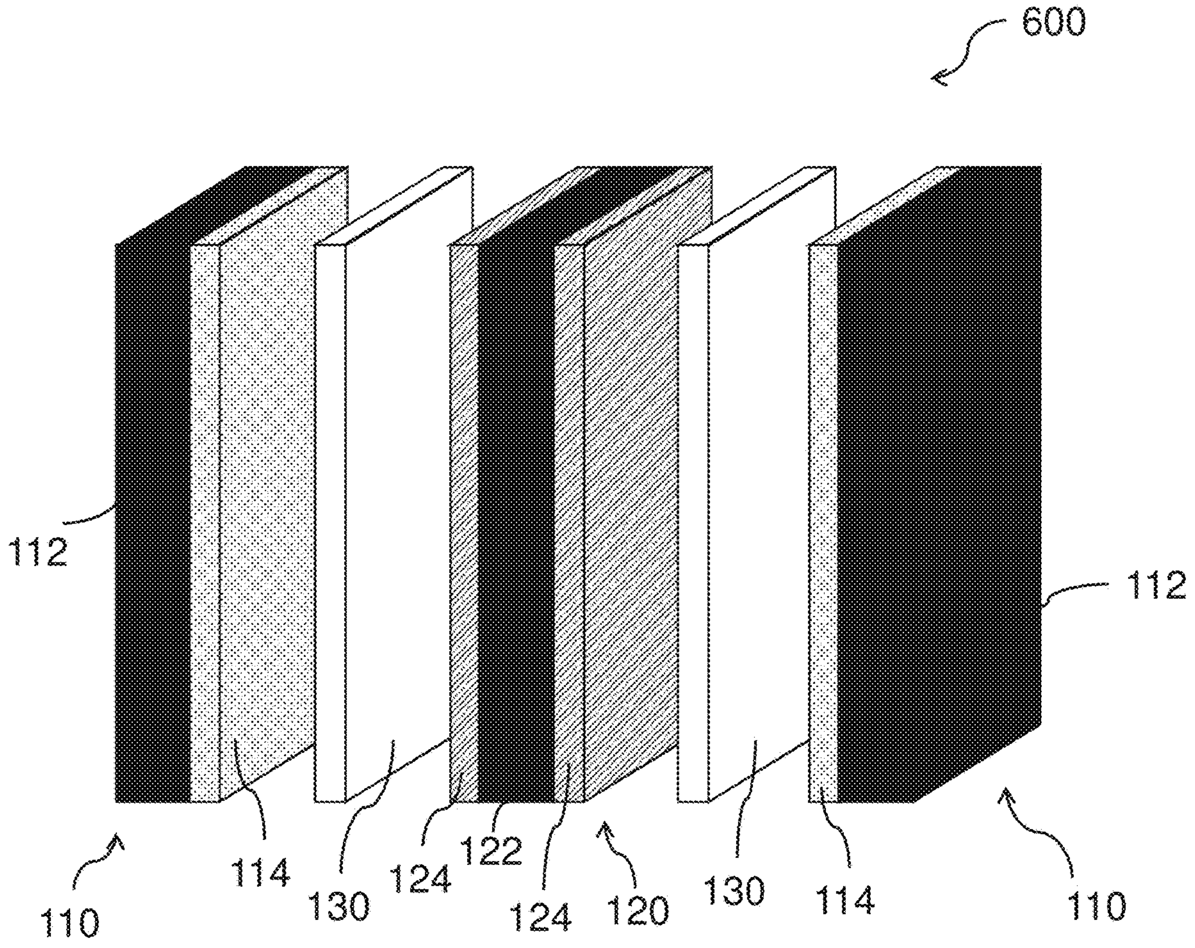
FIG. 6 shows an exploded schematic diagram of an exemplary electrochemical cell, according to one or more embodiments.

FIG. 6 depicts a schematic cross-sectional diagram of an example of an electrochemical cell, according to some, but not necessarily all embodiments, and having one or more of the components described above. Electrochemical cell 600 comprises a positive electrode 120 between two negative electrodes 110. Separators 130 separate positive and negative electrodes 120 and 110. Each of negative electrodes 110 comprises an optional gas permeable layer 112, which is positioned away from the center of the cell 100, and an optional primary electroactive composite layer 114, which faces toward the positive electrode 120. In some embodiments, positive electrode 120 comprises substrate layer 122 and two complementary electroactive composite layers thereon. The different components of the electrochemical cell 100 may have certain properties described throughout this disclosure, for example, comprising the electrode materials (e.g., electroactive species) described above. The configuration of two outwardly-facing negative electrodes 110, as shown, for example, in FIG. 2, may, in some cases, provide the advantage of doubling the gas-adsorbing area exposed to the gas compared to electrochemical cells comprising a single negative electrode and a single positive electrode. The electrochemical apparatus can be provided in any of a variety of forms, depending on a desired application and/or the nature of the fluid mixture. The electrochemical apparatus may be configured to electrochemically capture and/or separate Lewis acid gases from gas mixtures. In some such instances, the electrochemical apparatus comprises a chamber with a gaseous or vacuum headspace able to be filled at least partially with the gaseous fluid mixture. In some such embodiments, the fluid inlet of the chamber is fluidically connected to a source of the gas mixture and one or more components for causing the gas mixture to be transported, such as a pump or vacuum and associated valving.

In some embodiments, the electrochemical apparatus is configured to electrochemically capture and/or separate Lewis acid gases from liquid mixtures. In some such instances, the electrochemical apparatus comprises a chamber able to be at least partially filled with a solution. In certain instances, the electrochemical apparatus, including the chamber and the electrochemical cell, is configured like that of a redox flow battery, wherein one of the flowed liquid solutions enters via the fluid inlet of the chamber and exits via the fluid outlet during operation. In certain embodiments, a portion of the chamber in fluidic contact with the negative electrode is fluidically connected to an absorbent material. As one non-limiting example, the chamber may be fluidically connected to an absorber tower. However, in some embodiments, the electrochemical apparatus is configured such that the first Lewis acid gas is captured directly at the negative electrode (e.g., by binding with the electroactive species during and/or after the application of the potential difference).

In some embodiments, the electrochemical cell is configured as a solid-state electrochemical cell system. In some such instances, the electroactive species may be immobilized on at least part of the negative electrode, as described above.

The electrochemical apparatus may be configured as a gas separation system. According to one or more embodiments, one or more electrochemical cells as described herein (e.g., configured for selective removal of Lewis acid gases) may be incorporated into a gas separation system. The gas separation system may comprise a plurality of electrochemical cells, according to any of the embodiments described herein, in fluid communication with a gas inlet and a gas outlet. The electrochemical cells electrically connected in parallel or in series, as described in more detail below.

The gas separation system may comprise an external circuit connecting the negative electrode (or the first and second negative electrodes when both are present) and the positive electrode of each electrochemical cell to a power source configured to apply a potential difference across the negatives electrode(s) and the positive electrode of each electrochemical cell.

Figure 7A:
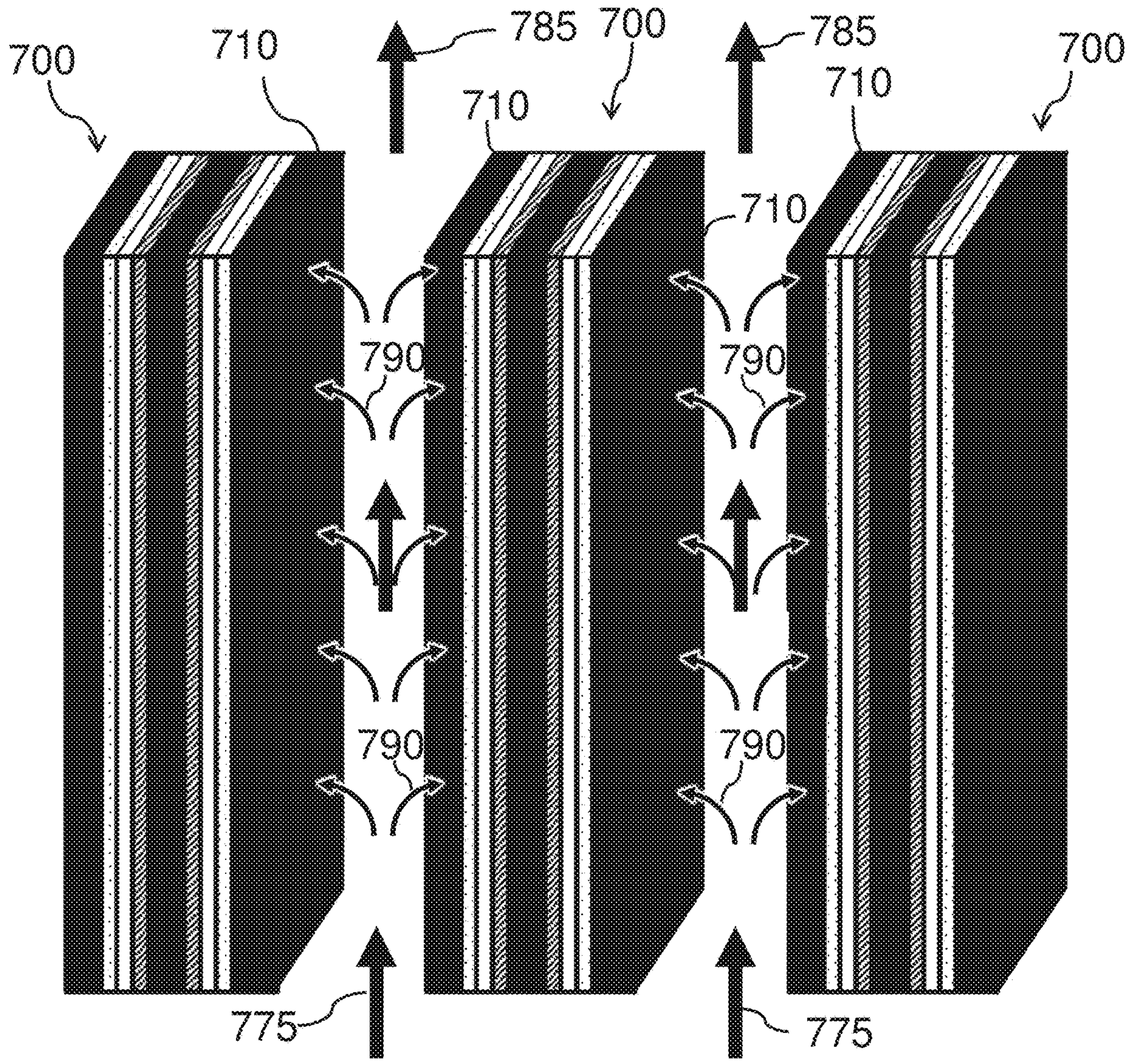
FIG. 7A shows a schematic drawing of an exemplary system performing a gas separation process, according to one or more embodiments.

FIG. 7A shows a schematic drawing of an exemplary system performing a gas separation process during a charge mode, according to one or more embodiments. In FIG. 7A, a potential difference is applied across each of electrochemical cells 700, such that each operates in a charge mode, according to certain embodiments. In the charge mode, a redox reaction (e.g., reduction) of the first electroactive species in the negative electrode 710 increases the affinity between the electroactive species and Lewis acid gas 790, according to certain embodiments. A gas mixture 775 comprising the Lewis acid gas 790 is introduced to the system and passes in proximity to the negative electrodes 710. The increased affinity causes the Lewis acid gas (e.g., $SO_2$) to bond to the electroactive material, according to certain embodiments. In this manner, at least a portion of the Lewis acid gas is separated from the gas mixture 775 to produce treated gas mixture 785.

Figure 7B:
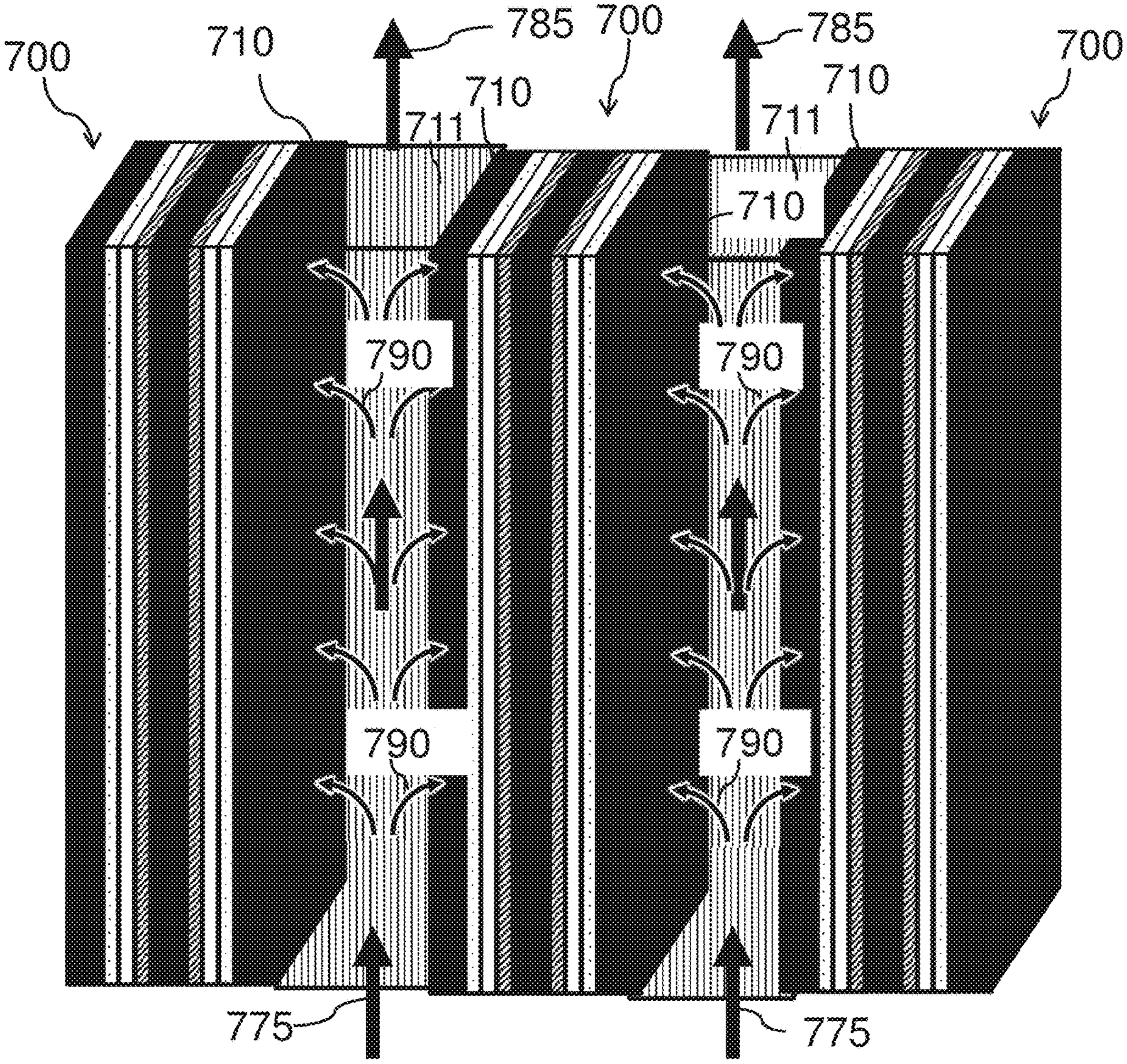
FIG. 7B shows a schematic drawing of an exemplary system comprising flow fields, performing a gas separation process, according to one or more embodiments.

In some embodiments, a gas separation system comprises a plurality of electrochemical cells, and a flow field is between at least some (e.g., some or all) of the plurality of electrochemical cells. As an illustrative example, FIG. 7B shows a schematic drawing of an exemplary system comprising flow fields 711 separating electrochemical cells 570, performing a gas separation process during a charge mode, according to one or more embodiments. It should be understood that when a first object is between a second object and a third object, it may be between an entirety of the first object and second object or between portions of the first object and second object. In some embodiments, a flow field between two neighboring electrochemical cells is directly adjacent to each of the neighboring electrochemical cells such that no intervening structures/layers are between the flow field and the electrochemical cells. However, in some embodiments, a flow field between two neighboring electrochemical cells is indirectly adjacent to one or both cells, such that there are one or more intervening structures/layers such as electrically conductive solids.

Figure 7C:
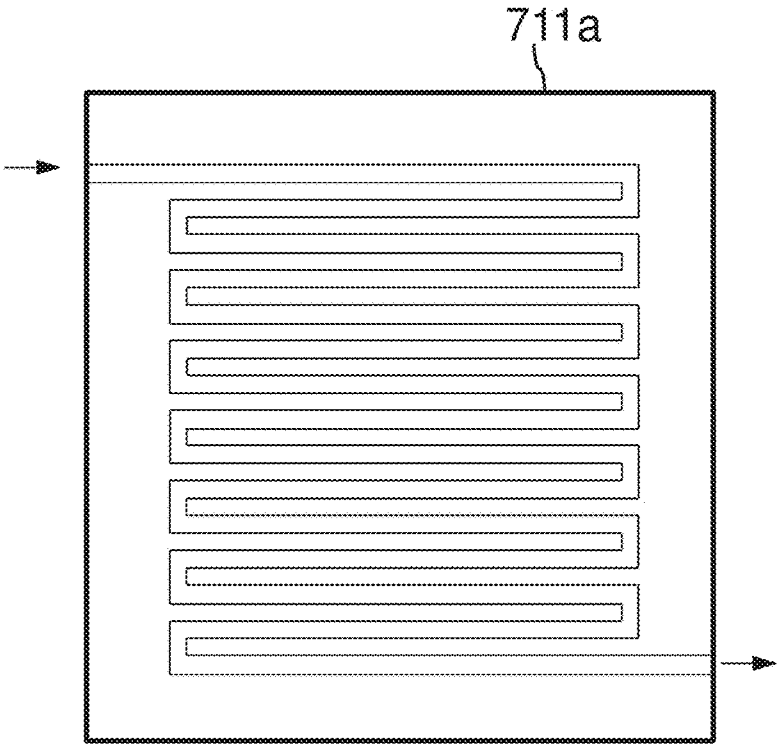
FIGS. 7C-7E show side view schematic illustrations of exemplary flow field channel patterns, according to one or more embodiments.
Figure 7D:
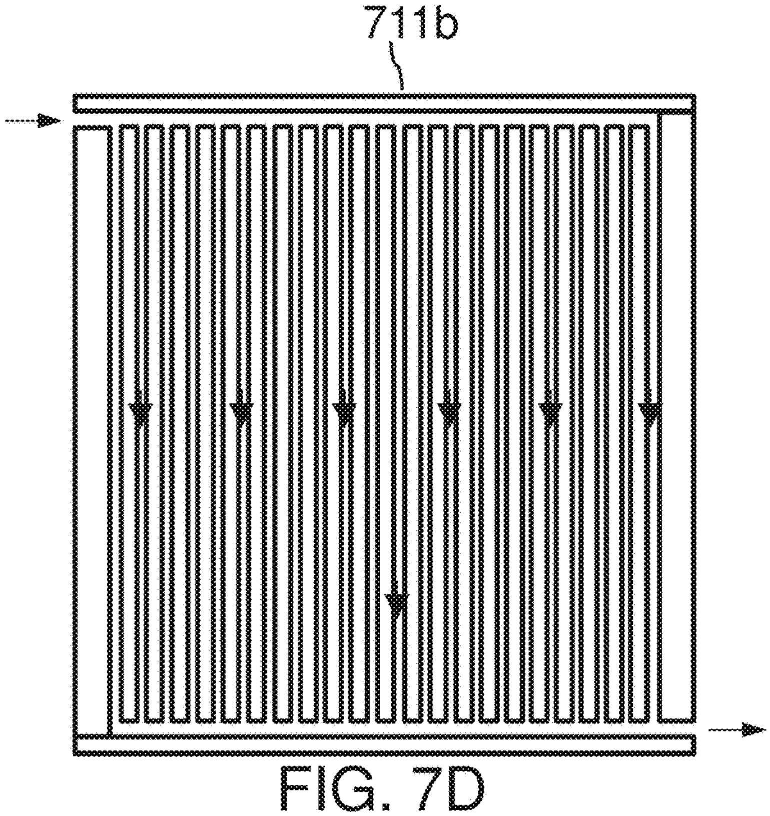
Figure 7E:
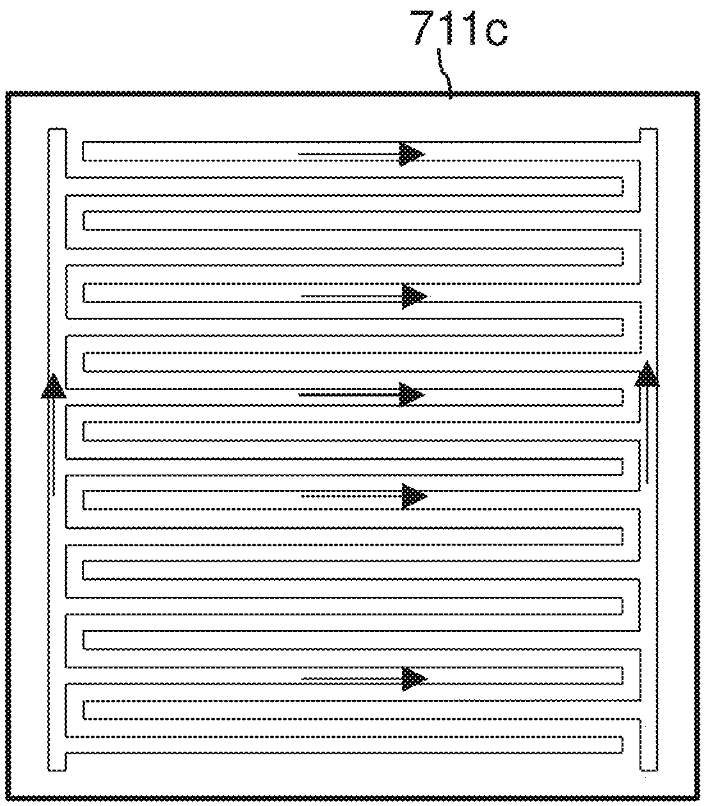

A flow field generally refers to a solid structure configured to define pathways through which a fluid may flow. In some instances, a flow field comprises a solid article defining pores or channels for fluid flow while allowing the fluid to be exposed to adjacent structures. Suitable materials for the solid articles of flow fields include, but are not limited to, polymeric materials (e.g., plastics), metals/metal alloys, graphite, composite materials (e.g., a graphite-polymer composite). In some embodiments, a flow field comprises a solid article comprising one or more surfaces with patterned channels. The channel patterns may be selected to distribute fluid (e.g., gas) effectively across one or more dimensions of the flow field. Suitable channel patterns include, but are not limited to serpentine, parallel, and interdigitated. FIGS. 7C, 7D, and 7E show side-view schematic drawings of faces of flows field 711*a* having a serpentine pattern, flow field 711*b* having a parallel pattern, and flow field 711*c* having an interdigitated pattern, respectively with fluid flow direction indicated as arrows, according to certain embodiments. Flow field channel patterns can be formed, for example, via etching, cutting, stamping, molding, milling, or additive manufacturing. In some embodiments, a flow field comprises a porous solid. For example, a flow field may comprise carbon fiber paper, felt, or cloth, or metal foam.

In FIG. 7B, Lewis acid gas 790 from fluid mixture 775 is distributed along a facial area of electrode 710 via flow field 711 (e.g., via channels not shown). It has been realized in the context of the present disclosure that flow fields may assist with distributing gas mixtures relatively uniformly across electrodes and may assist with controlling the duration of exposure of the gas to the electrodes (e.g., to promote efficient capture of target gases). Relatively uniform distribution of gas may increase efficiency by utilizing a larger percentage of electrode area (e.g., comprising electroactive species in at least one reduced state) for binding target gas. In some embodiments, during at least a portion of a charging process, a flux of the gas mixture across at least 25%, at least 50%, at least 75%, at least 90%, at least 95%, or more of a facial area of a negative electrode in the system is within 50%, within 25%, within 15%, within 10%, within 5%, within 2%, within 1% or less of an average flux across the entire facial area of the negative electrode during the charging process.

Figure 8A:
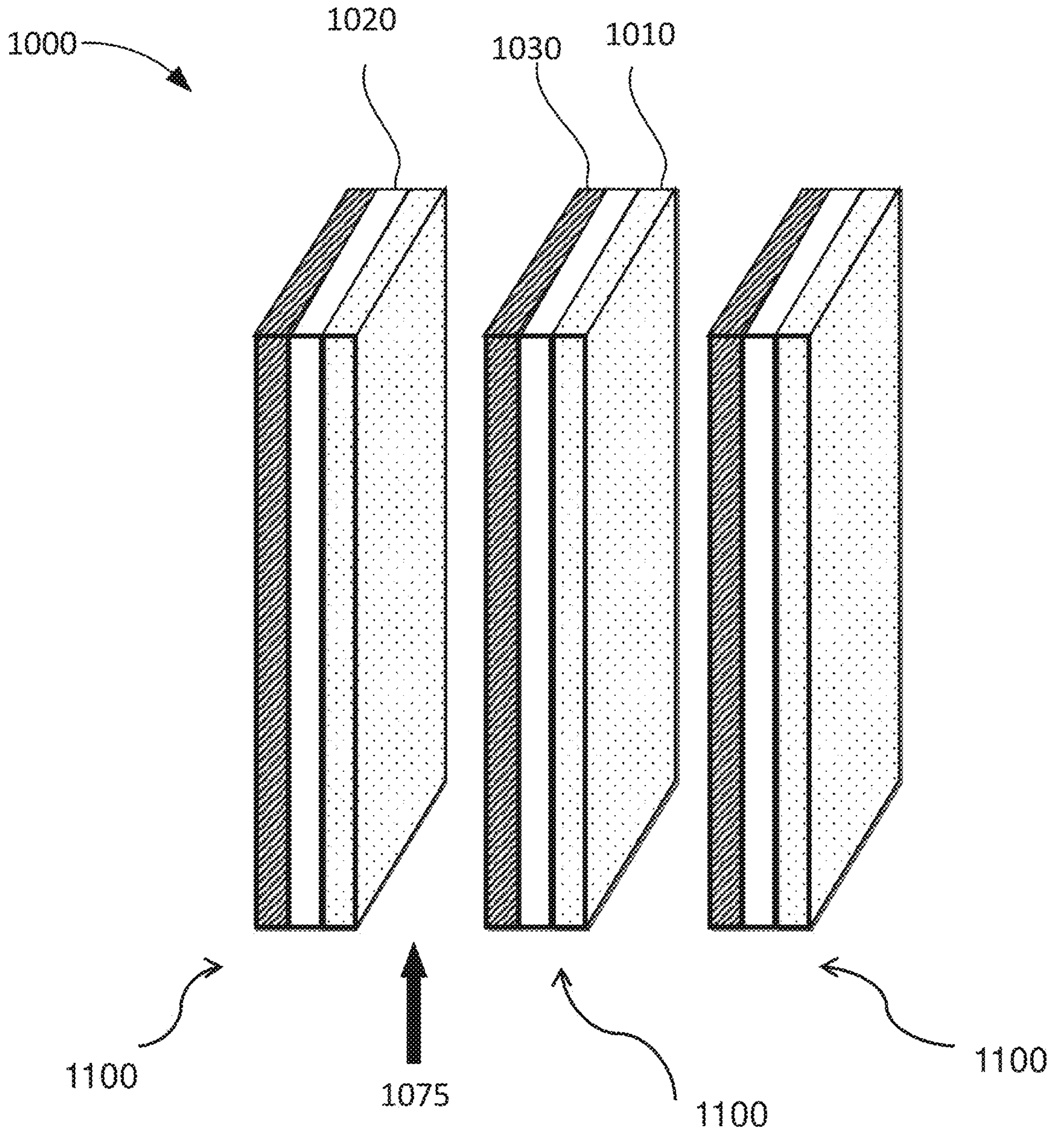
FIG. 8A shows a schematic drawing of an exemplary system comprising a plurality of electrochemical cells performing a gas separation process, according to one or more embodiments.

As mentioned above, a gas separation system may comprise a plurality of electrochemical cells electrically connected in parallel or in series. One of ordinary skill in the art, with the benefit of this disclosure, would understand generally how to electrically connect electrochemical cells to form a circuit. Such connections can be made by establishing an electrically conductive pathway for electrons to flow between electrodes of the electrochemical cells (in other words, establishing electrical coupling between electrodes). An electrically conductive pathway may in some instances be established via one or more electrically conductive solid materials (e.g., conductive metals, alloys, polymers, composites, carbonaceous materials, or combinations thereof). For example, an electrically conductive pathway may be established via wiring electrodes of the electrochemical cells. The electrochemical cells may have any of the configurations described above. For example, in some embodiments, some or all of the electrochemical cells in the system have a single negative electrode (e.g., comprising a first electroactive species), a single positive electrode (e.g., comprising a second electroactive species), and optionally a separator between the first positive electrode and the second positive electrode. FIG. 8A shows a schematic drawing of an arrangement of electrochemical cells 1100 in one such system 1000, where each electrochemical cell comprises, in order, negative electrode 1010, optional separator 1020, and positive electrode 1030, according to certain embodiments. A gas mixture 1075 comprising a target gas may be introduced to the system such that gas mixture 1075 passes in proximity to negative electrode 1010 of first electrochemical cell 110 and positive electrode 1030 of neighboring second electrochemical cell 1100. While FIG. 8A shows three electrochemical cells 1100, it should be understood than any of a variety of suitable numbers of electrochemical cells may be employed in a gas separation system (e.g., electrically connected in parallel or in series), depending on the requirements of a particular application as needed.

In other embodiments, some or all of the electrochemical cells in a gas separation system comprise a positive electrode (e.g., comprising a second electroactive species), a first negative electrode (e.g., comprising the first electroactive species), a second negative electrode (e.g., comprising the first electroactive species), a first separator between the first negative electrode and the positive electrode, and a second separator between the positive electrode and the second negative electrode. Examples of such electrochemical cells are shown in FIG. 6 and FIGS. 7A-7B.

Figure 8B:
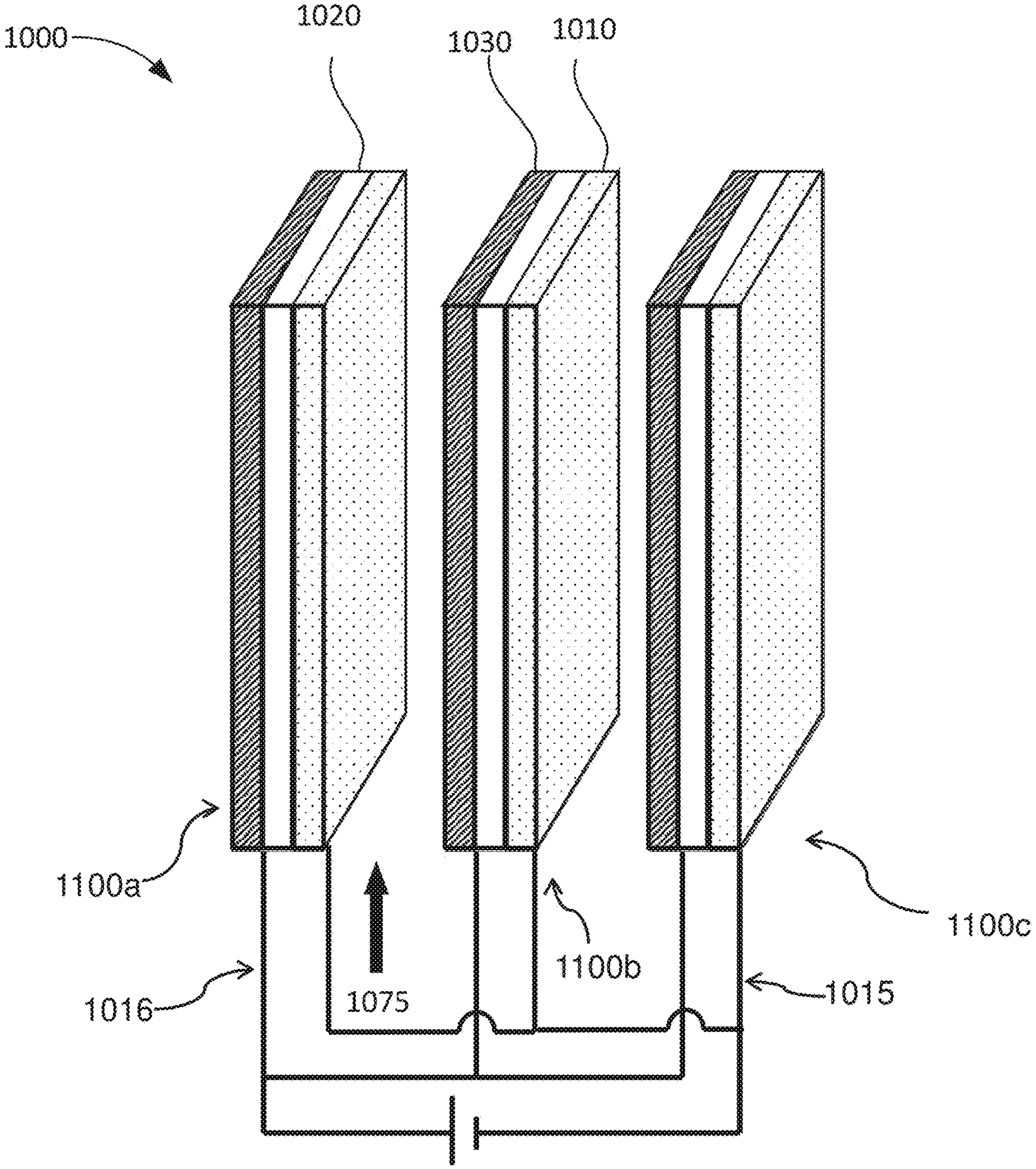
FIG. 8B shows a schematic drawing of an exemplary system comprising a plurality of electrochemical cells electrically connected in parallel performing a gas separation process, according to one or more embodiments.

FIG. 8B shows a schematic drawing of configuration in which a plurality of electrochemical cells 1100 in system 1000 are electrically connected in parallel, according to certain embodiments. In a parallel configuration, each negative electrode 1010 is electrically coupled to a first terminal (e.g., of a power source) and each positive electrode 1030 is electrically coupled to a second terminal (e.g., of a power source). For example, in FIG. 8B, each negative electrode 1010 is electrically coupled to a first terminal of a power source via wiring 115, and each positive electrode 1030 is electrically coupled to a second terminal of the power source via wiring 116, in accordance with certain embodiments.

Figure 8C:
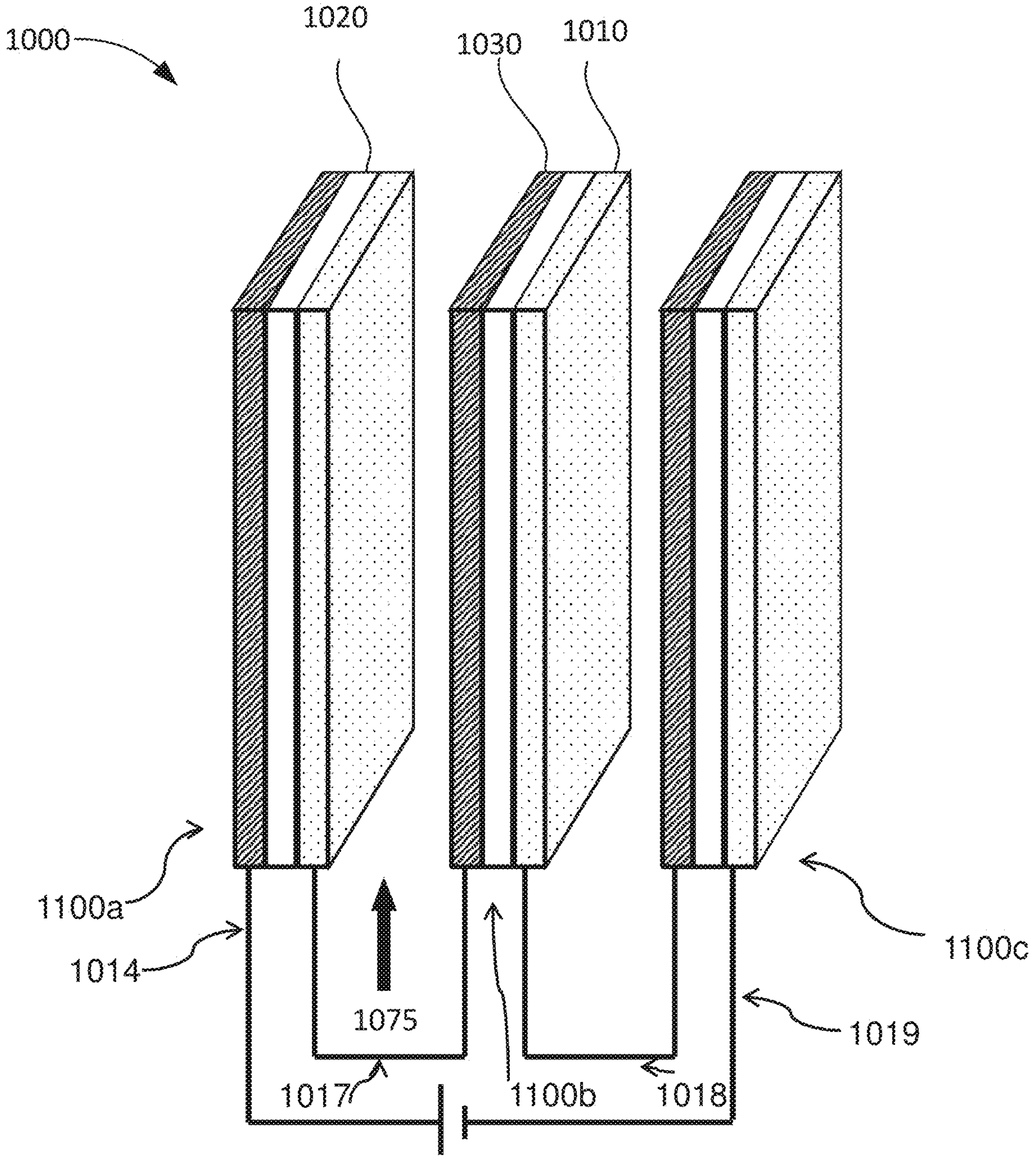
FIG. 8C shows a schematic drawing of an exemplary system comprising a plurality of electrochemical cells electrically connected in series performing a gas separation process, according to one or more embodiments.

FIG. 8C shows a schematic drawing of a configuration in which a plurality of electrochemical cells 11000 in system 1000 are electrically connected in series, according to certain embodiments. In a series configuration, a positive electrode of a first electrochemical cell is electrically connected to a negative electrode of a second electrochemical cell of the system. For example, in FIG. 8B, negative electrode 1010 of first electrochemical cell 1100*a* is electrically connected to positive electrode 1030 of second electrochemical cell 1100*b* via wiring 1017, and negative electrode 1010 of second electrochemical cell 1100*b* is electrically connected to positive electrode 1030 of third electrochemical cell 1100*c* via wiring 1018, according to certain embodiments. Further, positive electrode 1030 of first electrochemical cell 1100*a* is electrically coupled to a first terminal of a power source via wiring 114, and negative electrode 1030 of third electrochemical cell 1100*a* is electrically coupled to a second terminal of the power source via wiring 119, in accordance with certain embodiments.

It has been determined in the context of this disclosure that certain configurations of gas separation systems comprising a plurality of electrochemical cells electrically connected in series may promote relatively efficient charge transport/and/or gas transport. For example, in some embodiments, electrically conductive materials between lectrochemical cells may establish electrically conductive pathways rather than using external wiring. For example, a gas separation system may comprise a first electrochemical cell and a second electrochemical cell electrically connected in series, where the electrical connection is established via one or more electrically conductive materials between the first electrochemical cell and the second electrochemical cell. Any of a variety of suitable electrically conductive materials may be positioned between electrochemical cells to establish electrical connection between, for example, a negative electrode of the first electrochemical cell and a positive electrode of the second electrochemical cell. For example, an electrically conductive material may be an electrically conductive solid. The electrically conductive solid may comprise, for example, a metal and/or metal alloy (e.g., steel, silver metal/alloy, copper metal/alloy, aluminum metal/alloy, titanium metal/alloy, nickel metal/alloy). In some embodiments, the electrically conductive solid comprises a carbonaceous material (e.g., graphite, single-walled carbon nanotubes, multi-walled-carbon nanotubes, carbon black, a carbon mat (e.g., carbon nanotube mat), KetjenBlack, carbon black Super P, graphene, and the like. In some embodiments, the carbonaceous material is a porous carbonaceous material as described elsewhere herein. In some embodiments, the electrically conductive solid comprises a composite of an electrically conductive solid with a binder resin. In some embodiments, an electrically conductive solid between electrochemical cells comprises an electrically conductive polymeric material.

In some, but not necessarily all embodiments, an electrically conductive material between electrochemical cells comprises a bipolar plate. It should be understood that in the context of this disclosure a plate need not necessarily be flat. Bipolar plates are known to those of skill in the art and are typically used in fields other than gas separation, such as in fuel cells. A bipolar plate may be configured to separate fluid (e.g., gas) contacting the positive electrode from the fluid contacting the negative electrode. Bipolar plates may comprise electrically conductive solids such as steel, titanium, or graphite.

In some embodiments, at least some of the plurality of electrochemical cells (e.g., connected in series) are separated by a flow field. As mentioned above, positioning a flow field between neighboring electrochemical cells may promote beneficial gas distribution and relatively efficient interaction between gases and the electrodes (e.g., for binding). In some embodiments, a bipolar plate as described above comprises a flow field (e.g., via etching of fluidic pathways in one or both faces of the plate), though in other embodiments a different flow field is employed as an alternative or in addition to the flow-field-containing bipolar plate.

Figure 9:
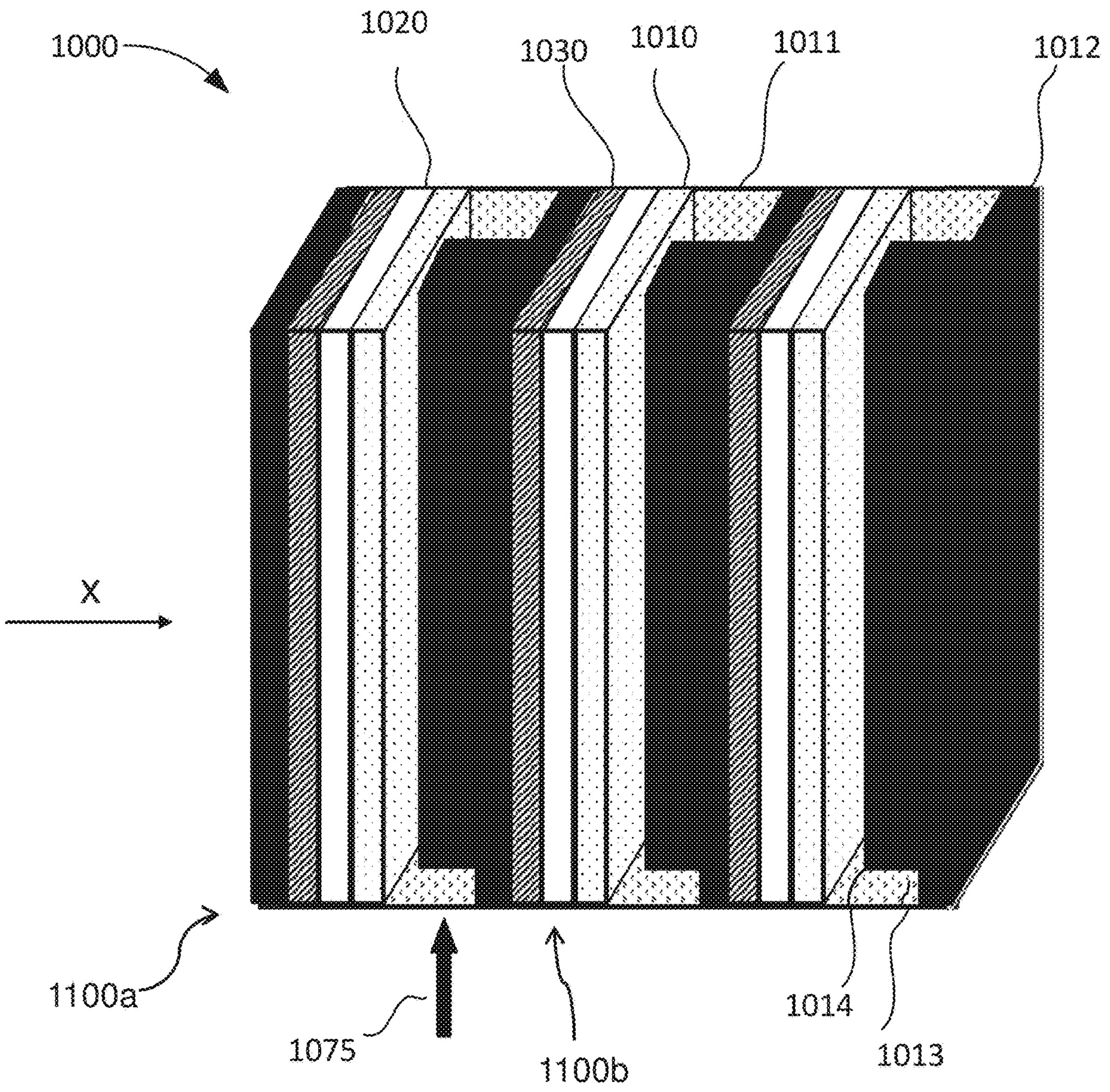
FIG. 9 shows a schematic drawing of an exemplary system comprising a plurality of electrochemical cells electrically connected in series and one or more electrically conductive materials between electrochemical cells, performing a gas separation process, according to one or more embodiments.

FIG. 9 shows a schematic diagram of exemplary gas separation system 1000 comprising electrochemical cells 1100 electrically connected in series via one or more electrically conductive materials between cells, according to certain embodiments. In FIG. 9, system 1000 comprises electrically conductive solid materials in the form of bipolar plates 1012 and ribs 1014. Ribs in a gas separation system may be made of any of the electrically conductive solid materials described above. In the embodiment shown in FIG. 9, first electrochemical cell 1100*a* is separated from second electrochemical cell 1100*b* via bipolar plate 1012 and rib 1014. Bipolar plate 1012 and rib 1014 may be directly adjacent to negative electrode 1010 of first electrochemical cell 1100*a* and positive electrode 1030 of second electrochemical cell 1100*b*, thereby establishing an electrically conductive pathway for the series connection. Other electrochemical cells in the system may be electrically connected similarly. While FIG. 9 shows bipolar plates and ribs, such a depiction is non-limiting, and other configurations (e.g., without bipolar plates, without ribs, etc.) are possible. FIG. 9 also shows optional flow fields 1011 separating electrochemical cells 1100, in accordance with certain embodiments. In some embodiments, one or more components (e.g., electrically conductive solids such as ribs) may establish channels between negative electrodes and positive electrodes of neighboring electrochemical cells. For example, ribs 1014 in FIG. 9 may have dimensions such that channels 1013 establish pathways for gas (e.g., gas mixtures) to flow between electrochemical cells 1011 and interact with the electrodes. For example, gas mixture 1075 may be passed through channel 1013, through flow field 1011, and between first electrochemical cell 1100*a* and second electrochemical cell 1100*b*, according to certain embodiments.

The flow of electrical current in certain embodiments described above may encounter less electrical resistance compared to other configurations. For example, in some embodiments in which electrochemical cells are connected in series via electrically conductive materials between at least some of a stack of electrochemical cells, electrical current can flow in a direction perpendicular to the stack. FIG. 9 shows one such example, where electrical current can flow in direction x perpendicular to electrochemical cells 1100, while gas mixture 1075 can flow in a direction parallel to electrochemical cells 1100. In FIG. 9, the path through which the current travels is relatively short and is determined by the thickness of bipolar plate 1012 and rib 1014. In some embodiments, a thickness of the one or more electrically conductive solids between electrochemical cells is less than or equal to 10 mm, less than or equal to 5 mm, less than or equal to 2 mm, less than or equal to 1 mm, and/or as low as 0.5 mm, as low as 0.2 mm, as low as 0.1 mm, or lower. In contrast, in embodiments in which electrochemical cells are electrically connected in parallel or electrically connected in series via external wiring, electrical current must flow through up to an entire height and/or length of electrodes (e.g., current collectors of electrodes) and through electrode tabs to reach the external wiring. Such heights and/or lengths may be, for example, at least 1 cm, at least 2 cm, at least 5 cm, at least 10 cm, and/or up to 20 cm, up to 50 cm, up to 100 cm, or more. The greater distances for current travel in such embodiments generally results in greater total cell resistance, which may reduce charge transport and/or energy efficiency for methods of at least partial gas separation described herein.

In some embodiments, the negative electrode or portion thereof (e.g., an electroactive composite layer of the negative electrode when present) is be able to absorb a gas (e.g., $SO_2$, $CO_2$) at a particular rate. For example, in some embodiments, the negative electrode or portion thereof (e.g., an electroactive composite layer of the negative electrode when present) has an absorption capacity rate of at least 0.0001 mol per $m^2$ per second, at least 0.0002 mol per $m^2$ per second, at least 0.0005 mol per m 2 per second, or more. In some embodiments, the negative electrode or portion thereof (e.g., an electroactive composite layer of the negative electrode when present) has an absorption capacity rate of less than or equal to 0.001 mol per $m^2$ per second, less than or equal to 0.0008 mol per $m^2$ per second, less than or equal to 0.0005 mol per $m^2$ per second, or less. In some embodiments, the electroactive composite layer has an absorption capacity rate of at least 0.0001 and less than or equal to 0.0005 mol per $m^2$ per second. Other absorption capacities rates are also possible.

In some embodiments, an electroactive composite layer of a negative electrode may have a particular surface area able to be exposed to a fluid mixture (e.g., gas mixture), for example, of greater than or equal to 5 $cm^2$, greater than or equal to 8 $cm^2$, greater than or equal to 10 $cm^2$, and/or up to 10 $cm^2$, up to 20 $cm^2$, up to 50 $cm^2$, up to 1 $m^2$, or more. Other values are also possible.

In some embodiments, at least a portion or all of an electrode (e.g., negative electrode, positive electrode) described herein is comprises a porous material. A porous electrode may be made of any suitable material and/or may comprise any suitable shape or size. In a non-limiting embodiment, the electrode comprises a porous carbonaceous material. The term carbonaceous material is given its ordinary meaning in the art and refers to a material comprising carbon or graphite that is electrically conductive. Non-limiting example of carbonaceous materials include carbon nanotubes, carbon fibers (e.g., carbon nanofibers), carbon mat (e.g., carbon nanotube mat), and/or graphite. In some such embodiments, the electrode may be partially fabricated from the carbonaceous material or the carbonaceous material may be deposited over an underlying material. The underlying material generally comprises a conductive material, for example, a metal and/or metal alloy solid (e.g., steel, copper, aluminum, etc.). Other non-limiting examples of conductive materials are described herein.

In some embodiments, an electrode (e.g., the negative electrode, the positive electrode) is porous. The porosity of an electrode may be measured as a percentage or fraction of the void spaces in the electrode. The percent porosity of an electrode may be measured using techniques known to those of ordinary skill in the art, for example, using volume/density methods, water saturation methods, water evaporation methods, mercury intrusion porosimetry methods, and nitrogen gas adsorption methods. In some embodiments, the electrode is at least 10% porous, at least 20% porous, at least 30% porous, at least 40% porous, at least 50% porous, at least 60% porous, at least 70% porous or greater. In some embodiments, the electrode is up to 90% porous, up to 85% porous, up to 80% porous, up to 70% porous, up to 50% porous, up to 30% porous, up to 20% porous, up to 10% porous or less. Combinations of these ranges are possible. For example, the electrode may be at least 10% porous and up to 90% porous. The pores may be open pores (e.g., have at least one part of the pore open to an outer surface of the electrode and/or another pore). In some cases, only a portion of the electrode is porous. For example, in some cases, only a single surface of the electrode is porous. As another example, in some cases, the outer surface of the electrode is porous and the inner core of the electrode is substantially non-porous (e.g., less than or equal to 20%, less than or equal to 10% porous, less than or equal to 5% porous, less than or equal to 1% or less). In a particular embodiment, the entire electrode is substantially porous.

In some embodiments, the electrochemical cell has a particular cycle time. The cycle time of an electrochemical cell generally refers to the period of time in performance of one charge mode and one discharge mode. The cycle time may be at least 60 seconds, at least 100 seconds, at least 300 seconds, at least 500 seconds, at least 1000 seconds, or more. In some embodiments, the cycle time is less than or equal to 3600 seconds, less than or equal to 2400 seconds, less than or equal to 1800 seconds, or less. Combinations of these ranges are possible. For example, in some embodiments, the cycle time is at least 60 seconds and less than or equal to 3600 seconds, or at least 300 seconds and less than or equal to 1800 seconds.

According to some embodiments, the electrochemical cell and its components have a particular thickness, depending on the desired application (e.g., gas separation of ventilator air, direct air capture, etc.). In some embodiments, the electrochemical cell has a thickness of at least 10 μm, at least 20 μm, at least 50 μm, at least 100 μm, at least 200 μm, at least 300 μm, at least 500 μm, or greater. In some embodiments, the electrochemical cell has a thickness of less than or equal to 750 μm, less than or equal to 600 μm, less than or equal to 500 μm, less than or equal to 300 μm, or less. Combinations of these ranges are possible. For example, in some embodiments, the electrochemical cell has a thickness of at least 200 μm and less than or equal to 750 μm. In some embodiments, the elctrochemical cell has a thickness of at least 10 μm and less than or equal to 750 μm.

In some embodiments, the negative electrode or the positive electrode has a thickness of at least 0.5 μm, at least 1 μm, at least 2 μm, at least 5 μm, at least 10 μm, at least 20 μm, at least 50 μm, at least 75 μm, at least 100 μm or more. In some embodiments, the negative electrode or the positive electrode has a thickness of less than or equal to 200 μm, less than or equal to 150 μm, less than or equal to 100 μm, or less. Combinations of these ranges are possible. For example, in some embodiments, the negative electrode or the positive electrode has a thickness of at least 50 μm and less than or equal to 200 μm. In some embodiments, in some embodiments, the negative electrode or the positive electrode has a thickness of at least 0.5 μm and less than or equal to 200 μm.

In some embodiments, the electroactive composite layer of the negative electrode or the positive electrode has a thickness of at least 10 nm, at least 20 nm, at least 40 nm, at least 0.1 μm, at least 0.2 μm, at least 0.5 μm, at least 1 μm, at least 2 μm, at least 5 μm, at least 10 μm, at least 50 μm, at least 100 μm or more. In some embodiments, the electroactive composite layer of the negative electrode or the positive electrode has a thickness of less than or equal to 200 μm, less than or equal to 150 μm, less than or equal to 100 μm, less than or equal to 50 μm, less than or equal to 20 μm, less than or equal to 10 μm, less than or equal to 5 μm, less than or equal to 2 μm, less than or equal to 1 μm, less than or equal to 0.5 μm, less than or equal to 0.2 μm, less than or equal to 0.1 μm, or less. Combinations of these ranges are possible. For example, in some embodiments, the electroactive composite layer of the negative electrode or a positive electrode has a thickness of greater than or equal to 10 μm and less than or equal to 200 μm. In some embodiments, the electroactive composite layer of the negative electrode or a positive electrode has a thickness of greater than or equal to 10 nm and less than or equal to 100 nm, or greater than or equal to 50 nm and less than or equal to 500 nm.

Various components of a system, such as the electrodes (e.g., negative electrode, positive electrodes), power source, electrolyte, separator, container, circuitry, insulating material, etc. can be fabricated by those of ordinary skill in the art from any of a variety of components. Components may be molded, machined, extruded, pressed, isopressed, infiltrated, coated, in green or fired states, or formed by any other suitable technique. Those of ordinary skill in the art are readily aware of techniques for forming components of system herein.

The electrodes described herein (e.g., negative electrode, positive electrodes) may be of any suitable size or shape. Non-limiting examples of shapes include sheets, cubes, cylinders, hollow tubes, spheres, and the like. The electrodes may be of any suitable size, depending on the application for which they are used (e.g., separating gases from ventilated air, direct air capture, etc.). Additionally, the electrode may comprise a means to connect the electrode to another electrode, a power source, and/or another electrical device.

Various electrical components of system may be in electrical communication with at least one other electrical component by a means for connecting. A means for connecting may be any material that allows the flow of electricity to occur between a first component and a second component. A non-limiting example of a means for connecting two electrical components is a wire comprising a conductive material (e.g., copper, silver, etc.). In some cases, the system may also comprise electrical connectors between two or more components (e.g., a wire and an electrode). In some cases, a wire, electrical connector, or other means for connecting may be selected such that the resistance of the material is low. In some cases, the resistances may be substantially less than the resistance of the electrodes, electrolyte, and/or other components of the system.

In some embodiments, the methods and electrochemical apparatuses described herein can be performed and configured as one or more of the systems described in U.S. Patent Publication No. 2017/0113182, published on Apr. 27, 2017, filed as application Ser. No. 15/335,258 on October 26, 2016, and entitled "Electrochemical Process for Gas Separation," which is incorporated herein by reference in its entirety for all purposes.

U.S. Provisional Application No. 62/892,975, filed Aug. 28, 2019, and entitled "Electrochemically Mediated Acid Gas Removal and Concentration," and U.S. Provisional Application No. 62/988,851, filed Mar. 12, 2020, and entitled "Electrochemical Capture of Lewis Acid Gases," are each incorporated herein by reference in its entirety for all purposes.

The following examples are intended to illustrate certain embodiments of the present invention, but do not exemplify the full scope of the invention.

Example 1

This Example describes the reactivity of various electroactive species with Lewis acid gases as studied by cyclic voltammetry.

Figure 10A:
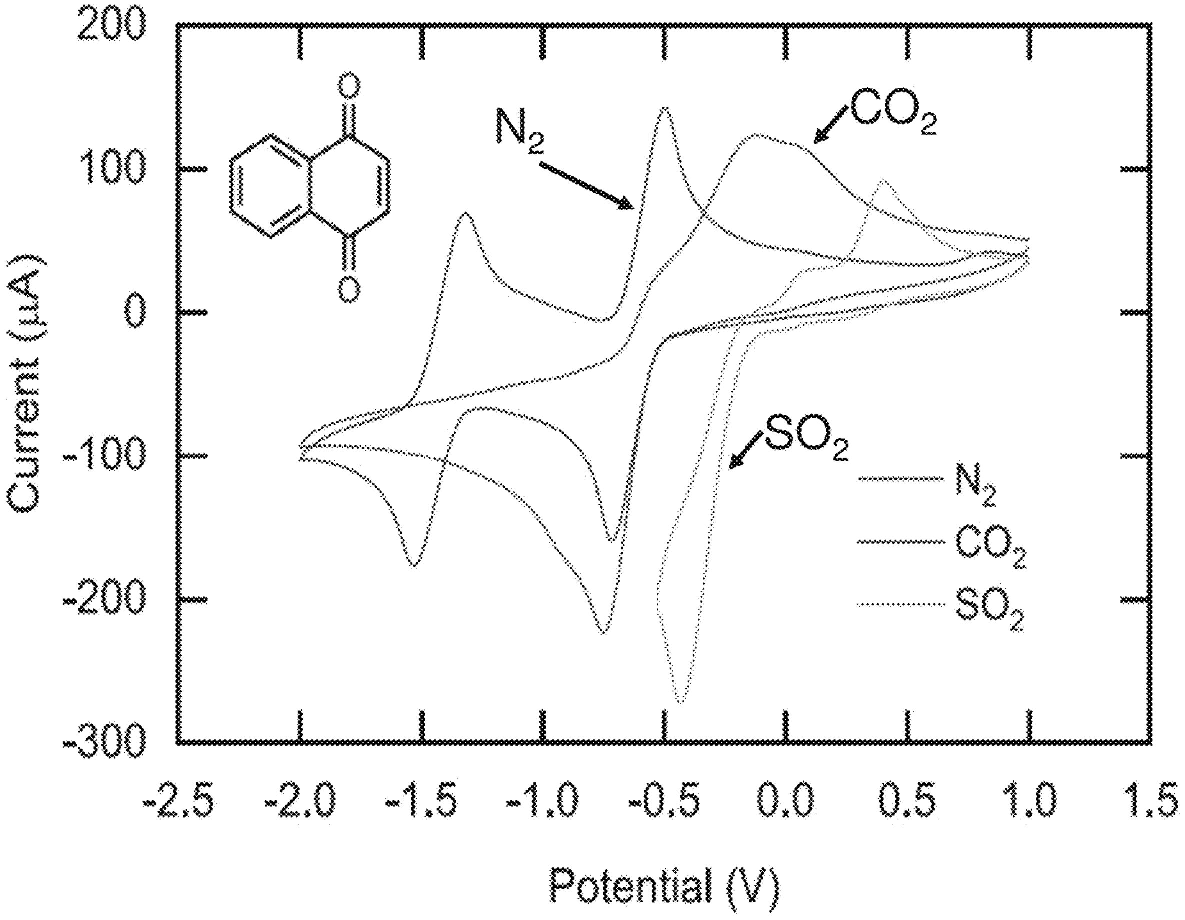
FIG. 10A shows cyclic voltammetry of 1,4-naphthoquinone (p-NQ, alternatively labeled as NQ) in a dry N,N-dimethylformamide solution containing 0.1 M tetra-n-butylammonium hexafluorophosphate ($[nBu_4][PF_6]$) saturated with either $N_2$, $CO_2$, or $SO_2$.

FIG. 10A shows cyclic voltammetry of 1,4-naphthoquinone (p-NQ) in a dry N,N-dimethylformamide solution containing 0.1 M tetra-n-butylammonium hexafluorophosphate ($[nBu_4][PF_6]$) saturated with either $N_2$, $CO_2$, or $SO_2$. The cyclic voltammograms were acquired at a 100 mV/s scan rate. The cyclic voltammetry in FIG. 10A showed expected behavior under $N_2$ and $CO_2$, where the second (more negative) reduction wave shifted positively under $CO_2$ with respect to under $N_2$, while the first reduction wave did not shift. However, in the presence of $SO_2$, the first (less negative) reduction wave, along with the second reduction wave, shifted positively. This was indicative of a strong association of the semiquinone with the strong Lewis acid $SO_2$, which caused a major shift in the Nernst potential. The dissociative oxidation peak of the complex of the reduced 1,4-napthquinone and the $SO_2$ appeared at a more positive potential than that of the $CO_2$ complex, which further confirmed the strong association of $SO_2$ with the semiquinone, as well as the quinone dianion. The differences in the cyclic voltammograms indicated different strengths of association between the reduced 1,4-naphthoquinone and $SO_2$ and $CO_2$.

These cyclic voltammetry results demonstrated that certain electroactive species such as 1,4-naphthoquinone react strongly with both $SO_2$ and $CO_2$, such that exposure to a mixture of both Lewis acid gases would result in binding with limited to no selectivity. Such a lack of selectivity could be problematic in certain applications such as electrochemical flow systems for carbon dioxide capture where gas mixtures comprise both $CO_2$ and $SO_2$, as $SO_2$ capture would diminish $CO_2$ capture efficiency. The difference in the strengths of association of 1,4-naphthoquinone with $CO_2$ and $SO_2$ implied that in a flow system for carbon capture from industrial exhaust, where oxides of sulfur are present at concentrations of 1,000-10,000 ppm, the "poisoning" of the quinone is quite possible. It is believed that this would mainly be due to the difference in the oxidation potential, where an electrochemical cell operating at a potential difference of around the difference between the reduction of quinone and the oxidation of its complex with $CO_2$ would not provide sufficient energy to dissociate the quinone-$SO_2$ complex. This leads to the accumulation of the complex and the subsequent decrease of the system capacity for $CO_2$.

It was realized that this lack of selectivity could be overcome by introducing an electrochemical desulfurization step which removes the oxides of sulfur from the gas mixture (e.g., flue gas) prior to the electrochemical carbon capture step. Such an electrochemical desulfurization step would involve determining electroactive species and/or conditions for selectively capturing sulfur dioxide (or other Lewis acid gases) while allowing carbon dioxide capture to be negligible. Toward that end, it was further realized that a similar flow system could be designed with an electroactive species (e.g., quinone) that has lower electron density on the oxygens upon reduction to yield a comparatively weaker base than 1,4-naphthoquinone.

Figure 10B:
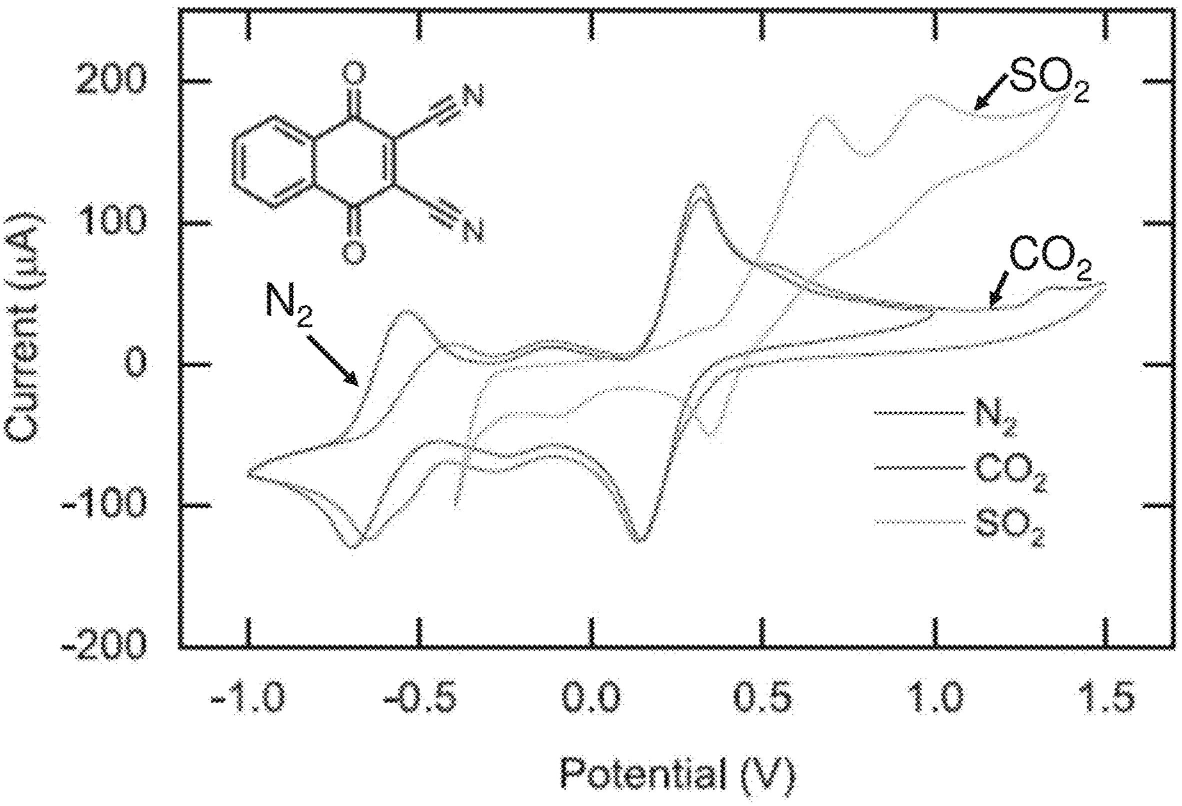
FIG. 10B shows cyclic voltammetry of by 2,3-dicyano-1,4-naphthoquinone (DCNQ) in a dry N,N-dimethylformamide solution containing 0.1 M $[nBu_4][PF_6]$ saturated with either $N_2$, $CO_2$, or $SO_2$.

This was accomplished by 2,3-dicyano-1,4-naphthoquinone (DCNQ). FIG. 10B shows cyclic voltammetry of DCNQ in a dry N,N-dimethylformamide solution containing 0.1 M $[nBu_4][PF_6]$ saturated with either $N_2$, $CO_2$, or $SO_2$. The cyclic voltammograms were acquired at a 100 mV/s scan rate. The cyclic voltammetry in FIG. 10B showed the behavior under $CO_2$ as being not dissimilar from that under $N_2$, where only the dianion (formed upon the second reduction) reacted weakly with $CO_2$. This weak interaction was demonstrated by the slight positive shift of the second reduction wave, and the emergence of a very small oxidative dissociation peak. Nevertheless, the interaction of DCNQ was very strong with $SO_2$, a conclusion supported by the positive shift of the two reduction waves and the emergence of a very positively-shifted dissociative oxidation peak in FIG. 10B. These results demonstrated that certain electroactive species (e.g., with certain substituents) have reduced states in which they are capable of reacting with a first Lewis acid gas (e.g., $SO_2$) but for which a reaction with a second Lewis acid gas (e.g., $CO_2$) is not thermodynamically favorable.

Example 2

This Example describes the reactions of various electroactive species with Lewis acids in ionic liquids (IL).

Figure 11A:
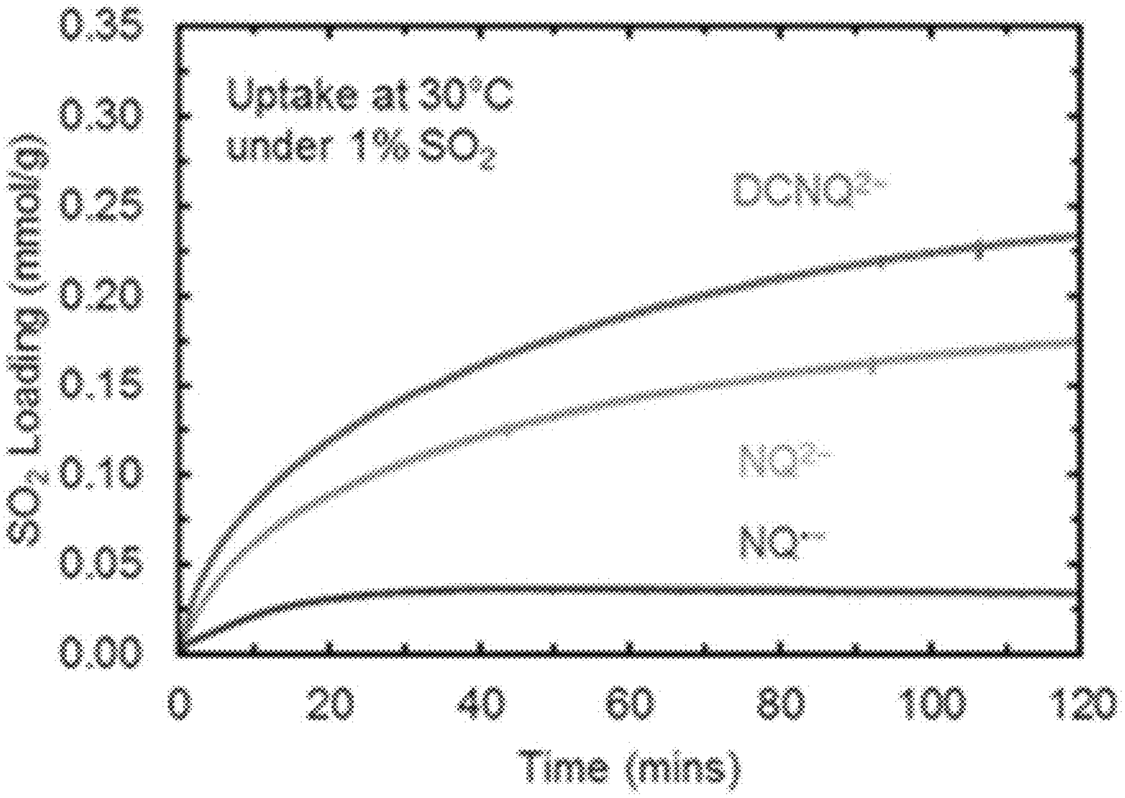
FIG. 11A shows thermogravimetric analyses (TGA) of $DCNQ^{2-}$, $NQ^{\cdot-}$ and $NQ^{2-}$ under 1% $SO_2$.
Figure 11B:
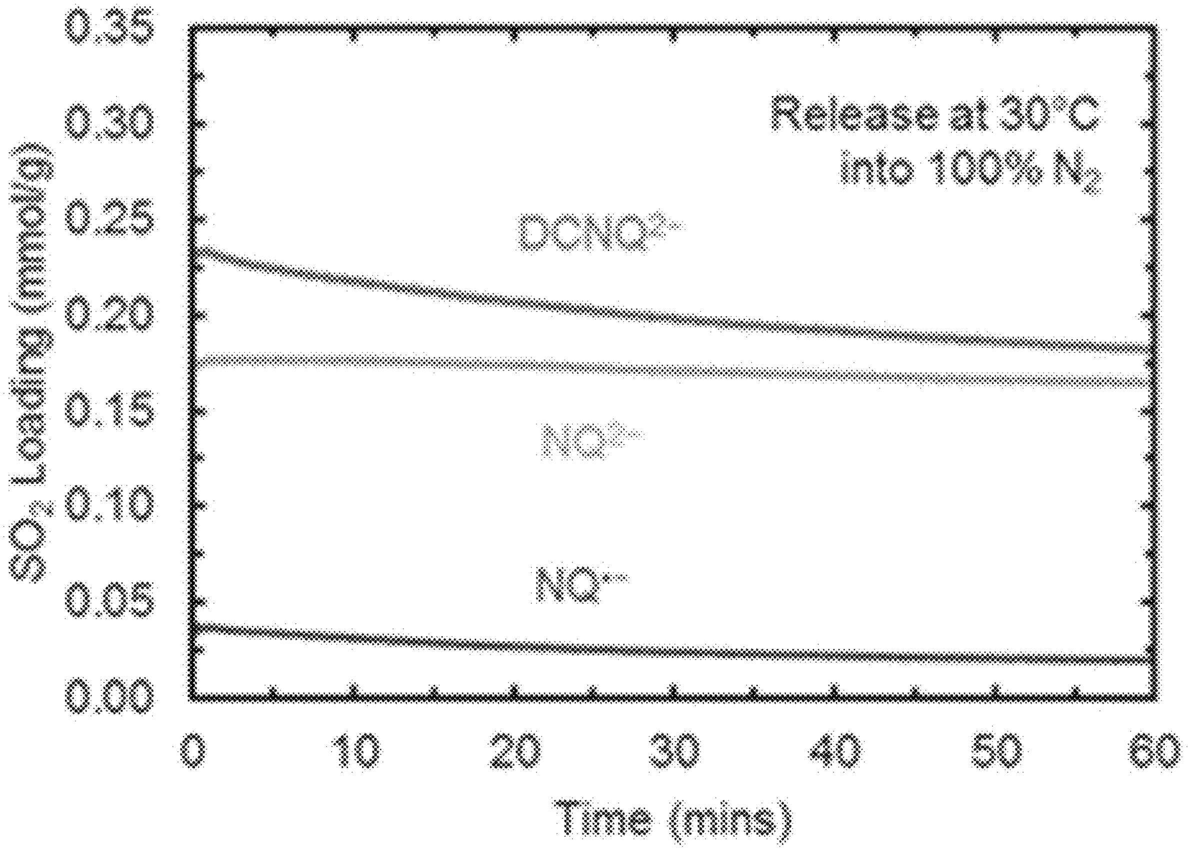
FIG. 11B shows TGA analyses of $DCNQ^{2-}$, $NQ^{\cdot-}$ and $NQ^{2-}$ in $N_2$.
Figure 11C:
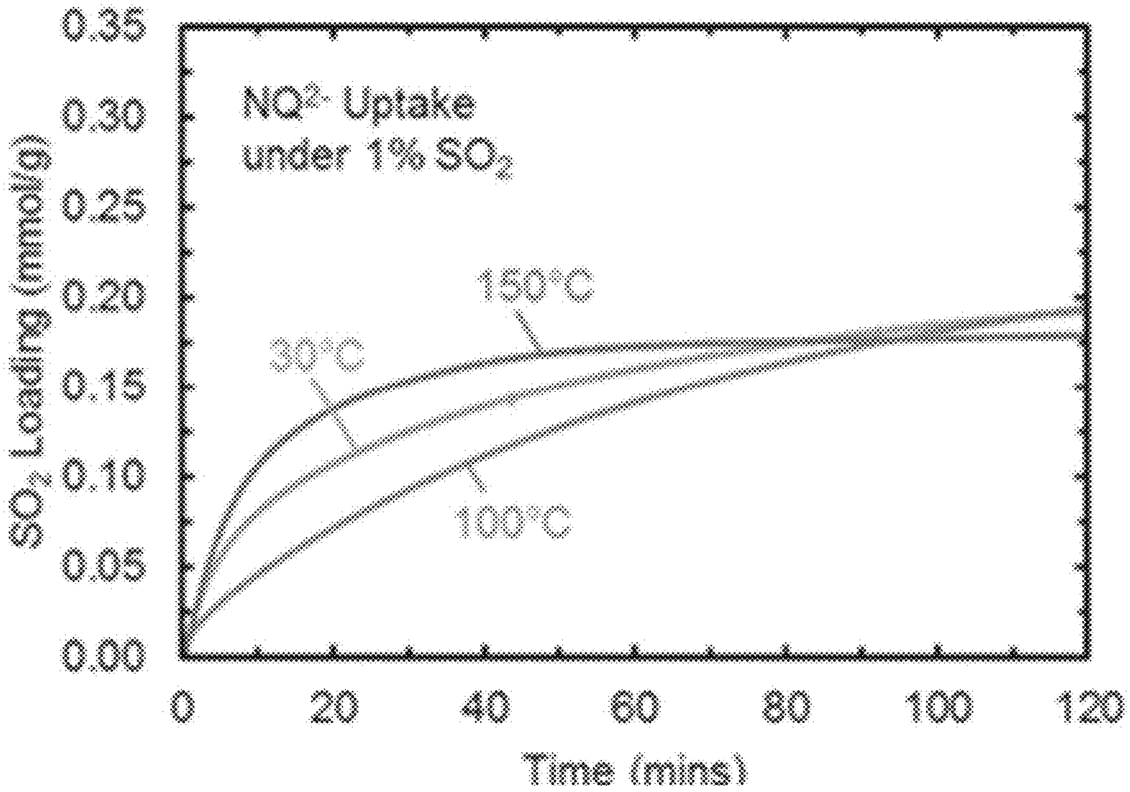
FIG. 11C shows TGA measurements of $SO_2$ uptake by $NQ^{2-}$ at different temperatures.
Figure 11D:
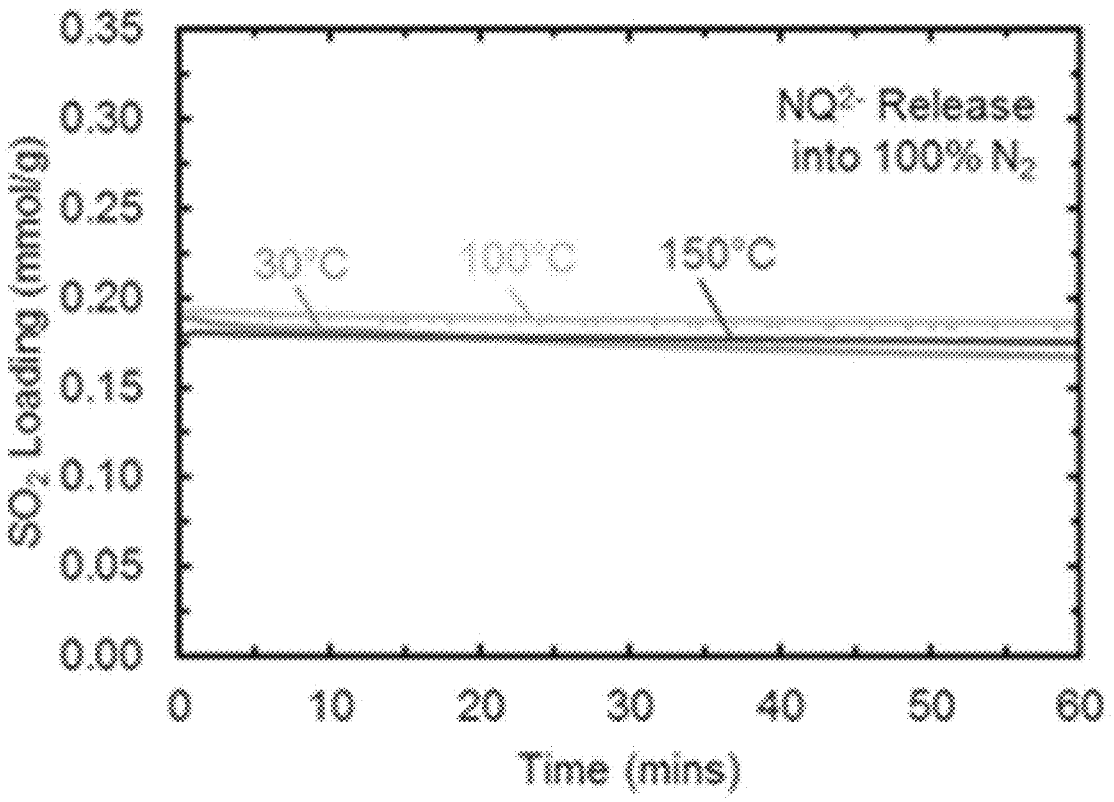
FIG. 11D shows TGA measurements of $SO_2$ uptake release by $NQ^{2-}$ at different temperatures.
Figure 11E:
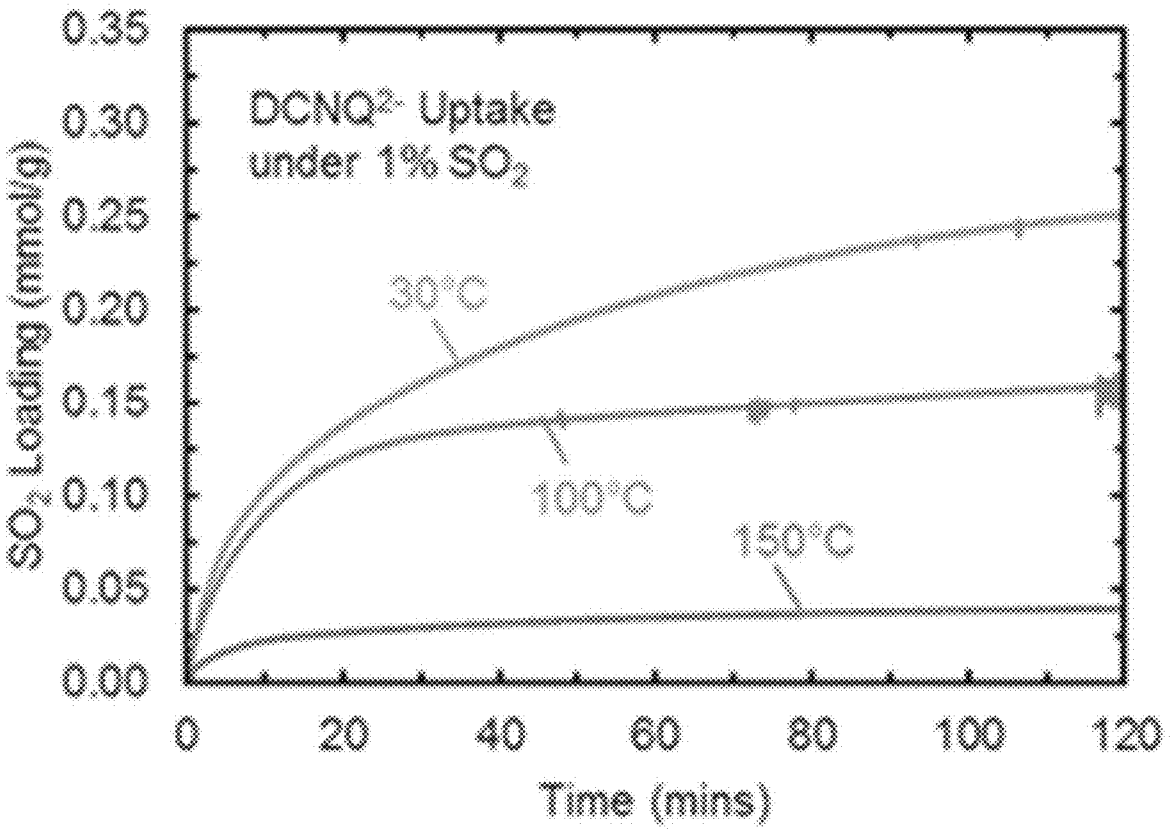
FIG. 11E shows TGA measurements of $SO_2$ uptake by $DCNQ^{2-}$ at different temperatures.
Figure 11F:
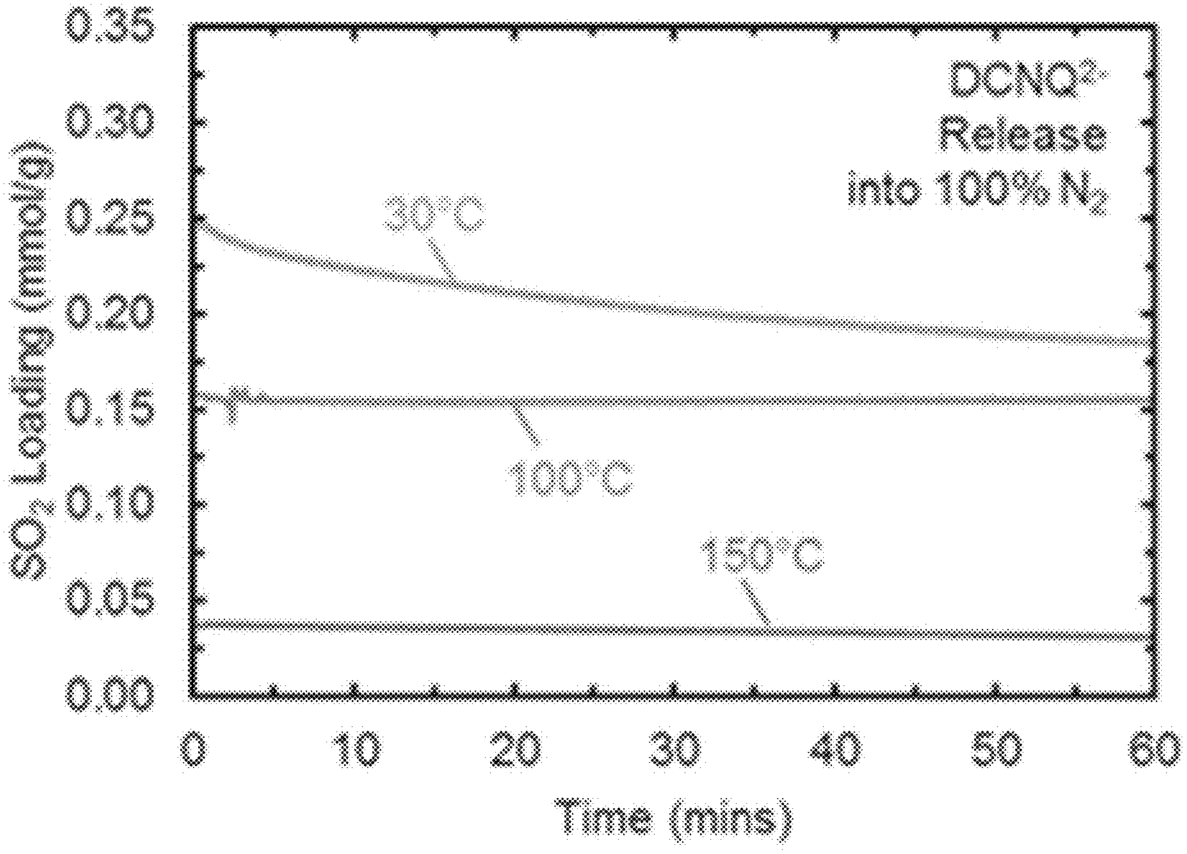
FIG. 11F shows TGA measurements of $SO_2$ release by $DCNQ^{2-}$ at different temperatures.

The reactions of DCNQ and p-NQ with $SO_2$ were studied by thermogravimetric analysis (TGA). DCNQ was reduced using two equivalents of cobaltocene to yield a 0.3 M solution of $DCNQ^{2-}$ dianion in [bmim][$TF_2N$]. This was used, along with the p-$NQ^{2-}$ dianion and the $NQ\cdot^-$ semiquinone ionic liquid (IL) solutions in the TGA with a flow of $DCNQ^{2-}$, $NQ\cdot^-$ and $NQ^{2-}$ under 1% $SO_2$. FIG. 11B shows TGA analyses of $DCNQ^{2-}$, $NQ\cdot^-$ and $NQ^{2-}$ in $N_2$. It could be seen from FIG. 11A and FIG. 11B that both $NQ^{2-}$ and $DCNQ^{2-}$ effectively and stoichiometrically reacted with $SO_2$ to form a stable diadduct which did not release under pure $N_2$ flow. The capacity of $NQ\cdot^-$ for $SO_2$ was smaller than $NQ^{2-}$ as expected, but did not release it at the same rate it releases $CO_2$ under pure $N_2$ since the $pK_a$ of $NQ\cdot^-$ is similar to that of $DCNQ^{2-}$ which is sufficiently high to react with a strong Lewis acid like $SO_2$ with a low $pK_a$. This resulted in a stronger bond formation upon the sulfonation of the stronger Lewis base $NQ^{2-}$ which maintained a constant capacity for $SO_2$ at high temperatures (up to 150° C.) and did not release $SO_2$ under pure $N_2$ flow, as seen in FIGS. 11C and 11D. FIG. 11C shows TGA measurements of $SO_2$ uptake by $NQ^{2-}$ at different temperatures. FIG. 11D shows TGA measurements of $SO_2$ uptake release by $NQ^{2-}$ at different temperatures. Nevertheless, the lower basicity of $DCNQ^{2-}$ resulted in weaker sulfonation and subsequently a smaller capacity for $SO_2$ at higher temperatures. FIG. 11E shows TGA measurements of $SO_2$ uptake by $DCNQ^{2-}$ at different temperatures. FIG. 11F shows TGA measurements of $SO_2$ release by $DCNQ^{2-}$ at different temperatures.

It is believed that the relative $pK_a$s of $DCNQ^{2-}$ and $NQ^{2-}$ explain, at least in part, their reaction extent with $CO_2$ and $SO_2$, and are also the result of the electron density modulation on the nucleophilic oxygen (phenoxide) moieties, which are generated upon the first and second reduction of quinones. Thus, electroactive species such as quinones with finely tuned electron density can be used to selectively react with different electrophiles with varying Lewis base strengths in customized electrochemical systems where continuous separation can be performed.

In addition to electron density modulation on the quinone molecule, which directly affects the thermodynamics of the electrochemical reactions, it has been realized in the context of the present disclosure that it is possible to impart further selectivity to the nucleophile generated via steric hindrance or affinity. This could be done by attaching various groups around the nucleophilic centers to accommodate the reductive addition of one target more favorably than others.

Figure 12A:
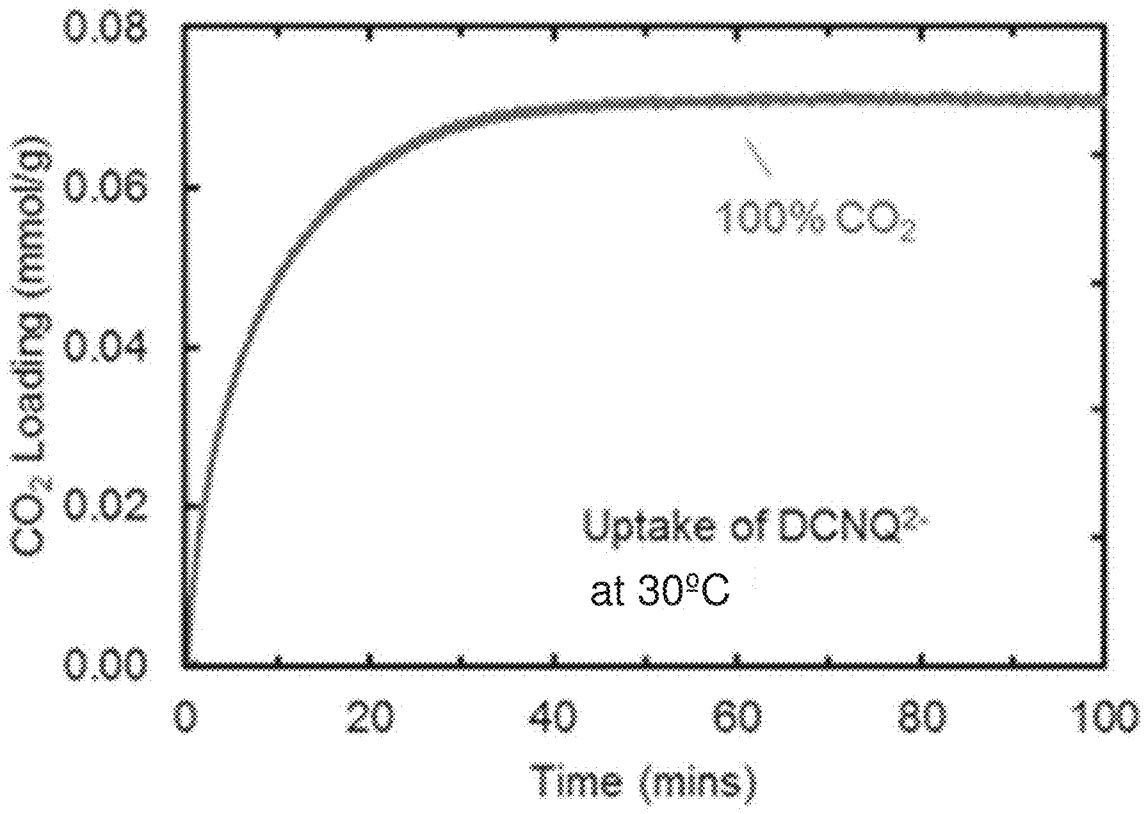
FIG. 12A shows TGA measurements of capture of $CO_2$ with reduced DCNQ under 100% $CO_2$ at 30° C.
Figure 12B:
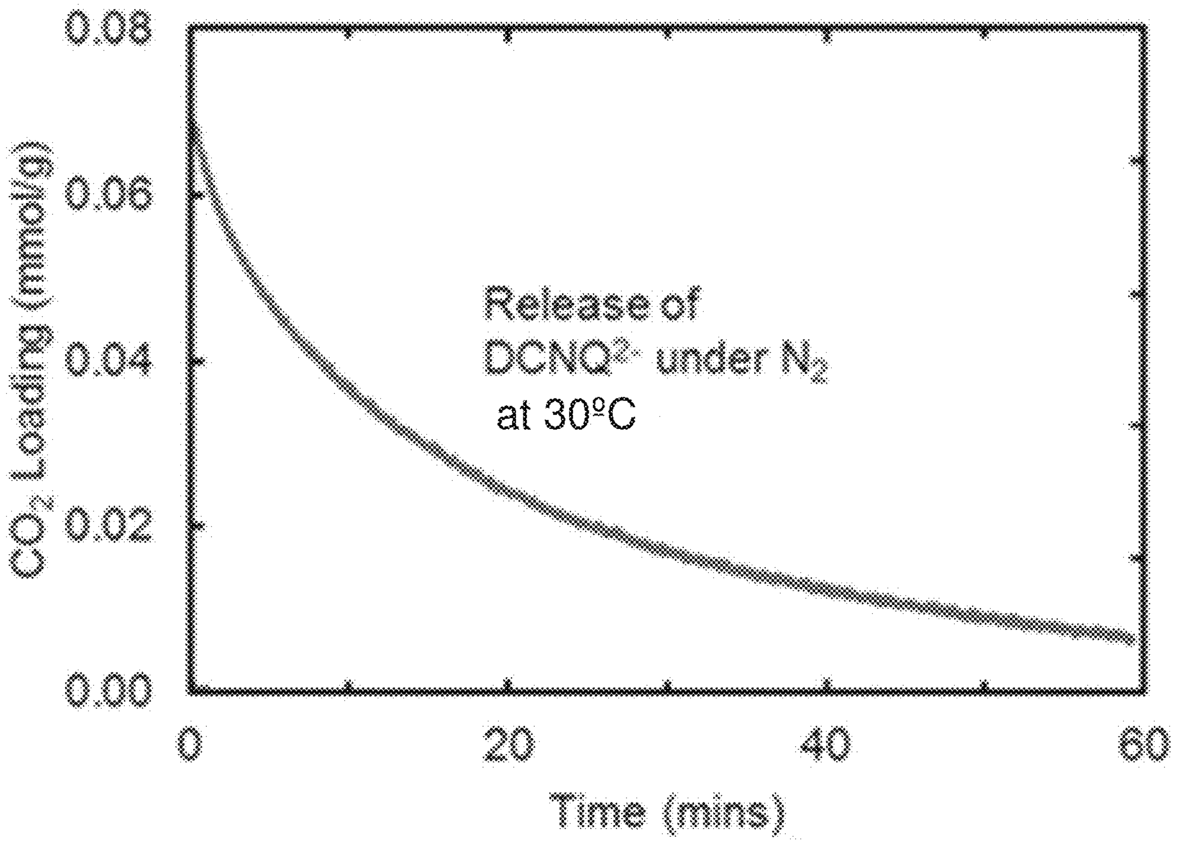
FIG. 12B shows TGA measurements showing that $CO_2$ is released when the reactant is removed.

FIG. 12A shows TGA measurements of capture of $CO_2$ with reduced DCNQ under 100% $CO_2$ at 30° C. FIG. 12B shows TGA measurements showing that $CO_2$ is released when the reactant is removed. Thus, reduced DCNQ reacts with $CO_2$ reversibly, but with $SO_2$ irreversibly.

Example 3

This Example describes a computational analysis of DCNQ to gain insight into their electronic structure and thermodynamic properties as they related to their reactivity with Lewis Acid gases.

Calculations on the neutral, singly-reduced (semiquinone) and doubly-reduced (dianion) states of DCNQ were made using density functional theory methods. All electronic structure calculations were performed with Q-Chem® version 5.1.1. Equilibrium structures were determined at the B3LYP-D3(op)/6-31++G** level of theory, with spin-unrestricted wave functions, and Grimme dispersion corrections with the optimized power approach corrections of Witte J, Mardirossian N, Neaton J B, Head-Gordon M. Assessing DFT-D3 Damping Functions Across Widely Used Density Functionals: Can We Do Better? Journal of Chemical Theory and Computation. 2017; 13(5):2043-2052, which is incorporated by reference herein in its entirety for all purposes. 1,4-naphothoquinone (Q) was treated as a neutral singlet, its semiquinone anion (Q–) and $CO_2$-adduct anion were treated as −1 doublet ($QCO_2$–), and the dianion $Q^{2-}$, single adduct $Q(CO_2)^{2-}$ and di-adduct $Q(CO_2)^{2-}$ were also taken as singlets. Geometry optimizations in gas phase and solvated environments (within the SMD solvent SCRF) were performed on structures built using the Avogadro® computer program after optimization with the MMFF94 force-field. A systematic rotor search was performed to identify low lying conformers of $QCO_2^-$, $QCO_2^{2-}$ and $Q(CO_2)_2^{2-}$.

Ground state binding energies were calculated by subtracting the total electronic energy of the optimized isolated species from the optimized complex, including zero point energy (ZPE) and thermal and solvation contributions. Basis set superposition error (BSSE) was accounted for by the counterpoise scheme. Frequency analysis was used to confirm ground state structures were a minimum on the potential energy surface. Natural bond orbital (NBO) partial charges and orbital characteristics were obtained with the NBO v6.0 package interfaced with Q-Chem® and second generation ALMO-EDA was performed within Q-Chem®. Reduction potentials were determined by the procedure suggested by Isse A A, Gennaro A. Absolute Potential of the Standard Hydrogen Electrode and the Problem of Interconversion of Potentials in Different Solvents. Journal of Physical Chemistry B. 2010; 114(23):7894-7899, which is incorporated by reference herein in its entirety for all purposes. For the reduction potential calculations, structures were optimized in the solvent SCRF (with parameters for N,N-dimethylformamide), the electron free energy was determined by Fermi-Dirac statistics with 4.28 V taken as the absolute value for the Standard Hydrogen Electrode, and junction potentials were adjusted for with data from Diggle J W, Parker A J. Liquid junction potentials in electrochemical cells involving a dissimilar solvent junction. 1974 p. 1617-1621, which is incorporated by reference herein in its entirety for all purposes.

Figure 13A:
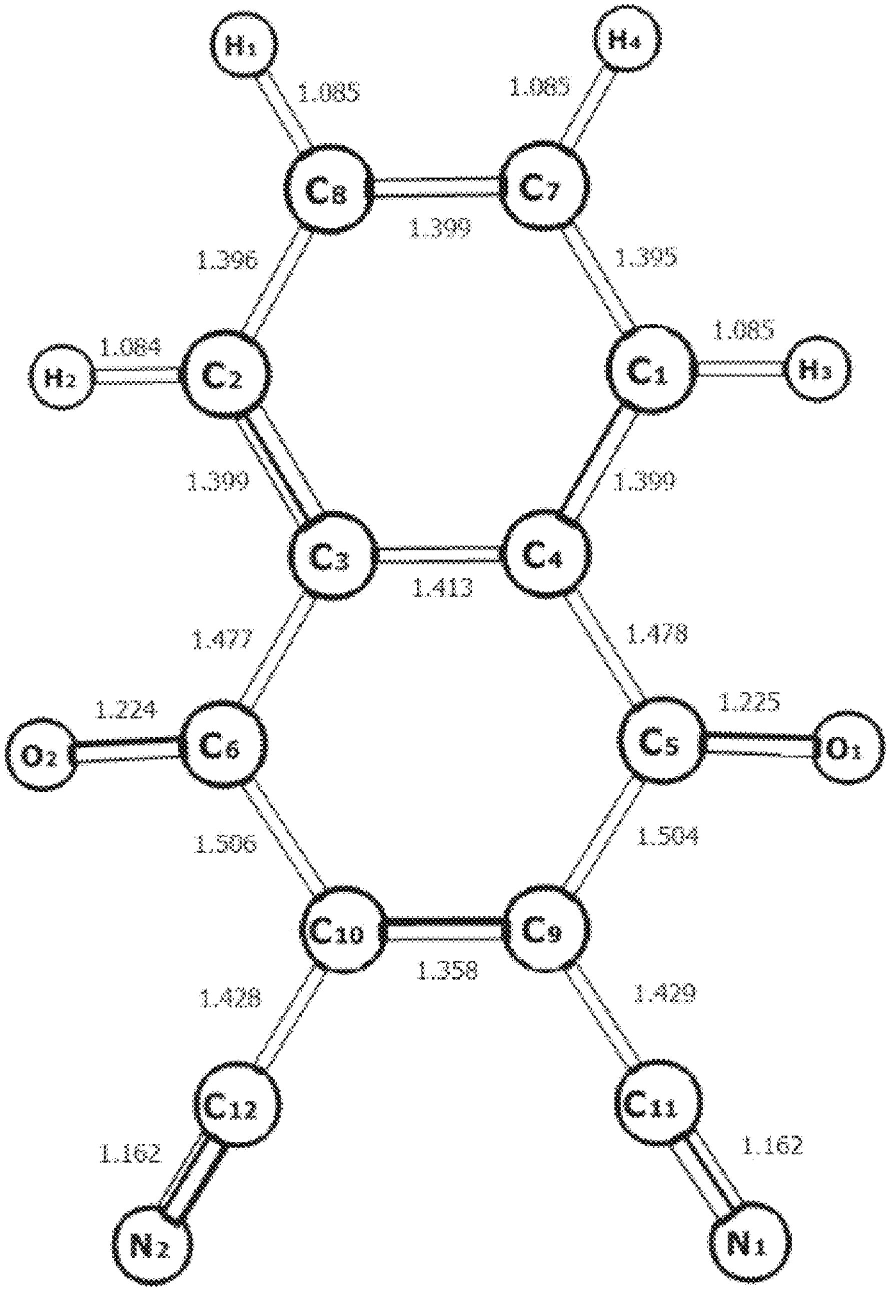
FIGS. 13A-13C show the computed geometry changes of DCNQ upon reduction.
Figure 13B:
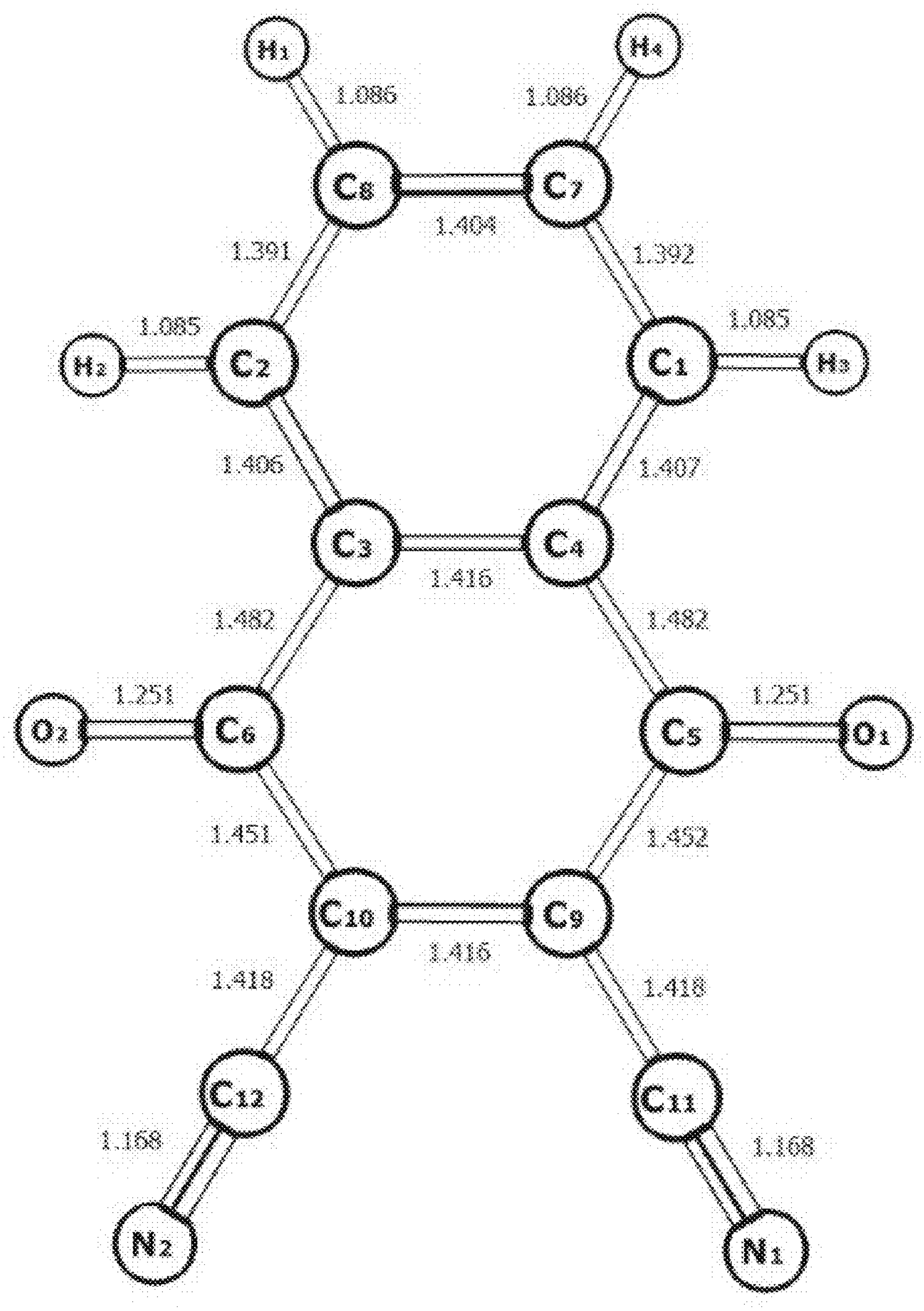
Figure 13C:
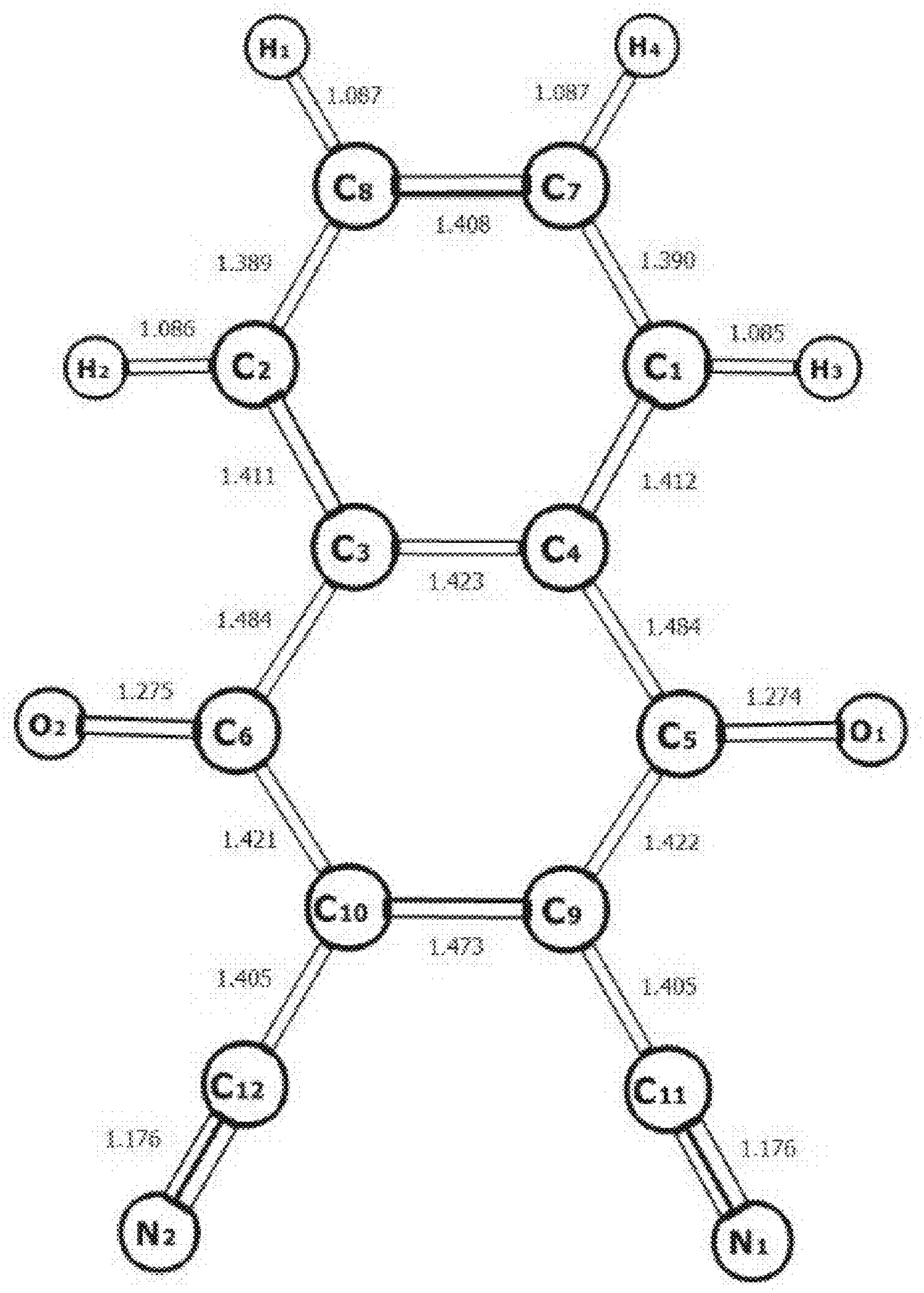

FIGS. 13A-13C show the computed geometry changes of DCNQ upon reduction. Standard reduction potentials for the reductions of DCNQ were calculated at standard states, as follows:

$$\Delta G^*_{reduction} = G_{red} - (G_{ox} + G_{e^-})$$

$$E^0(\text{absolute}) = -\frac{\Delta G^*_{reduction}}{F}$$

$$E^0(\text{vs Ag}^+) = E^0(\text{absolute}) + E(SHE \text{ vs absolute}) + E(SCE \text{ vs } SHE) + E(DMF/\text{H}_2\text{O junction}) + E(\text{Ag}^+ \text{ vs } SCE)$$

where SHE is the standard hydrogen electrode reference and SCE is the standard calomel reference. The calculated standard reduction potentials for DCNQ were calculated to be −0.02 and −1.52 vs. $Ag^+$, respectively. With the same method, the reduction potentials for 1,4-napthoquinone were −1.27 V and −2.48 V vs $Ag^+$ for the first and second reductions, respectively.

Figure 14A:
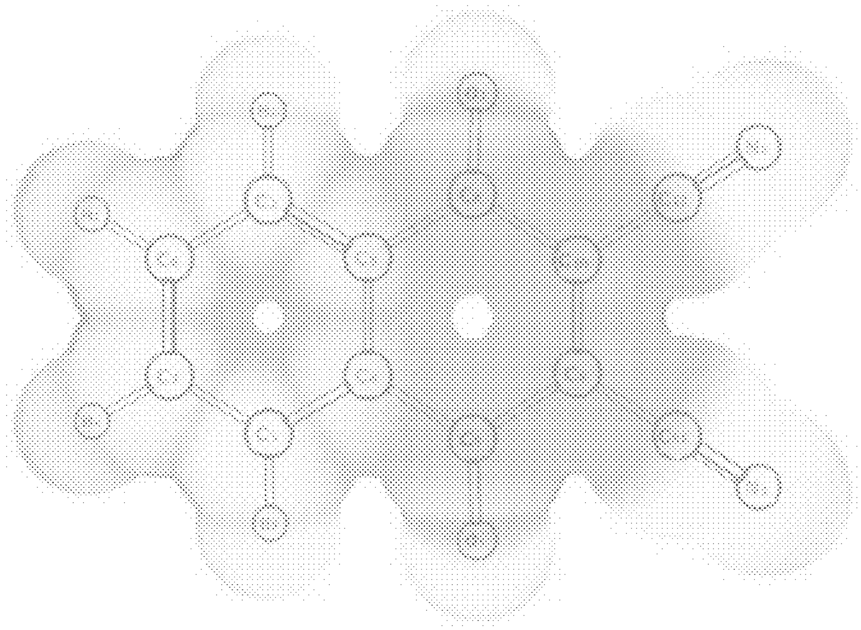
FIG. 14A shows electrostatic potential (ESP) maps of 2,3-dicyano-1,4-naphthoquinone (top) and 1,4-naphthoquinone (bottom) in their respective neutral states.
Figure 14A:
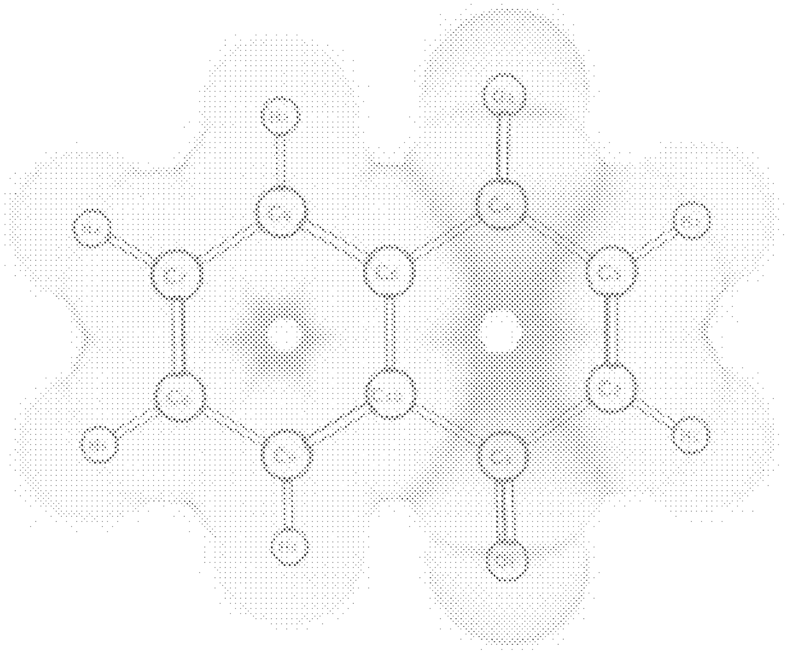
Figure 14B:
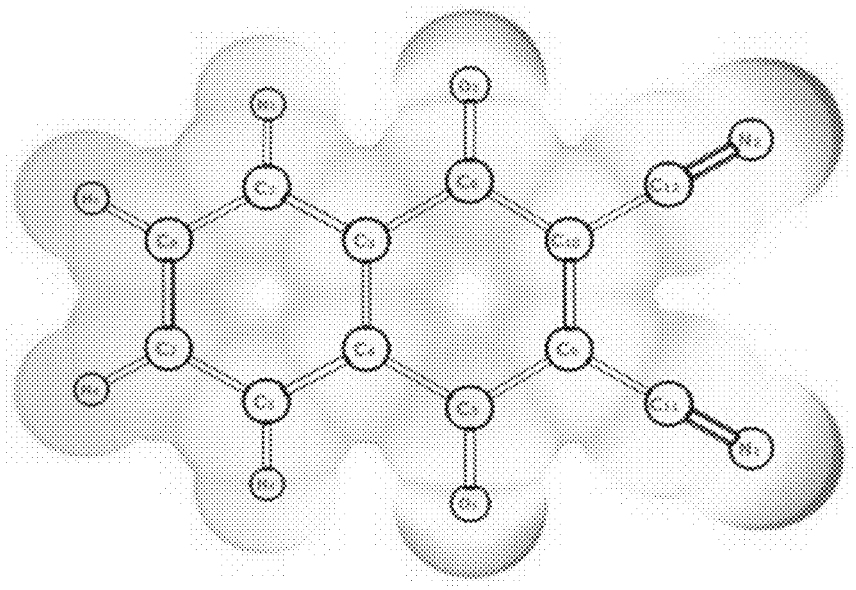
FIG. 14B shows ESP maps of 2,3-dicyano-1,4-naphthoquinone (top) and 1,4-naphthoquinone (bottom) in their respective semiquinone states.
Figure 14B:
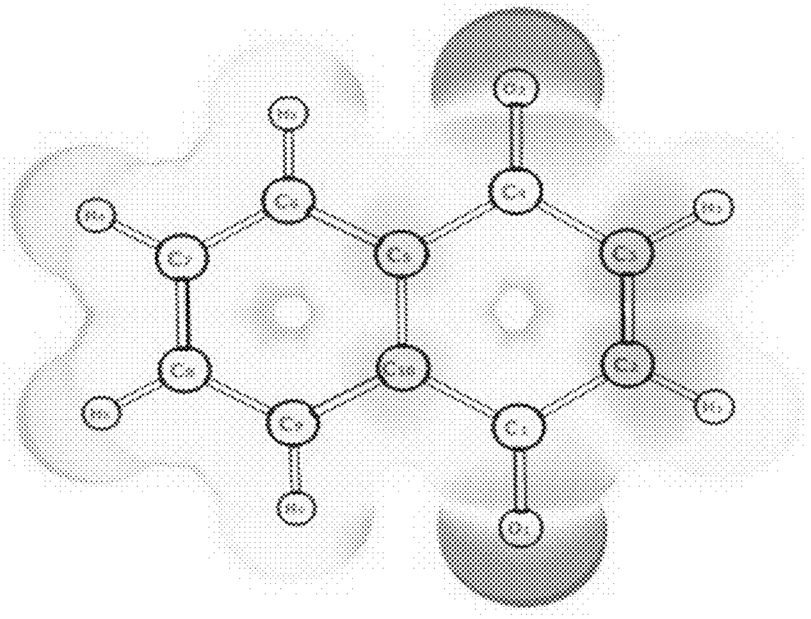
Figure 14C:
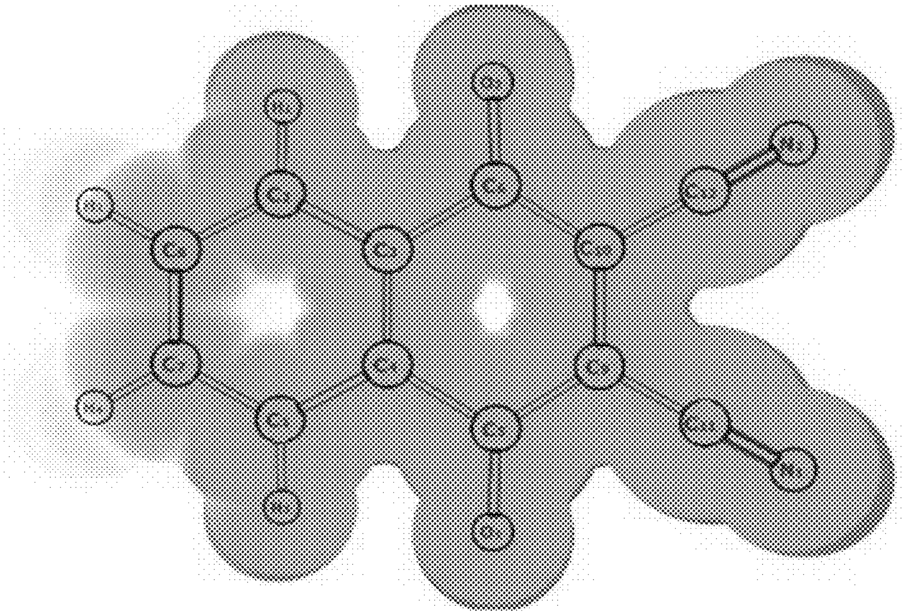
FIG. 14C shows ESP maps of 2,3-dicyano-1,4-naphthoquinone (top) and 1,4-naphthoquinone (bottom) in their respective dianion states.
Figure 14C:
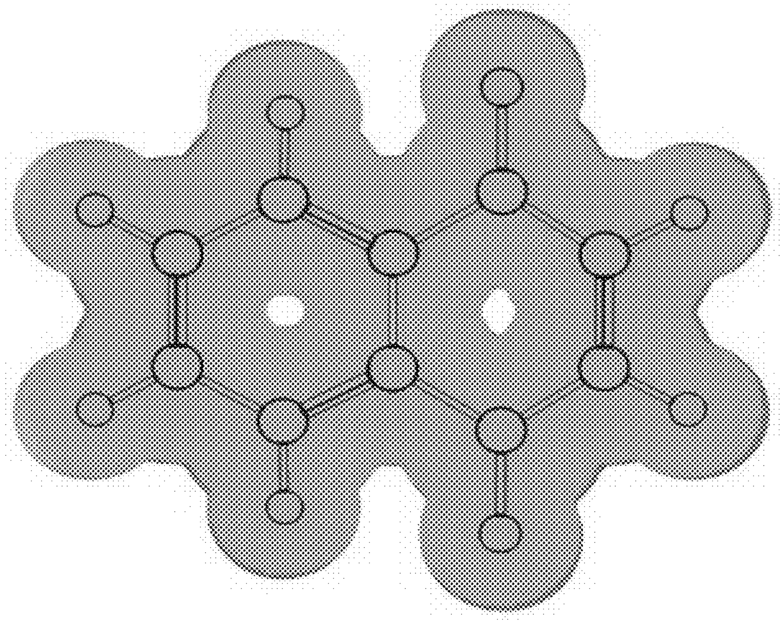
Figure 15A:
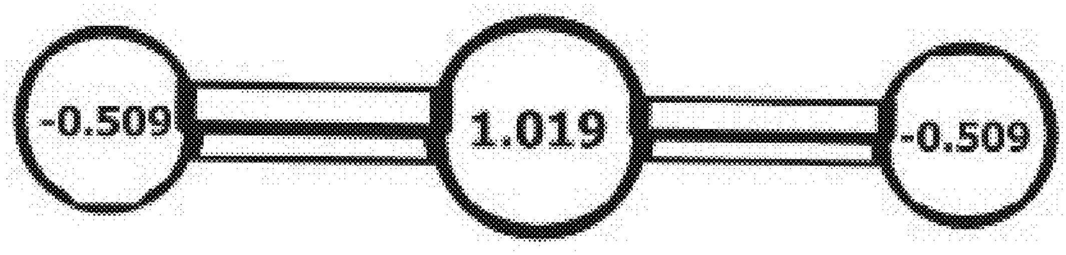
FIGS. 15A-15D shows calculated geometries and ESP maps of $CO_2$ and $SO_2$, respectively.
Figure 15B:
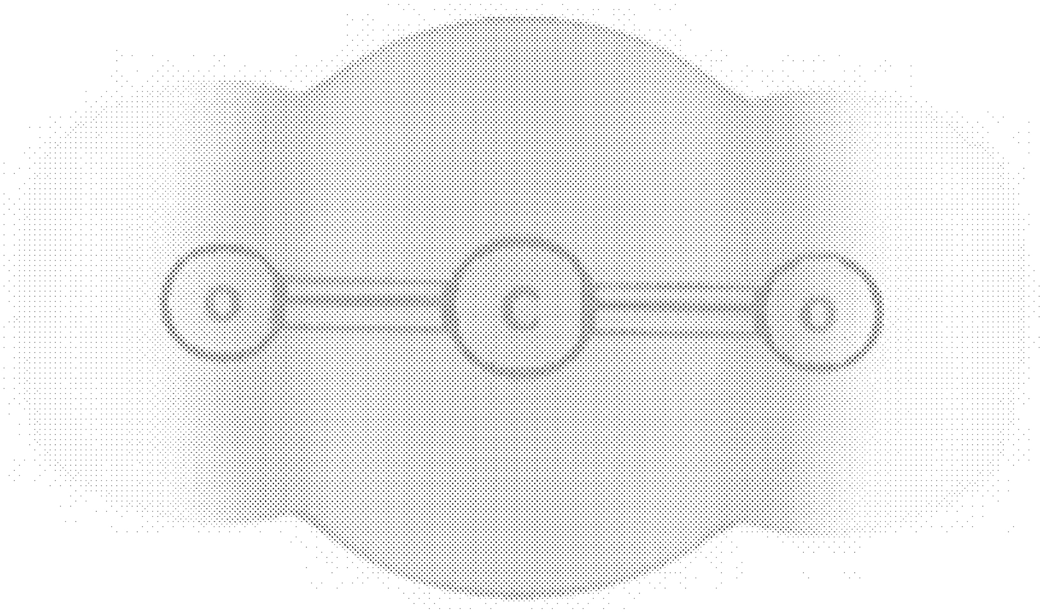
Figure 15C:
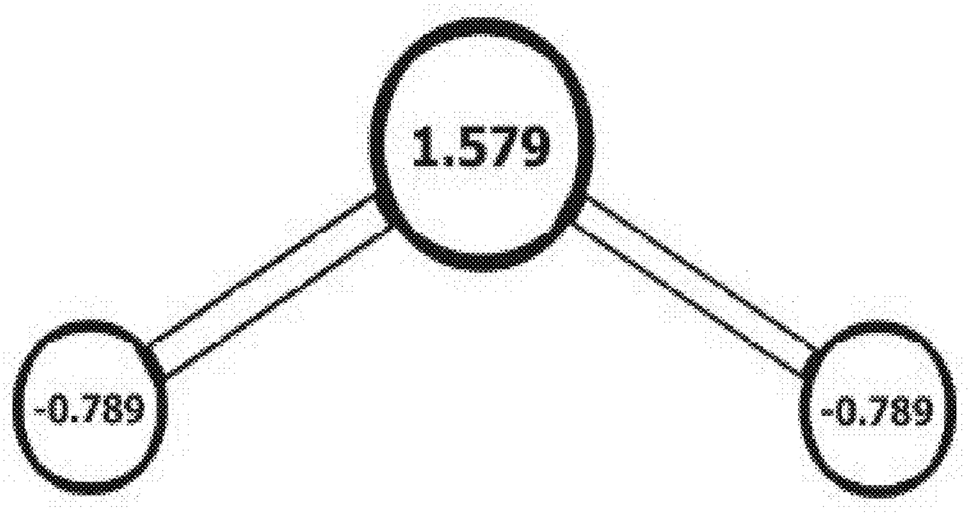
Figure 15D:
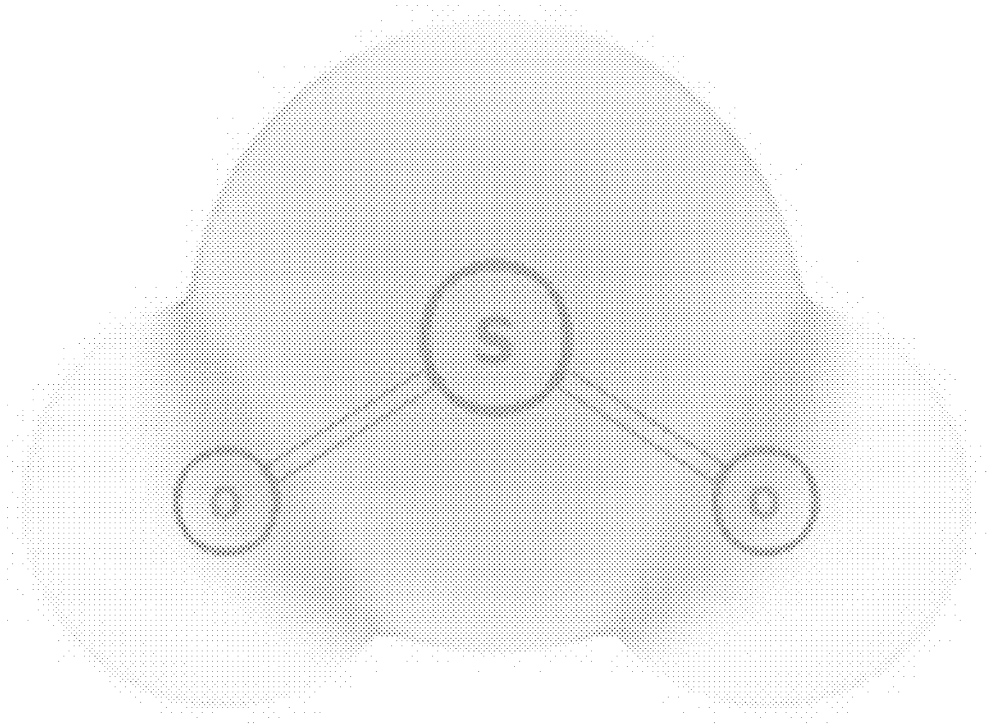

Electrostatic potential (ESP) maps for the different states of reduction of DCNQ and 1,4-naphthoquinone were also calculated. FIG. 14A shows ESP maps of 2,3-dicyano-1,4-naphthoquinone (top) and 1,4-naphthoquinone (bottom) in their respective neutral states. FIG. 14B shows ESP maps of 2,3-dicyano-1,4-naphthoquinone (top) and 1,4-naphthoquinone (bottom) in their respective semiquinone states. FIG. 14C shows ESP maps of 2,3-dicyano-1,4-naphthoquinone (top) and 1,4-naphthoquinone (bottom) in their respective dianion states. In the ESP maps, darker shading indicates higher charge density (more electron-rich or electron poor) and lighter shading indicates lower charge density (less electron-rich or electron poor). As can be seen in FIGS. 14A-14C, the charge distributions are relatively similar between DCNQ and 1,4-naphthoquinone in the neutral (FIG. 14A) and dianion (FIG. 14C) states. However, FIG. 14B shows that the oxygen moieties of 1,4-naphthoquinone in its semiquinone state have a significantly higher electron density than do the oxygen moieties of DCNQ in its semiquinone state. It is believed that the electron-withdrawing effect of the nitrile substituents pull electron density from the oxygens of DCNQ. It is further believed that this shift in electron density in DCNQ renders it less thermodynamically and/or kinetically reactive toward Lewis acids (e.g., shifting the $pK_a$) and therefore more selective for certain Lewis acids (e.g., depending on their $pK_a$). All maps are on the same scale (imaged on van der Waals spheres).

FIGS. 15A-15D shows calculated geometries and ESP maps of $CO_2$ and $SO_2$, respectively.

Example 4

This Example describes selective removal of an amount of a first Lewis acid gas from a fluid mixture comprising the first Lewis acid gas and a second, different Lewis acid gas via a reduced state of an electroactive species. In particular, a gas mixture comprising $SO_2$ and $CO_2$ was exposed to a reduced form of DCNQ, resulting in removal of the $SO_2$ from the fluid mixture to a greater extent than the $CO_2$.

Figure 16:
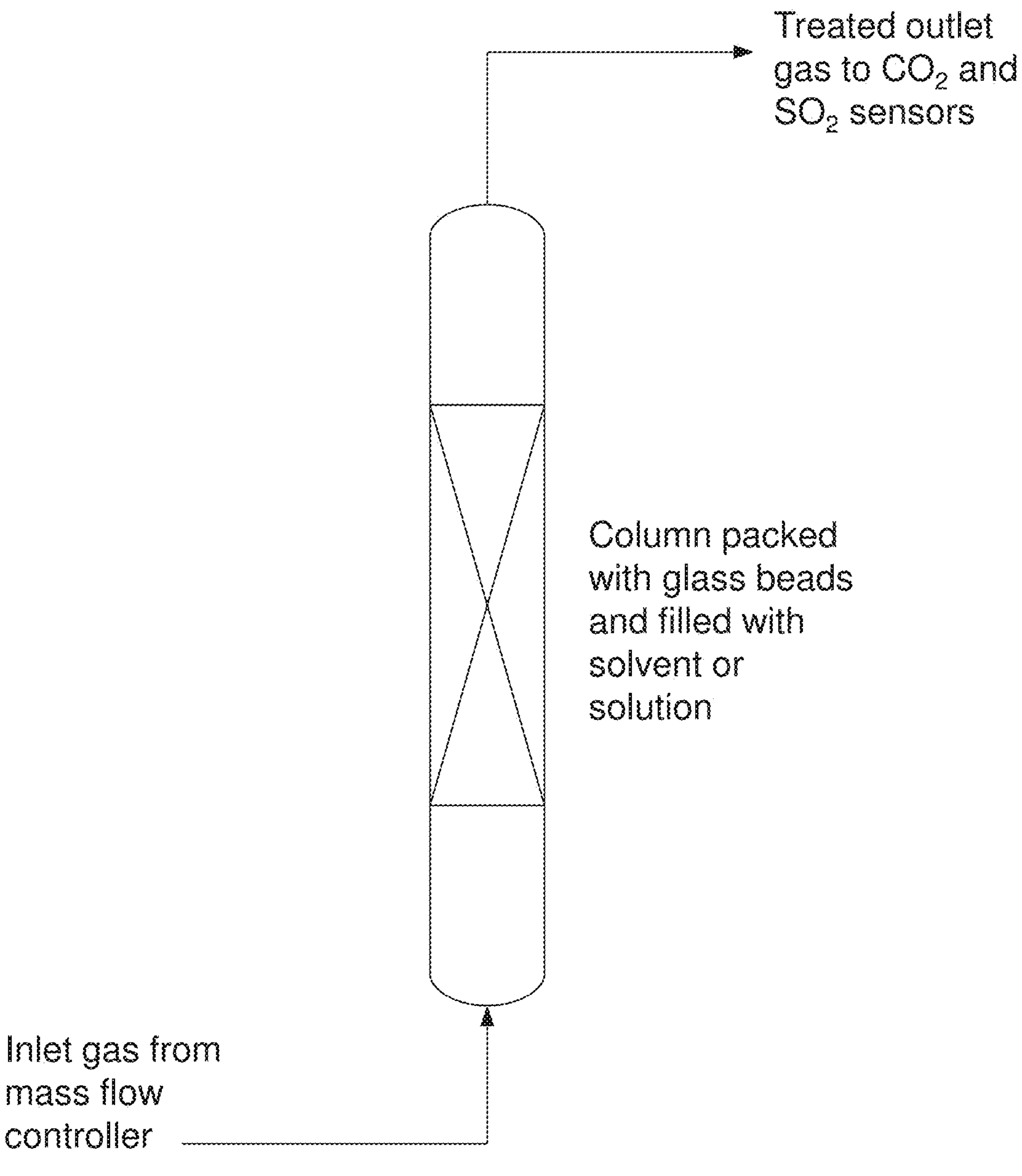
FIG. 16 shows a schematic diagram of the gas separation experiment, according to one or more embodiments.

The gas separation experiment employed a packed-bed bubble column apparatus comprising a borosilicate glass tube (12" length, 0.23" inner diameter) filled with 8.6 g of 1 mm glass beads. The bubble column apparatus was oven dried and sealed with two septa on each end. An inlet needle was inserted into the bottom of the column, and an outlet needle was inserted into the top of the column. The column was flushed with dry nitrogen gas for 10 minutes to establish an inert atmosphere inside the column. All gas streams were applied to the inlet of the column at precise flow rates using Cole-Parmer mass flow controllers. An outlet stream of the bubble column apparatus was monitored for $CO_2$ and $SO_2$ gas concentrations. FIG. 16 shows a schematic diagram of the gas separation experiment.

The doubly reduced DCNQ species 2,3-dicyanonaphthoquinone dianion ($DCNQ^{2-}$) was prepared by treating a solution of 2,3-dicyanonaphthoquinone (DCNQ) in tetrahydrofuran (THF) with sodium (Na) metal, removing residual metal via filtration, and removing the THF via evaporation. A reaction scheme for the preparation of $DCNQ^{2-}$ is shown below.

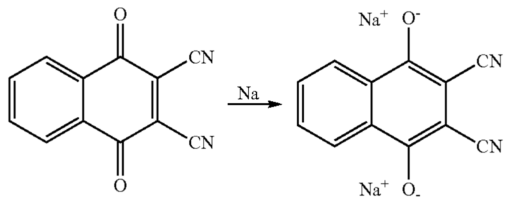

Prior to the gas capture experiment, the column apparatus was filled with 2.4 mL solution of 12 mM 2,3-dicyanonaphthoquinone dianion ($DCNQ^{2-}$) in propylene carbonate. The filling procedure was conducted under flowing nitrogen gas to maintain an inert atmosphere in the column. After filling the column with the $DCNQ^{2-}$/propylene carbonate solution, a stream of dry nitrogen gas was introduced to the column inlet at a flow rate of 1 mL/minute to allow the system to equilibrate. The mass flow controller for the inlet gas was then connected to a $SO_2/CO_2/N_2$ gas stream (1 mole percent (mol %) $SO_2$, 10 mol % $CO_2$, 89 mol % $N_2$) at 1 mL/min, and data logging was immediately started. To control for solvent physisorption of the Lewis acid gases, an identical procedure was conducted with 2.4 mL of solvent (propylene carbonate) with no $DCNQ^{2-}$ present.

The concentration of $CO_2$ and $SO_2$ were measured versus the total volume of inlet gas introduced to the system, for the physisoprtion and $DCNQ^{2-}$ chemisorption experiments. It was observed that, due to the low solubility of $CO_2$ in propylene carbonate, its breakthrough in the physisoprtion experiment (i.e., in the absence of $DCNQ^{2-}$) occurred at a much earlier point than that of $SO_2$, which has a higher solubility in propylene carbonate. In the chemisorption experiment (i.e., in the presence of $DCNQ^{2-}$), it was observed that $CO_2$ breakthrough occurred at a later point than in the physisorption control experiment. Integration of the concentration data showed about 70% stoichiometric capture of $CO_2$ by $DCNQ^{2-}$ during the chemisorption experiment. This is believed to be due to a reversible reaction of $DCNQ^{2-}$ with $CO_2$ to form the adduct $DCNQ^{2-}(CO_2)_2$, as shown below.

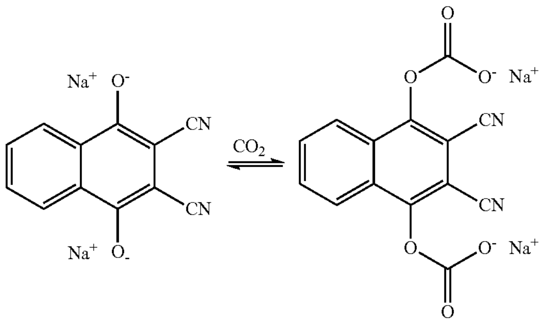

Figure 17A:
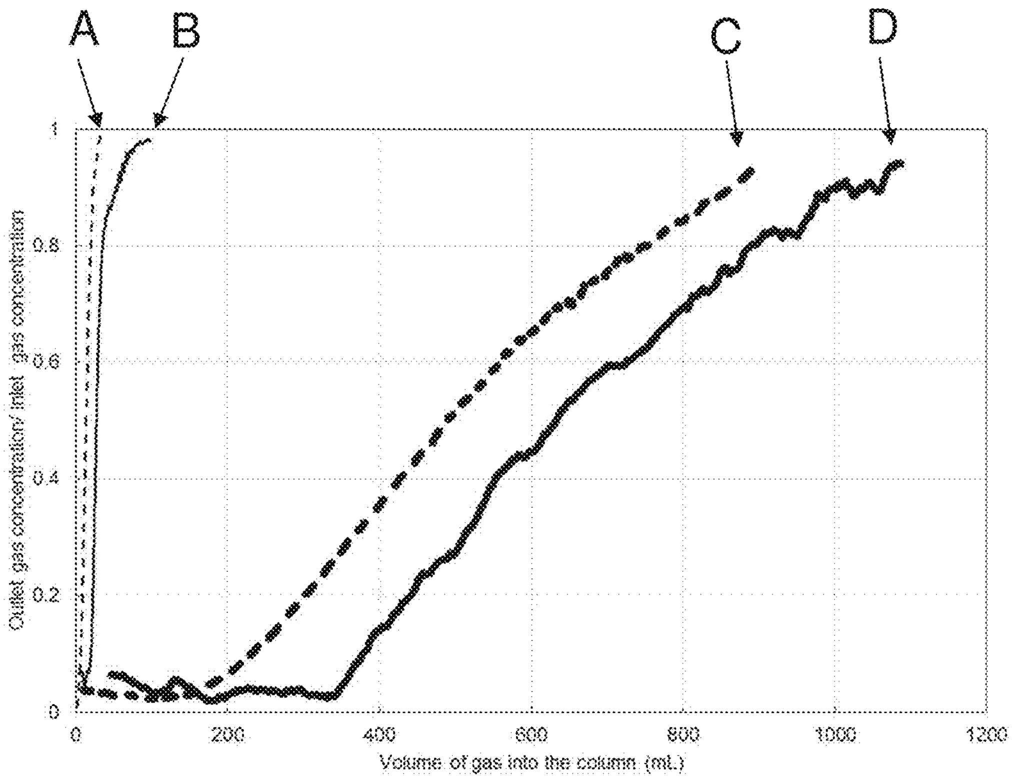
FIGS. 17A-17B shows a plot of a ratio of outlet gas concentration to inlet gas concentration vs. time for the physisorption and chemisorption experiments, according to one or more embodiments.
Figure 17B:
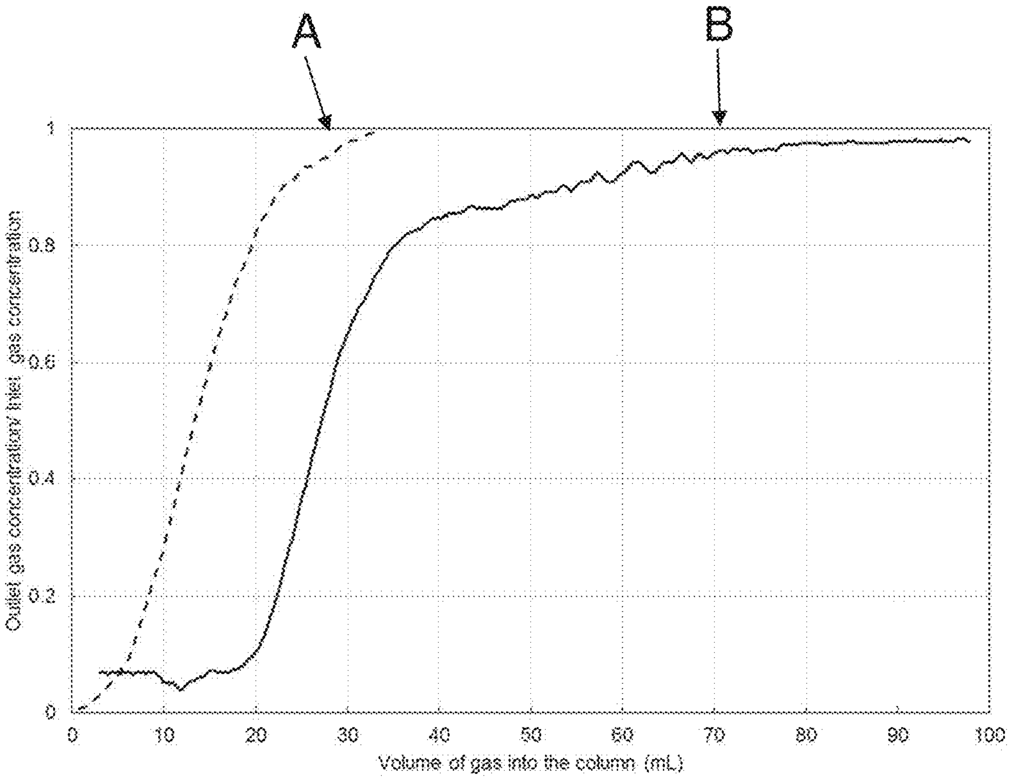

However, $CO_2$ complexed with $DCNQ^{2-}$ was replaced by $SO_2$ in an irreversible reaction that formed the adduct $DCNQ^{2-}(SO_2)_2$. This $DCNQ^{2-}(SO_2)_2$ adduct formation was evident in the delayed breakthrough of $SO_2$ in the chemisorption experiment when compared to the physisorption breakthrough. The difference in reactivity was qualitatively observed. After $CO_2$ breakthrough but prior to $SO_2$ breakthrough, the entire solution in the column was observed to have a pink color (indicative of the presence of $DCNQ^{2-}$ and $DCNQ^{2-}$ $(CO_2)_2$ adduct) except for a small region near the inlet of the column that was observed to have a yellow color (indicative of the presence of $DCNQ^{2-}(SO_2)_2$). At a later point in time, after $SO_2$ breakthrough, an entirety of the column solution was observed to have the yellow color, indicating the absence of $CO_2$ in the column and presence of only $DCNQ^{2-}(SO_2)_2$ throughout the column. FIG. 17A shows a plot of a ratio of outlet gas concentration to inlet gas concentration vs. time for the physisorption and chemisorption experiments. In FIG. 17A, curve A corresponds to $CO_2$ concentration in the physisorption (propylene carbonate only) experiment, curve B corresponds to $CO_2$ concentration in the chemisorption ($DCNQ^{2-}$ in propylene carbonate) experiment, curve C corresponds to $SO_2$ concentration in the physisorption (propylene carbonate only) experiment, and curve D corresponds to $SO_2$ concentration in the chemisorption ($DCNQ^{2-}$ in propylene carbonate) experiment. The results in FIG. 17A show significantly earlier breakthrough for $CO_2$ than for $SO_2$, and also shows a significantly delay in $SO_2$ breakthrough in the chemisorption experiment than in the physisorption experiment. FIG. 17B shows a zoomed-in view of curves A and B from FIG. 17A.

The delay in $SO_2$ breakthrough accounts for a stoichiometric reaction where all the starting $DCNQ^{2-}$ reacted with $SO_2$. Reaction schemes for the binding of $SO_2$ to $DCNQ^{2-}$ and the substitution of $CO_2$ by $SO_2$ in a $DCNQ^{2-}(CO_2)_2$ adduct are shown below.

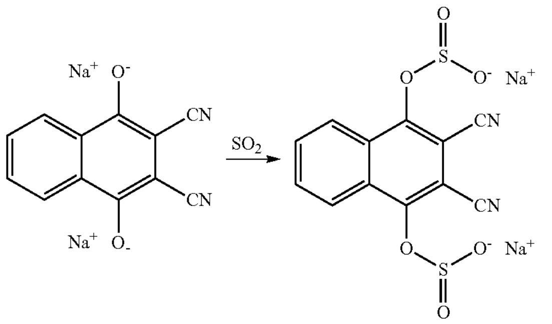

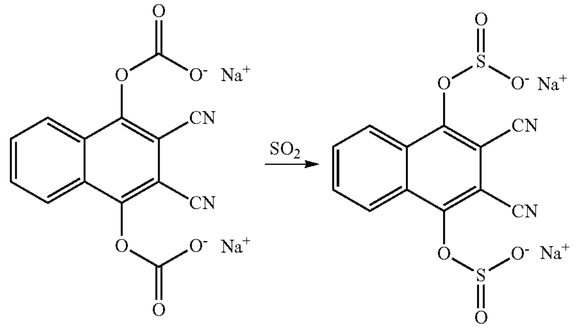

The results of the gas separation experiment demonstrated selective capture of $SO_2$ from a gas stream of 1% $SO_2$, 10% $CO_2$ and 89% $N_2$. The chemisorption capture of $SO_2$ by $DCNQ^{2-}$ is believed to be only reversible via an oxidation reaction to afford release of the $SO_2$. Such an oxidation can occur electrochemically or by the use of an oxidative chemical reagent.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified. Thus, as a non-limiting example, “at least one of A and B” (or, equivalently, “at least one of A or B,” or, equivalently “at least one of A and/or B”) can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as “comprising,” “including,” “carrying,” “having,” “containing,” “involving,” “holding,” and the like are to be understood to be open-ended, i.e., to mean including but not limited to. Only the transitional phrases “consisting of” and “consisting essentially of” shall be closed or semi-closed transitional phrases, respectively, as set forth in the United States Patent Office Manual of Patent Examining Procedures, Section 2111.03.

What is claimed is:

1. A method, comprising:

exposing a fluid mixture comprising a first gas comprising a first Lewis acid and a second gas comprising a second Lewis acid to one or more electroactive species in a reduced state;

forming first complexes, at a first temperature, between an amount of the first Lewis acid and a first portion of the one or more electroactive species in the reduced state;

forming second complexes, at the first temperature, between an amount of the second Lewis acid and a second portion of the one or more electroactive species in the reduced state; and exposing the first complexes and the second complexes to conditions at a second, different temperature, such that the second Lewis acid is released from at least some of the second complexes, while the first Lewis acid is released from essentially none of the first complexes or less than or equal to 70 mole % of the first complexes.

2. The method of claim 1, wherein the one or more electroactive species in the reduced state are generated from one or more electroactive species in an oxidized state.

3. The method of claim 2, wherein the one or more electroactive species in the reduced state are generated from one or more electroactive species in an oxidized state via application of an electrical potential across an electrochemical cell.

4. The method of claim 1, wherein, during the exposing the first complexes and the second complexes to conditions at a second, different temperature, the first Lewis acid is released from essentially none of the first complexes or less than or equal to 10 mole % of the first complexes.

5. The method of claim 4, wherein, during the exposing the first complexes and the second complexes to conditions at a second, different temperature, the second Lewis acid is released from at least 90 mole % of the second complexes.

6. The method of claim 1, wherein, during the exposing the first complexes and the second complexes to conditions at a second, different temperature, the second Lewis acid is released from at least 90 mole % of the second complexes.

7. The method of claim 1, wherein the forming the first complexes is via bonding the amount of the first Lewis acid to the first portion of the one or more electroactive species in the reduced state.

8. The method of claim 1, wherein the forming the second complexes is via bonding the amount of the second Lewis acid to the second portion of the one or more electroactive species in the reduced state.

9. The method of claim 1, wherein the fluid mixture is a gas mixture or a liquid mixture.

10. The method of claim 1, wherein the exposing the fluid mixture to the one or more electroactive species in a reduced state is performed in the presence of a liquid comprising an electrolyte solution.

11. The method of claim 10, wherein the liquid comprising the electrolyte solution comprises the one or more electroactive species.

12. The method of claim 1, wherein, during at least the exposing the first complexes and the second complexes to conditions at the second temperature, the one or more electroactive species are immobilized on an electrode of an electrochemical cell.

13. The method of claim 1, wherein, during at least the step of exposing the fluid mixture to the one or more electroactive species in a reduced state, the one or more electroactive species are dissolved in a liquid that is a separate phase than the fluid mixture.

14. The method of claim 1, wherein the first Lewis acid is chosen from sulfur dioxide ($SO_2$), sulfur oxides ($SO_x$), nitrogen oxides ($NO_x$), $R_2S$, carbonyl sulfide (COS), $R_3B$, boron trifluoride ($BF_3$), or a combination thereof, wherein each R is independently H, branched or unbranched $C_1$-$C_8$ alkyl, aryl, cyclyl, heteroaryl, or heterocyclyl.

15. The method of claim 14, wherein the first Lewis acid comprises hydrogen sulfide ($H_2S$).

16. The method of claim 14, wherein the second Lewis acid comprises carbon dioxide ($CO_2$).

17. The method of claim 1, wherein the second Lewis acid comprises carbon dioxide ($CO_2$).

* * * * *